US012483495B1

(12) United States Patent
Henkel et al.

(10) Patent No.: US 12,483,495 B1
(45) Date of Patent: Nov. 25, 2025

(54) INTEGRATED GATEWAY SERVICE

(71) Applicant: Juniper Networks, Inc., Sunnyvale, CA (US)

(72) Inventors: Michael Henkel, Saratoga, CA (US); Pranav Cherukupalli, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 92 days.

(21) Appl. No.: 18/620,460

(22) Filed: Mar. 28, 2024

Related U.S. Application Data

(60) Provisional application No. 63/493,303, filed on Mar. 30, 2023.

(51) Int. Cl.
*H04L 45/02* (2022.01)
*H04L 41/0816* (2022.01)
*H04L 45/586* (2022.01)

(52) U.S. Cl.
CPC .......... *H04L 45/04* (2013.01); *H04L 41/0816* (2013.01); *H04L 45/586* (2013.01)

(58) Field of Classification Search
CPC .... H04L 45/04; H04L 45/586; H04L 41/0816
See application file for complete search history.

(56) References Cited

U.S. PATENT DOCUMENTS

| 9,571,394 | B1 | 2/2017 | Sivaramakrishnan et al. | |
|---|---|---|---|---|
| 10,708,125 | B1 * | 7/2020 | Chen | H04L 65/1046 |
| 11,218,421 | B1 * | 1/2022 | Khan | H04L 41/0897 |
| 11,503,124 | B1 * | 11/2022 | Han | H04L 67/1029 |

(Continued)

FOREIGN PATENT DOCUMENTS

| EP | 3675423 A1 | 7/2020 |
|---|---|---|
| EP | 3731466 A1 | 10/2020 |
| WO | 2013184846 A1 | 12/2013 |

OTHER PUBLICATIONS

Goodman et al., "Introducing VPC Flow Logs for AWS Transit Gateway," Announcements, AWS Transit Gateway, Monitoring and observability, Networking & Content Delivery, Jul. 2022. (Year: 2022).*

(Continued)

*Primary Examiner* — Alina A Boutah
(74) *Attorney, Agent, or Firm* — Shumaker & Sieffert, P.A.

(57) ABSTRACT

In general, techniques are described for a SDN architecture system that implements an integrated gateway service. In an example, network controller comprises processing circuitry and memory and is configured to: configure a virtual network in a cluster of nodes of a compute infrastructure, the cluster of nodes managed in part by the network controller; receive a manifest for a gateway service instance that abstracts a transit gateway resource configurable in a plurality of different types of compute infrastructures, wherein the manifest specifies an intended state of a transit gateway object of the gateway service instance; and reconcile the intended state of the transit gateway object for the gateway service instance by sending configuration data, generated based on the transit gateway object, to an interface for the compute infrastructure to configure a transit gateway to forward network packets between a compute infrastructure node of the compute infrastructure and the virtual network.

20 Claims, 16 Drawing Sheets

(56) References Cited

U.S. PATENT DOCUMENTS

| | | | |
|---|---|---|---|
| 12,323,386 B2* | 6/2025 | Juneja | H04L 61/5007 |
| 2020/0076685 A1 | 3/2020 | Vaidya et al. | |
| 2020/0213227 A1* | 7/2020 | Pianigiani | H04L 41/0226 |
| 2020/0285457 A1* | 9/2020 | Meriac | H04L 67/34 |
| 2020/0314015 A1 | 10/2020 | Mariappan et al. | |
| 2020/0344147 A1* | 10/2020 | Pianigiani | H04L 41/0806 |
| 2021/0218652 A1 | 7/2021 | Raut et al. | |
| 2021/0314239 A1 | 10/2021 | Shen et al. | |
| 2021/0314388 A1 | 10/2021 | Zhou et al. | |
| 2022/0035651 A1 | 2/2022 | Maurya et al. | |
| 2022/0038311 A1 | 2/2022 | Shen et al. | |
| 2022/0083364 A1* | 3/2022 | Jain | G06F 9/5027 |
| 2022/0229678 A1 | 7/2022 | Beard et al. | |
| 2022/0279420 A1 | 9/2022 | Akkipeddi et al. | |
| 2023/0104568 A1* | 4/2023 | Miriyala | H04L 45/42 |
| | | | 718/104 |
| 2023/0123775 A1* | 4/2023 | Sivakumar | H04L 41/0893 |
| | | | 709/220 |
| 2023/0337113 A1* | 10/2023 | Trujillo | H04W 40/28 |
| 2024/0073087 A1* | 2/2024 | Henkel | G06F 9/45558 |
| 2024/0129161 A1* | 4/2024 | Miriyala | H04L 41/122 |
| 2024/0146800 A1* | 5/2024 | Abdelrehim | H04L 67/02 |
| 2024/0422107 A1* | 12/2024 | Sharma | H04L 41/0806 |
| 2024/0427621 A1* | 12/2024 | Böwing | G06F 9/45558 |
| 2025/0023844 A1* | 1/2025 | Juneja | G06F 9/45558 |
| 2025/0068397 A1* | 2/2025 | Kandasamy | G06F 8/35 |
| 2025/0126043 A1* | 4/2025 | Tang | H04L 12/66 |

OTHER PUBLICATIONS

"Cloud-Native Contrail Networking Feature Guide: VPC to CN2 Communication in AWS EKS", https://www.juniper.net/documentation/us/en/software/cn-cloud-native23.2/cn-cloud-native-feature-guide/cn-cloud-native-network-feature/topics/concept/cn-cloud-native-vpc-to-cn2.html, Juniper Networks, Inc., Jul. 19, 2023, 8 pp.

Kishore et al., "Day One: Deploy Cloud-Native Contrail Networking as a Cni for Kubernetes", Juniper Networks, Inc., Apr. 1, 2023, 83 pp.

Kn et al., "Day One: Contrail DPDK vRouter", Juniper Networks, Inc., Engineering Simplicity, 2021, 196 pp., (Applicant points out, in accordance with MPEP 609.04(a), that the year of publication, 2021, is sufficiently earlier than the effective U.S. filing date, so that the particular month of publication is not an issue.).

* cited by examiner

INTEGRATED GATEWAY SERVICE

This application claims the benefit of U.S. Provisional Patent Application No. 63/493,303, filed 30 Mar. 2023, the entire contents of which is incorporated herein by reference.

TECHNICAL FIELD

The disclosure relates to virtualized compute infrastructure and, more specifically, to networking for virtualized compute infrastructure.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such as virtual machines or containers, are deployed and executed on an underlying compute platform of physical computing devices.

Virtualization within a data center or any environment that includes one or more servers can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the compute infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A compute infrastructure that manages deployment and infrastructure for application execution may involve two main roles: (1) orchestration—for automating deployment, scaling, and operations of applications across clusters of hosts and providing compute infrastructure, which may include container-centric compute infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, techniques are described for a software-defined networking (SDN) architecture system that implements an integrated gateway service that models and abstracts underlying compute infrastructures into custom resources of an orchestration platform. These custom resources may be used in a consistent manner across many different types of compute infrastructures, including public clouds managed by a variety of cloud providers, on-premises data centers for an enterprise, and so forth. Custom controllers of the orchestration platform implement infrastructure-specific business logic to interact with the specific types of compute infrastructures. Consequently, creating a gateway service instance (GSI) as a collection of compute infrastructure and orchestration platform resources to implement the integrated gateway service can be done using a similar workflow on any of the supported compute infrastructures. Based on the specific compute infrastructure, the custom controller for the gateway service instance semantically understands the compute infrastructure APIs needed to orchestrate compute infrastructure resources to enable communication between the infrastructure and an orchestration platform network stack provided by an SDN architecture system that configures the gateway service instance. Gateway service instance users will not need to understand the specifics of the orchestration of the different infrastructures and can use the same workflows across infrastructures, considerably simplifying configuration tasks.

The SDN architecture system may support a rich set of routing protocols, including Multi-Protocol Border Gateway Protocol with Multiprotocol Label Switching (MP-BGP/MPLS), Ethernet Virtual Private Networking (EVPN)/VXLAN, and native Internet Protocol (IP) forwarding. This set of protocols is also supported by most compute infrastructures. In some cases, however, an infrastructure has specific requirements that are not met by the SDN architecture system. In such cases, the GSI collection of resources includes a containerized network router (CNR), which understands a broader range of control and data-plane protocols than the rest of the SDN architecture system. A CNR uses a containerized routing protocol daemon (cRPD) control plane and a virtual router data plane to deliver high performance networking in a small-footprint software package that is functionally similar to a physical (i.e., non-virtual) router that provides a physical network function (PNF). The CNR, as part of the gateway service instance, is a gateway between the SDN architecture system and the compute infrastructure and effectively operates as a network language translator between the two. The lifecycle management of a CNR is fully integrated into the abstraction of the gateway service instance and managed by the orchestration platform. As such, configuration data for the CNR is automatically generated by the orchestration platform based on the compute infrastructure being connected and also may be continuously reconciled to react to changes in the compute infrastructure or in the SDN architecture system.

The techniques provide one or more technical improvements that result in one or more practical applications. For example, a gateway service instance as described herein may permit accessing a workload running on a virtual private cloud (VPC) without necessarily exposing the host network of the orchestration platform cluster to the VPC. Although some public cloud orchestration platform distributions offer solutions that support this feature, these solutions are tailored for traditional virtual machine workloads instead of container-based workloads. As a result, for these conventional solutions to operate, workload IPs must be configured as secondary IP addresses on node interfaces, which imposes resource constraints on the nodes, reducing the number of workload that can be supported. Further, with conventional techniques, services are exposed through public load balancers, and every time a service is created, the load balancer begins an instantiation process which tends to result in more time until service exposure. The gateway service instance implemented using the techniques described herein may avoid these drawbacks by collecting, integrating, and managing infrastructure and SDN architecture system resources to seamlessly interconnect the SDN architecture system with a VPC and/or external networks (such as on-premises data centers). Application of a gateway service instance manifest to configure the resources of a gateway service instance, using the techniques set forth herein, may enable the SDN architecture system to facilitate communication between workloads and services in a VPC cluster, as well as between workloads within the same VPC.

In an example, a system comprises: a compute infrastructure node; a cluster of nodes managed in part by a network controller; and a transit gateway, wherein the network controller is configured to: configure a virtual network in the cluster of nodes; receive a manifest for a gateway service instance that abstracts a transit gateway resource configurable in a plurality of different types of compute infrastructures, wherein the manifest specifies a state of a transit gateway object of the gateway service instance; and reconcile the state of the transit gateway object of the gateway service instance specified by the manifest with a state of the transit gateway by sending configuration data, generated based on the transit gateway object, to an interface for the compute infrastructure to configure the transit gateway to forward network packets between the compute infrastructure node and the virtual network.

In an example, a network controller comprises processing circuitry and memory, the network controller configured to: configure a virtual network in a cluster of nodes of a compute infrastructure, the cluster of nodes managed in part by the network controller; receive a manifest for a gateway service instance that abstracts a transit gateway resource configurable in a plurality of different types of compute infrastructures, wherein the manifest specifies a state of a transit gateway object of the gateway service instance; and reconcile the state of the transit gateway object of the gateway service instance specified by the manifest with a state of the transit gateway by sending configuration data, generated based on the transit gateway object, to an interface for the compute infrastructure to configure a transit gateway to forward network packets between a compute infrastructure node of the compute infrastructure and the virtual network.

In an example, non-transitory computer-readable media comprises instructions that, when executed by one or more processors of a network controller, cause the one or more processors to: configure a virtual network in a cluster of nodes of a compute infrastructure, the cluster of nodes managed in part by the network controller; receive a manifest for a gateway service instance that abstracts a transit gateway resource configurable in a plurality of different types of compute infrastructures, wherein the manifest specifies a state of a transit gateway object of the gateway service instance; and reconcile the state of the transit gateway object of the gateway service instance specified by the manifest with a state of the transit gateway by sending configuration data, generated based on the transit gateway object, to an interface for the compute infrastructure to configure a transit gateway to forward network packets between a compute infrastructure node of the compute infrastructure and the virtual network.

The details of one or more examples of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
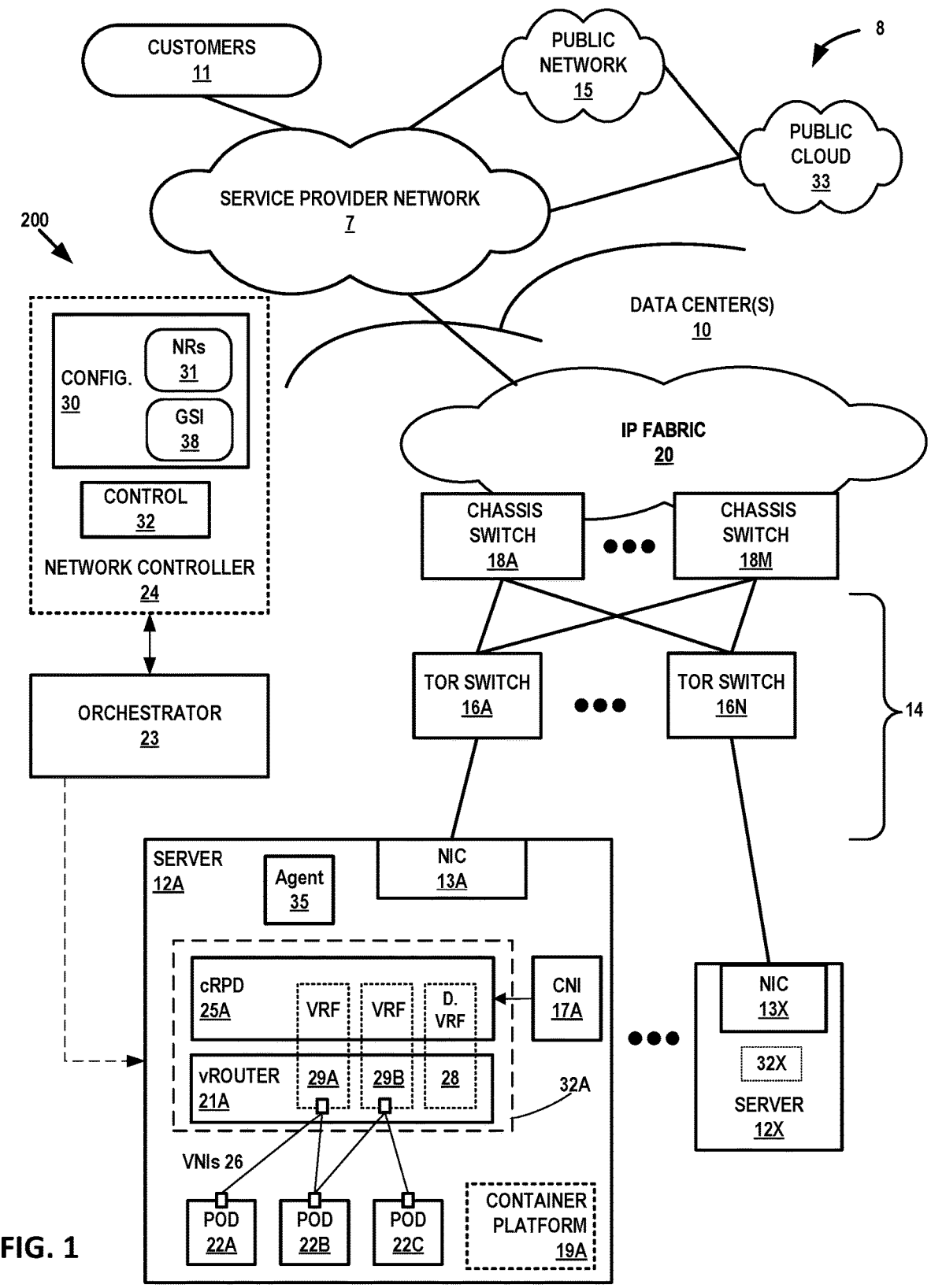
FIG. 1 is a block diagram illustrating example compute infrastructures in which examples of the techniques described herein may be implemented.

FIG. 1 is a block diagram illustrating example compute infrastructures 8 in which examples of the techniques described herein may be implemented. Current implementations of software-defined networking (SDN) architecture systems for virtual networks present challenges for cloud-native adoption due to, e.g., complexity in life cycle management, a mandatory high resource analytics component, scale limitations in configuration modules, and no command-line interface (CLI)-based (kubectl-like) interface. Compute infrastructure 8 includes a cloud-native SDN architecture system 200, described herein, that addresses these challenges and modernizes for the telco cloud-native era. Example use cases for the cloud-native SDN architecture include 5G mobile networks as well as cloud and enterprise cloud-native use cases. An SDN architecture may include data plane elements implemented in compute nodes (e.g., servers 12) and network devices such as routers or switches, and the SDN architecture may also include an SDN controller (e.g., network controller 24) for creating and managing virtual networks. The SDN architecture configuration and control planes are designed as scale-out cloud-native software with a container-based microservices architecture that supports in-service upgrades. An example network controller, which may be implemented by network controller 24 of FIG. 1, that configures virtual routers in servers to create and manage virtual networks connecting co-located workloads (i.e., running on the servers also executing the virtual routers), is described in U.S. Publication No. 2023/0123775, 20 Apr. 2023, CLOUD NATIVE SOFTWARE-DEFINED NETWORK ARCHITECTURE, which is incorporated by reference herein in its entirety. Such virtual networks are also referred to as "SDN controller virtual networks" or "network controller 24 virtual networks" in this disclosure.

As a result, at least some of the SDN architecture components are microservices, and the SDN architecture assumes a base container orchestration platform to manage the lifecycle of SDN architecture components. A container orchestration platform is used to bring up SDN architecture components; the SDN architecture uses cloud native monitoring tools that can integrate with customer provided cloud native options; the SDN architecture provides a declarative way of resources using aggregation APIs for SDN architecture objects (i.e., custom resources). The SDN architecture upgrade may follow cloud native patterns, and the SDN architecture may leverage Kubernetes constructs such as Multus, Authentication & Authorization, Cluster API, KubeFederation, Kube Virt, and Kata containers. The SDN architecture may support data plane development kit (DPDK) pods, and the SDN architecture can extend to support Kubernetes with virtual network policies and global security policies.

For service providers and enterprises, the SDN architecture automates network resource provisioning and orchestration to dynamically create highly scalable virtual networks and to chain virtualized network functions (VNFs) and physical network functions (PNFs) to form differentiated service chains on demand. The SDN architecture may be integrated with orchestration platforms (e.g., orchestrator 23) such as Kubernetes, OpenShift, Mesos, OpenStack, VMware vSphere, and with service provider operations support systems/business support systems (OSS/BSS).

In general, one or more data center(s) 10 provide an operating environment for applications and services for customer sites 11 (illustrated as "customers 11") having one or more customer networks coupled to the data center by service provider network 7. Each of data center(s) 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within any of data center(s) 10. For example, data center(s) 10 may host multiple tenants (customers) each associated with one or more virtual private networks (VPNs), each of which may implement one of customer sites 11.

Service provider network 7 offers packet-based connectivity to attached customer sites 11, data center(s) 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, each of data center(s) 10 may represent one of many geographically distributed network data centers, which may be connected to one another via service provider network 7, dedicated network links, dark fiber, or other connections. As illustrated in the example of FIG. 1, data center(s) 10 may include facilities that provide network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center(s) 10 such as one or more physical network functions (PNFs) or virtualized network functions (VNFs) may be included within the service provider network 7 core.

One or more of data center(s) 10 can implement a public cloud (shown as public cloud 33), a cloud computing environment in which resources, such as virtual machines, storage, and applications, are made available to users and enterprises over the network by a cloud service provider. In a public cloud model, multiple users or organizations share the same infrastructure, but each user's data and applications remain isolated from others. Public cloud 33 is an example of a public cloud. Services provided from public cloud 33 can include web hosting, application hosting and development, storage as a service, analytics, high-performance computing, disaster recovery, database services, etc.

Public cloud 33 can include one or more virtual private clouds (VPCs). A virtual private cloud is a logically isolated virtual network within the public cloud 33 infrastructure that is administered by a user, enterprise, or other tenant of public cloud 33. The VPC includes (or is flexibly assigned) resources of public cloud 33 that the tenant can use to run workloads and provide services, such resources including servers (real and/or virtual—e.g., VMs), storage volumes and/or storage services, databases or database services, cloud services, or other resources.

The VPC provides logical isolation from other tenants in public cloud 33. The tenant for a VPC defines IP address ranges, subnets (VPC subnets), routing tables, and network gateways to create a virtual network topology within the VPC, giving the tenant precise control over network configuration and communication among resources launched or otherwise operating "within" the VPC.

Resources in a VPC that can execute workloads, such as real and/or virtual servers, are referred to as "nodes" or "VPC nodes". Nodes are also known as instances. Nodes are launched into a VPC and assigned network addresses from the VPC subnets, which may be defined by the VPC tenant. A VPC may be used to run a container orchestration platform, such as Kubernetes. Such platforms may be managed Kubernetes services, such as AMAZON ELASTIC KUBERNETES SERVICE (EKS), GOOGLE KUBERNETES ENGINE (GKE), and similar services from other cloud providers.

Kubernetes networking relies on IP addresses. Kubernetes Pods, containers, and nodes communicate using IP addresses and ports. Kubernetes provides different types of load balancing to direct traffic to the correct Pods. A Kubernetes node is implemented using a VPC node, and both may be considered "nodes." Each node is assigned a node IP address, and each Pod is assigned a Pod IP address. A Kubernetes LoadBalancer service is used to expose Kubernetes services to external clients by provisioning a load balancer and allocating an external IP address. This allows external clients to access the service over a network. The load balancer distributes incoming traffic across the Pods that are selected by the LoadBalancer service. Kubernetes may interact with a public cloud 33 API to provision and configure a load balancer and assign an external IP address.

Data center(s) 10 includes storage and/or compute servers (or "nodes") interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "compute nodes," "hosts," or "host devices." Although only server 12A coupled to TOR switch 16A is shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center(s) 10 may also include one or more physical network functions (PNFs) such as physical firewalls, load balancers, routers, route reflectors, broadband network gateways (BNGs), mobile core network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center(s) 10 is merely an example. Other switching architectures may have more or fewer switching layers, for instance. IP fabric 20 may include one or more gateway routers.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements, such as pods or virtual machines, by virtualizing resources of the server to provide some measure of isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., an of data center(s) 10. Each tenant or an application can have one or more virtual networks. Each virtual network may be isolated from all the other virtual networks unless explicitly allowed by security policy.

Virtual networks can be connected to and extended across physical Multi-Protocol Label Switching (MPLS) Layer 3 Virtual Private Networks (L3VPNs) and Ethernet Virtual Private Networks (EVPNs) networks using a datacenter 10 gateway router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As noted above, one or more data center(s) 10 may be used to implement public cloud 33. One or more data center(s) 10 may be used to implement a private cloud, a hybrid cloud, and/or an on-premises data center for an enterprise or other entity.

As described further below with respect to virtual routers 21A-21X (illustrated as and also collectively referred to herein as "vRouters 21"), virtual routers running in servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not store any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e., which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and instead provide an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. Virtual execution elements may represent application workloads ("workloads"). As shown in FIG. 1, server 12A hosts virtual network endpoints in the form of pods 22A-22C each having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

In some cases, Pods 22, cRPD 25A, and/or vRouter 21A may execute on a virtual server (e.g., virtual machine) running on server 12A.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O maybe a virtualization of the physical NIC (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass a Contrail or Tungsten Fabric virtual router, Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by virtual router 21 of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by virtual router 21. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. Hereinafter, description of virtual routers is made primarily with respect to virtual router 21A, but such description is relevant to other instances of virtual routers 21.

For server 12A, for example, for each of the packets outbound from virtual network endpoints hosted by server 12A (e.g., any of pods 22A-22C), virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, virtual router 21A may execute the operations of a tunnel endpoint to encapsulate inner packets sourced by virtual network endpoints to generate tunnel packets and decapsulate tunnel packets to obtain inner packets for routing to other virtual network endpoints.

In some examples, virtual router 21A may be a kernel-based and execute as part of the kernel of an operating system of server 12A.

In some examples, virtual router 21A may be a Data Plane Development Kit (DPDK)-enabled virtual router. In such examples, virtual router 21A uses DPDK as a data plane. In this mode, virtual router 21A runs as a user space application that is linked to the DPDK library (not shown). This is a performance version of a virtual router and is commonly used by telecommunications companies, where the VNFs are often DPDK-based applications. The performance of virtual router 21A as a DPDK virtual router can achieve ten times higher throughput than a virtual router operating as a kernel-based virtual router. The physical interface is used by DPDK's poll mode drivers (PMDs) instead of Linux kernel's interrupt-based drivers.

Additional details of an example of a DPDK vRouter are found in "DAY ONE: CONTRAIL DPDK vROUTER," 2021, Kiran K N et al., Juniper Networks, Inc., which is incorporated by reference herein in its entirety.

One or more of servers 12 include and execute containerized routing protocol daemons 25A-25X (collectively, "cRPDs 25"). A containerized routing protocol daemon (cRPD) is a routing protocol process that is packaged as a container and may run in Linux-based environments. cRPD may be executed in the user space of the host as a containerized process. Thus, cRPD makes available the rich routing software pedigree of physical routers on Linux-based compute nodes, e.g., servers 12 in some cases. cRPD provides control plane functionality. This control plane is thus containerized. For example, cRPD 25A implements the control plane for a CNR 32A executed by server 12A.

Virtual routers 21, meanwhile, are the software entities that provide data plane functionality on servers 12. CRPD 25A may use the forwarding (or data) plane provided by the Linux kernel of server 12A for a kernel-based virtual router 21A. CRPD 25A may alternatively use a DPDK-enabled or SmartNIC-executed instance of virtual router 21. Virtual router 21A may work with an SDN controller (e.g., network controller 24) to create the overlay network by exchanging routes, configurations, and other data. Virtual router 21A may be containerized. In combination, the containerized cRPD and containerized virtual router may thus be a fully functional containerized, CNR 32A in some examples.

Compute infrastructure 8 implements an automation platform for automating deployment, scaling, and operations of virtual execution elements across servers 12 to provide virtualized infrastructure for executing application workloads and services. In some examples, the platform may be an orchestration platform. In some cases, the orchestration platform is a container orchestration platform that provides a container-centric infrastructure for automating deployment, scaling, and operations of containers to provide a container-centric infrastructure. "Orchestration," in the context of a virtualized compute infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes (a container orchestration platform), Docker swarm, Mesos/Marathon, OpenShift, OpenStack, VMware, and Amazon ECS.

Elements of the automation platform of compute infrastructure 8 include at least servers 12, orchestrator 23, and network controller 24. Containers may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily container hosting devices of a cluster. For example, the Kubernetes platform uses the terms "cluster master" and "minion nodes," while the Docker Swarm platform refers to cluster managers and cluster nodes. A Kubernetes cluster is an example of an orchestration platform cluster.

Orchestrator 23 and network controller 24 may execute on separate sets of computing devices. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12 (also referred to as "compute nodes").

In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding example operations of a network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each of which is incorporated by reference as if fully set forth herein.

In general, orchestrator 23 controls the deployment, scaling, and operations of containers across clusters of servers 12 and providing compute infrastructure, which may include container-centric compute infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform.

Kubernetes operates using a variety of Kubernetes objects-entities which represent a state of a Kubernetes cluster. Kubernetes objects may include any combination of names, namespaces, labels, annotations, field selectors, and recommended labels. For example, a Kubernetes cluster may include one or more "namespace" objects. Each namespace of a Kubernetes cluster is isolated from other namespaces of the Kubernetes cluster. Namespace objects may include at least one of organization, security, and performance of a Kubernetes cluster. As an example, a pod may be associated with a namespace, consequently associating the pod with characteristics (e.g., virtual networks) of the namespace. This feature may enable a plurality of newly-created pods to organize by associating the pods with a common set of characteristics. A namespace can be created according to namespace specification data that defines characteristics of the namespace, including a namespace name. In one example, a namespace might be named "Namespace A" and each newly-created pod may be associated with a set of characteristics denoted by "Namespace A." Additionally, Kubernetes includes a "default" namespace. If a newly-created pod does not specify a namespace, the newly-created pod may associate with the characteristics of the "default" namespace.

Namespaces may enable one Kubernetes cluster to be used by multiple users, teams of users, or a single user with multiple applications. Additionally, each user, team of users, or application may be isolated within a namespace from every other user of the cluster. Consequently, each user of a Kubernetes cluster within a namespace operates as if it were the sole user of the Kubernetes cluster. Multiple virtual networks may be associated with a single namespace. As such, a pod that belongs to a particular namespace has the ability to access each virtual network of the virtual networks that is associated with the namespace, including other pods that serve as virtual network endpoints of the group of virtual networks.

In one example, pod 22A is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22A is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19A for running containerized applications, such as those of pod 22. Container platform 19A receives requests from orchestrator 23 to obtain and host, in server 12A, containers. Container platform 19A obtains and executes the containers.

Container network interface (CNI) 17A configures virtual network interfaces for virtual network endpoints. The orchestrator 23 and container platform 19A use CNI 17A to manage networking for pods, including pods 22. For example, CNI 17A creates virtual network interfaces to connect pods 22 to virtual router 21A and enables containers of such pods to communicate, via the virtual network interfaces, to other virtual network endpoints over the virtual networks. CNI 17A may, for example, insert a virtual network interface for a virtual network into the network namespace for containers in pod 22A and configure (or request to configure) the virtual network interface for the virtual network in virtual router 21A such that virtual router 21A is configured to send packets received from the virtual network via the virtual network interface to containers of pod 22A and to send packets received via the virtual network interface from containers of pod 22A on the virtual network. CNI 17A may assign a network address (e.g., a virtual IP address for the virtual network) and may set up routes for the virtual network interface. In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network CNI 17A may represent a library, a plugin, a module, a runtime, or other executable code for server 12A. CNI 17A may conform, at least in part, to the Container Network Interface (CNI) specification or the rkt Networking Proposal. CNI 17A may represent a Contrail, OpenContrail, Multus, Calico, cRPD, or other CNI. CNI 17A may alternatively be referred to as a network plugin or CNI plugin or CNI instance. Separate CNIs may be invoked by, e.g., a Multus CNI to establish different virtual network interfaces for pod 22.

CNI 17A may be invoked by orchestrator 23. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks. The CNI specification specifies a number of considerations for a conforming plugin ("CNI plugin").

In some cases, network controller 24 operates as the CNI for servers 12 to implement networking interfaces to pods 22. In such cases, configuration nodes 30 and control nodes 32 are installed alongside Kubernetes components (represented in FIG. 1 by orchestrator 23). A REST request is made to submit the pod spec (or Kubernetes object) to the kube-api-server in this example of orchestrator 23, which writes the object to the configuration store (etcd) in this example of orchestrator 23. Kube-scheduler, in this example of orchestrator 23, watches for the changes and schedules the pod object on a node, updates kube-api-server which further updates the configuration store. The kube-api-server sends a request to Kubelet (not shown) on server 12A to create the pod according to the user intent. Configuration nodes 30, using REST watch, listens for the intent, i.e., the request/changes, and works with the kube-api-server and kube-k8s-controller to translate the high-level intent into low-level details such as the virtual network interface configuration, IP address information, and so forth. Configuration nodes 30 write the translated low-level configuration to the configuration store via the kube-api-server. Control nodes 32, using REST watch, listens for changes from kube-apiserver. On noticing the changes, control nodes 32 read the etcd database to build the corresponding configuration map. Control nodes 32 then push the required configuration map to the intended vRouter 21 on the scheduled worker node (server 12A in this example). The Kubelet polls the configured CNI 17A for the networking information. CNI 17A queries vRouter agent 35 for the pod config. (VRouter agent 35 is described in further detail below with respect to vRouter agent 316 and 514.) VRouter agent 35 replies with a list of virtual network interfaces learnt from control nodes 32. If the pod information is not already with vRouter agent 35, it polls control node 32 to obtain the required information. CNI 17A processes the list of virtual network interfaces and creates the corresponding interfaces. CNI 17A then attaches the interfaces to the pod. CNI 17A then requests an IP address for each interface from vRouter agent 35 and updates the kubelet with this information. vRouter agent 35 configures the other end of each interface in vRouter 21A, including with the corresponding IP address.

Because cRPD 25A is a cloud-native application, it may support installation using Kubernetes manifests or Helm Charts. This includes the initial configuration of cRPD 25A as the control plane for CNR 32A, including configuration of routing protocols and one or more virtual private networks. A cRPD may be orchestrated and configured, in a matter of seconds, with all of the routing protocol adjacencies with the rest of the network up and running. Ongoing configuration changes during the lifetime of cRPD 25A may be via network controller 24, in accordance with techniques of this disclosure, which in some examples may be supplemented by a CLI, Kubernetes manifests, NetConf or Terraform, or other management protocols.

By adopting a Kubernetes CNI framework in some examples, CNR 32A may mitigate the traditional operational overhead incurred when using a containerized appliance rather than its physical counterpart. By exposing the appropriate device interfaces, CNR 32A may normalize the operational model of the virtual appliance to the physical appliance, eradicating the barrier to adoption within the operator's network operations environment. CNR 32A (and more specifically the interface to cRPD 25A) may present a familiar routing appliance look-and-feel to any trained operations team. CNR 32A has similar features and capabilities, and a similar operational model as a hardware-based platform. Likewise, a domain-controller can in some cases use the protocols that it uses with any other router to communicate with and control CNR 32A, for example Netconf/OpenConfig, gRPC, Path Computation Element Protocol (PCEP), or other interfaces.

CNR 32A is effectively a virtualized router and may participate in IS-IS, Open Shortest Path First (OSPF), BGP, and/or other interior or exterior routing protocols and exchange routing protocol messages with other routers, whether physical routers or CNRs 32B-32X (CNRs 32A-32X are referred to herein collectively as "CNRs 32") residing on other hosts. In addition, MPLS may be used, often based on Segment Routing (SR). The reason for this is two-fold: to allow Traffic Engineering if needed, and to underpin multi-tenancy, by using VPNs, such as MPLS-based Layer 3 VPNs or EVPNs.

Each of Pods 22 includes one or more containers. In some examples, one or more of pods 22 include a containerized DPDK workload that is designed to use DPDK to accelerate packet processing, e.g., by exchanging data with other components using DPDK libraries. Virtual router 21 may execute as a containerized DPDK workload in some examples.

Pods 22 are each configured with one or more virtual network interfaces (VNIs) 26 for sending and receiving packets with virtual router 21. Virtual network interfaces 26 may be a default interface for pods 22. Pods 22 may implement virtual network interface 26 as an Ethernet interface (e.g., named "eth0") while virtual router 21 may implement virtual network interfaces 26 as tap interfaces, virtio-user interfaces, or other type of interface. Although described with respect to pods, VNIs 26 may be attached to other virtual execution elements such as virtual machines. A virtual network interface may alternatively be referred to as a Virtual Machine Interface (VMI) even if referring to a VNI for a Pod/container.

Pods 22 and virtual router 21 exchange data packets using virtual network interfaces 26. Virtual network interface 26 may be a DPDK interface. Pods 22 and virtual router 21 may set up virtual network interface 26 using vhost. Pods 22 may operate according to an aggregation model. Pods 22 may use a virtual device, such as a virtio device with a vhost-user adapter, for user space container inter-process communication for virtual network interface 26. Description hereinafter is made primarily with respect to pod 22A but can apply to other pods 22 or other virtual execution elements.

CNI 17A may configure, for pod 22A, in conjunction with one or more other components shown in FIG. 1, a virtual network interface 26. Any of the containers of pod 22A may utilize, i.e., share, the virtual network interface(s) 26 of pod 22A.

cRPD 25A includes default VRF 28 (illustrated as "D. VRF 28") and VRFs 29A-29B (collectively, "VRFs 29"). Default VRF 28 stores the global routing table. cRPD 25A programs forwarding information derived from routing tables of VRFs 29 as forwarding tables into virtual router 21A. In this way, virtual router 21A implements the VPNs for VRFs 29, which are illustrated as included in both virtual router 21A and cRPD 25A.

cRPD 25A may be configured to operate in host network mode, also referred to as native networking. cRPD 25A therefore uses the network namespace and IP address(es) of its host, i.e., server 12A. cRPD 25A may have visibility and access to network interfaces 30A-30B of NIC 13A, which are inserted into default VRF 28 and considered by cRPD 25A as core-facing interfaces. Interfaces 30A-30B are connected to switch fabric 14 and may be Ethernet interfaces. Interfaces 30 are considered and used as core-facing interfaces by cRPD 25A for providing VPNs, for interfaces 30 may be used to transport VPN service traffic over a layer 3 network made up of one or more of switch fabric 14, IP fabric 20, service provider network 7, or public network 15.

As described above, CNI 17A uses virtual network interface configuration data provided by network controller 24 to configure virtual network interfaces 26 (illustrated as "VNIs 26") among pods 22A-22C and virtualized router 32A to enable network communications between pod 22 and virtual router 21A, thereby permitting application of the VPN service model that is typically deployed in service provider networks. Pods 22A-22C are effectively modeled as a CE router or host device, and pods 22A-22C are enabled to interact, via virtual network interfaces 26, with virtualized router 32A that is modeled as a PE router. Virtual network interfaces 26 effectively become attachment circuits (for L3VPNs) or links of an Ethernet segment (for EVPNs) connecting pods 22 to VRFs 29 of virtualized router 32A, which is operating as a PE router. Although shown and described as offering a form of VPN connectivity for Pods 22, CNR 32A does not offer connectivity to co-located Pods (i.e., running on the server with the CNR) in some cases.

Each of virtual network interfaces 26 is inserted into at least one of VRFs 29A-29B of virtualized router 32A. In FIG. 1, pod 22A has a virtual network interface 26 with VRF 29A, pod 22B has virtual network interfaces 26 with VRFs 29A and 29B, and pod 22C has a virtual network interface 26 with VRF 29B. Virtual network interfaces 26 may represent veth pairs, where each end of the veth pair is a separate device (e.g., a Linux/Unix device) with one end of each veth pair inserted into a VRF and one end inserted into a pod. The veth pair or an end of a veth pair are sometimes referred to as "ports". A virtual network interface may represent a macvlan network with media access control (MAC) addresses assigned to the pods 22 and to virtual router 21A for communications between containers of pods 22 and virtual router 21A. In the case of a DPDK-enabled virtual router 21A, virtual network interfaces 26 may each represent a DPDK (e.g., vhost) interface, with one end of the DPDK interface inserted into a VRF and one end inserted into a pod. A pod 22 may operate as a vhost server in some examples, with virtual router 21A as the vhost client, for setting up a DPDK interface. Virtual router 21A may operate as a vhost server in some examples, with a pod 22 as the vhost client, for setting up a DPDK interface. Virtual network interfaces may alternatively be referred to as virtual machine interfaces (VMIs), pod interfaces, container network interfaces, tap interfaces, veth interfaces, or simply network interfaces (in specific contexts), for instance.

In the example server 12A of FIG. 1, pods 22 are virtual network endpoints in one or more virtual networks. Orchestrator 23 may store or otherwise manage configuration data for application deployments that specifies a virtual network and specifies that a pod 22 (or the one or more containers therein) is a virtual network endpoint of the virtual network. Orchestrator 23 may receive the configuration data from a user, operator/administrator, or other machine system, for instance.

As part of the process of creating pod 22A, for instance, orchestrator 23 requests that network controller 24 create respective virtual network interfaces for one or more virtual networks (indicated in the configuration data). Pod 22A may have a different virtual network interface for each virtual network to which it belongs. For example, virtual network interface 26 may be a virtual network interface for a particular virtual network. Additional virtual network interfaces (not shown) may be configured for other virtual networks. Network controller 24 processes the request to generate interface configuration data for virtual network interfaces for the pod 22A. Interface configuration data may include a container or pod unique identifier and a list or other data structure specifying, for each of the virtual network interfaces, network configuration data for configuring the virtual network interface. Network configuration data for a virtual network interface may include a network name, assigned virtual network address, MAC address, and/or domain name server values. An example of interface configuration data in JavaScript Object Notation (JSON) format is below.

In some examples, a Pod can have multiple interfaces to different cRPD VRFs 29, e.g., one for management traffic, another for data traffic. In FIG. 1, pod 22B may use VRF 29B for management traffic and VRF 29A for data traffic, for instance.

A Pod 22, e.g., pod 22A, might be connected to some physical interfaces where it is learning IP addresses of other devices, such as User Equipment where the Pod is implementing a mobile network gateway or a customer network subnet where the Pod is implementing a CE router or gateway. To advertise these IP addresses into the network, pod 22A treats the virtual network interface 26 with a VRF 29 as an IP link and advertises routes for these IP addresses to cRPD 25A. CRPD 25A can then advertise reachability for these IP addresses through cRPD 25A and pod 22A as a next hop, again conforming to a VPN service model. cRPD 25A programs virtual router 21 with corresponding forwarding information derived from the VRFs 29 and default VRF 28, and virtual router 21 forwarding VPN traffic according to the VPN service model to implement the VPNs.

CRPD 25A may apply many different types of overlay networks/VPNs, including L3VPN or EVPN (Type-2/Type-5), using a variety of underlay tunneling types, including MPLS, SR-MPLS, SRv6, MPLSoUDP, MPLSOGRE, or IP-in-IP, for example.

CNI 17A may configure, for pod 22s, in conjunction with one or more other components shown in FIG. 1, virtual network interfaces 26. Any of the containers of a pod 22 may utilize, i.e., share, any virtual network interface of the pod. Orchestrator 23 may store or otherwise manage virtual network interface configuration data for application deployments. Orchestrator 23 may receive specification for containerized applications ("pod specifications" in the context of Kubernetes) and network attachment definitions from a user, operator/administrator, or other machine system, for instance, and network controller 24 may derive the configuration data from this information for configuring VRFs 29 and default VRF 28; and configuring virtual network interfaces 26.

For example, as part of the process of creating pod 22A, orchestrator 23 may request that network controller 24 create a virtual network interface for VRF 29A indicated in a pod specification and network attachment definition referred to by the pod specification. In accordance with techniques of this disclosure, the network attachment definition and pod specifications conform to a new model that allows the operator to specify a VPN in the network attachment definition and to configure the pod as a member of the VPN, along with a network interface specification. A pod 22 may have a different virtual network interface for each network to which it belongs. Network controller 24 processes the request to generate interface configuration data for a virtual network interface 26 for the pod 22A. Interface configuration data may include a container or pod unique identifier and a list or other data structure specifying, for each of the virtual network interfaces, network configuration data for configuring the virtual network interface. Network configuration data for a virtual network interface may include a network name, assigned virtual network address, MAC address, and/or domain name server values. An example of interface configuration data in JavaScript Object Notation (JSON) format is below.

Network controller 24 sends interface configuration data to server 12A and, more specifically in some cases, to virtual router 21A. To configure a virtual network interface for pod 22A, orchestrator 23 may invoke CNI 17A. CNI 17A obtains the interface configuration data from virtual router 21A and processes it. CNI 17A creates each virtual network interface specified in the interface configuration data. For example, CNI 17A may attach one end of a veth pair implementing a virtual network interface 26 to virtual router 21A and may attach the other end of the same veth pair to pod 22A, which may implement it using virtio-user.

Network controller 24 sends interface configuration data to server 12A and, more specifically in some cases, to virtual router 21. To configure a virtual network interface for pod 22A, orchestrator 23 may invoke CNI 17A. CNI 17A obtains the interface configuration data from virtual router 21A and processes it. CNI 17A creates each virtual network interface specified in the interface configuration data. For example, CNI 17A may attach one end of a veth pair implementing management interface 26 to virtual router 21A and may attach the other end of the same veth pair to pod 22A, which may implement it using virtio-user.

The following is example interface configuration data for pod 22A for one of virtual network interfaces 26.

```
[{
    //a virtual network interface 26
    "id": "fe4bab62-a716-11e8-abd5-0cc47a698428",
    "instance-id": "fe3edca5-a716-11e8-822c-
        0cc47a698428",
    "ip-address": "10.47.255.250",
    "plen": 12,
    "vn-id": "56dda39c-5e99-4a28-855e-6ce378982888",
    "vm-project-id": "00000000-0000-0000-0000-
        000000000000",
    "mac-address": "02:fe:4b:ab:62:a7",
    "system-name": "tapeth0fe3edca",
    "rx-vlan-id": 65535,
    "tx-vlan-id": 65535,
    "vhostuser-mode": 0,
    "v6-ip-address": "::",
    "v6-plen":,
    "v6-dns-server": "::",
    "v6-gateway": "::",
    "dns-server": "10.47.255.253",
    "gateway": "10.47.255.254",
    "author": "/usr/bin/contrail-vrouter-agent",
    "time": "426404:56:19.863169"
}]
```

A conventional CNI plugin is invoked by a container platform/runtime, receives an Add command from the container platform to add a container to a single virtual network, and such a plugin may subsequently be invoked to receive a Del(ete) command from the container/runtime and remove the container from the virtual network. The term "invoke" may refer to the instantiation, as executable code, of a software component or module in memory for execution by processing circuitry.

Network controller 24 is a cloud-native, distributed network controller for software-defined networking (SDN) that is implemented using one or more configuration nodes 30 and one or more control nodes 32. Each of configuration nodes 30 may itself be implemented using one or more cloud-native, component microservices. Each of control nodes 32 may itself be implemented using one or more cloud-native, component microservices.

In some examples, and as described in further detail below, configuration nodes 30 may be implemented by extending the native orchestration platform to support custom resources for the orchestration platform for software-defined networking and, more specifically, for providing northbound interfaces to orchestration platforms to support intent-driven/declarative creation and managing of virtual networks by, for instance, configuring virtual network interfaces for virtual execution elements, configuring underlay networks connecting servers 12, configuring overlay routing functionality including overlay tunnels for the virtual networks and overlay trees for multicast layer 2 and layer 3.

Network controller 24, as part of the SDN architecture system 200 illustrated in FIG. 1, may be multi-tenant aware and support multi-tenancy for orchestration platforms. For example, network controller 24 may support Kubernetes Role Based Access Control (RBAC) constructs, local identity access management (IAM) and external IAM integrations. Network controller 24 may also support Kubernetes-defined networking constructs and advanced networking features like virtual networking, BGPaaS, networking policies, service chaining and other telco features. Network controller 24 may support network isolation using virtual network constructs and support layer 3 networking.

To interconnect multiple virtual networks, network controller 24 may use (and configure in the underlay and/or virtual routers 21) network policies, referred to as Virtual Network Policy (VNP) and alternatively referred to herein as Virtual Network Router or Virtual Network Topology. The VNP defines connectivity policy between virtual networks. A single network controller 24 may support multiple Kubernetes clusters, and VNP thus allows connecting multiple virtual networks in a namespace, Kubernetes cluster and across Kubernetes clusters. VNP may also extend to support virtual network connectivity across multiple instances of network controller 24.

Network controller 24 may enable multi layers of security using network policies. The Kubernetes default behavior is for pods to communicate with one another. In order to apply network security policies, the SDN architecture implemented by network controller 24 and virtual router 21 may operate as a CNI for Kubernetes through CNI 17A. For layer 3, isolation occurs at the network level and virtual networks operate at L3. Virtual networks are connected by policy. The Kubernetes native network policy provides security at layer 4. The SDN architecture may support Kubernetes network policies. Kubernetes network policy operates at the Kubernetes namespace boundary. The SDN architecture may add custom resources for enhanced network policies. The SDN architecture may support application-based security. (These security policies can in some cases be based upon metatags to apply granular security policy in an extensible manner.) For layer 4+, the SDN architecture may in some examples support integration with containerized security devices and/or Istio and may provide encryption support.

Network controller 24, as part of the SDN architecture illustrated in FIG. 1, may support multi-cluster deployments, which is important for telco cloud and high-end enterprise use cases. The SDN architecture may support multiple Kubernetes clusters, for instance. A Cluster API can be used to support life cycle management of Kubernetes clusters. KubefedV2 can be used for configuration nodes 32 federation across Kubernetes clusters. Cluster API and KubefedV2 are optional components for supporting a single instance of a network controller 24 supporting multiple Kubernetes clusters.

The SDN architecture may provide insights at infrastructure, cluster, and application using web user interface and telemetry components. Telemetry nodes may be cloud-native and include microservices to support insights.

Network controller 24 is a cloud-native, lightweight distributed application with a simplified installation footprint. This also facilitates easier and modular upgrade of the various component microservices for configuration node(s) 30 and control node(s) 32 (as well as any other components of other example of a network controller described in this disclosure). The techniques may further enable optional cloud-native monitoring (telemetry) and user interfaces, a high-performance data plane for containers using a DPDK-based virtual router connecting to DPDK-enabled pods, and cloud-native configuration management that in some cases leverages a configuration framework for existing orchestration platforms, such as Kubernetes or Openstack. As a cloud-native architecture, network controller 24 is a scalable and elastic architecture to address and support multiple clusters. Network controller 24 in some cases may also support scalability and performance requirements for key performance indicators (KPIs).

An SDN architecture having features and technical advantages such as those described herein can be used to implement cloud-native telco clouds to support, for instance, 5G mobile networking (and subsequent generations) and edge computing, as well as enterprise Kubernetes platforms including, for instance, high performance cloud-native application hosting. Telco cloud applications are rapidly moving towards containerized, cloud-native approaches. 5G fixed and mobile networks are driving the requirement to deploy workloads as microservices with significant disaggregation, particularly in the 5G Next-Gen RAN (5GNR). The 5G NextGen Core (5GNC) is likely to be deployed as a set of microservices-based applications corresponding to each of the different components described by the 3GPP. When viewed as groups of microservices delivering applications, it 5GNC is likely to be a highly complex combination of pods with complex networking, security, and policy requirements. The cloud-native SDN architecture described herein, having well-defined constructs for networking, security, and policy, can be leveraged for this use case. Network controller 24 may provide the relevant APIs to be able to create these complex constructs.

The SDN architecture described herein may be able to offer very high throughput data plane (both in terms of bits per section (bps) and packets per second (pps)). Integration with a DPDK virtual router with recent performance enhancements, eBPF, and with SmartNIC will be assist with achieving the throughput required. A DPDK-based virtual router is described in further detail in U.S. application Ser. No. 17/649,632, filed Feb. 1, 2022, entitled "CONTAINERIZED ROUTER WITH VIRTUAL NETWORKING," which is incorporated herein by reference in its entirety.

Network controller 24 may configure cRPD 25A (and other cRPDs in system 200), which implements the control plane for CNR 32A in cloud-native SDN architecture system 200. Configuration nodes 30 of network controller 24 can therefore be used to orchestrate cRPD configurations. Network Resources (NR) 31 are custom resources managed by configuration nodes 30. Network Resources 31 can include Custom Resources for BGP Routers, Subnets, Routing Instances, InstanceIP, Route Targets, Virtual Machine Interfaces/Virtual Network Interfaces, Virtual Network Routers, Virtual Routers, Pools, as examples. Network Resources 31 are incorporated into an intent model as generic Network Resources and made available via configuration nodes 30 that extends an orchestration platform to implement the SDN architecture system 200 configuration plane. Some of Network Resources 31 may prompt watches and reconciliation by cRPD controller 305 for configuring cRPD 324, as well as watches and reconciliation by custom resource controllers 302 for configuring other aspects of the SDN architecture, such as the virtual router data plane. Network Resources 31 may be custom resources for a Kubernetes-based orchestration platform.

A user can create intent-based specifications for a network orchestration by referencing the generic Network Resources 31. Control nodes 32 watch for changes on Network Resources 31 and provides the Network Resource configurations to the appropriate servers 12 hosting the relevant cRPDs 25. A driver (not shown) is software executing on server 12A that translates the abstract Network Resource 31 configuration objects to configuration data that conforms to a legacy data model for cRPD 25A and pushes the configuration data to cRPD 25A via an interface (e.g., gRPC, Netconf, a CLI) to configure the CNR 32A control plane. In parallel, network controller 24 for the SDN architecture system 200 may provision the virtual router (data plane) to realize the intents—also defined in some cases by the Network Resources 31—in the CNR 32A data plane. Network controller 24 is in this way extended to permit intent-driven configuration of cRPDs 25, which implement control planes for CNRs 32 in a cloud-native SDN architecture system 200. This is described in further detail in U.S. Patent Publication 2024/0073087, 29 Feb. 2024, "INTENT-DRIVEN CONFIGURATION OF A CLOUD-NATIVE ROUTER," which is incorporated by reference herein in its entirety.

For example, the techniques translate intent-based Network Resources to low-level networking configuration resources in the cRPD software to unify and simplify network orchestration. Like other aspects of the SDN architecture system, cRPDs may now be configured using a unified intent model. Leveraging an intent-driven configuration model, such as that provided by Kubernetes, also continually reconciles the actual state to the intended state. That is, changes to a Network Resource are automatically applied by the CRPD Custom Controller and cRPD Agents to the relevant cRPDs. The above advantages may also apply to extensions of these techniques for configuring the control planes for other network devices.

SDN architecture system 200, in some cases with native Kubernetes integration, has an intent-based model for centrally orchestrating virtual networks with the virtual router 32A (data plane) and the applications (pods), and the intent-based model extends to configuring the CNRs 32 control planes, i.e., cRPDs 25, without requiring knowledge of the CLI or configuration data model of cRPDs 25.

In some examples, network controller 24 may configure control planes of physical network appliances, such as routers and network switches, firewalls, network address translation (NAT) devices, load balancers, gateways, or other devices. Such physical appliances may also have a software-based control plane that is configurable using an interface. A driver that can translate the abstract Network Resource 32 configurations relevant to that physical appliance into configuration data that conforms to the data model for that physical application may be developed and executed on that appliance (or off-device) to perform similarly to a driver for CNR 32A.

In accordance with techniques of this disclosure, network controller 24 implements gateway service instance (GSI) 38. GSI 38 is a collection of resources type of Network Resource 31 managed by configuration nodes 30. GSI 38 is incorporated into an intent model for network controller 24 as a generic resource for multiple different compute infrastructure and made available via configuration nodes 30 that extend an orchestration platform to implement the SDN architecture system 200 configuration plane. GSI 38 may be a Kubernetes custom resource, which is implemented in part by a controller that has the business logic to reconcile the underlying networking constructs. A user can create intent-based specifications by referencing GSI 31. Control nodes 32 watch for changes on GSI 31 and provides the GSI configurations to the appropriate servers 12 hosting relevant network constructs, which can include a transit gateway (a Kubernetes, public cloud resource), a CNR (a Kubernetes resource), a Connect Attachment (a public cloud resource), and Connected Peers (a Kubernetes resource), for example.

GSI 38 models and abstracts underlying compute infrastructures into custom resources of an orchestration platform. These custom resources may be used in a consistent manner across many different types of compute infrastructures, such as any of data center(s) 10, virtual infrastructure managers (VIMs—e.g., OpenStack, VMWare) where the network is provided by the VIMs (e.g., Neutron, Virtual Distributed Switch, NSX-T/V), one or more instances of public cloud 33, managed Kubernetes services, or one or more VPCs of the instances of public cloud 33. Custom controllers of configuration nodes 30 implement infrastructure specific business logic to interact with the specific types of compute infrastructures. Consequently, creating a GSI 38 object to implement an integrated gateway service can be done using a similar workflow on any of the supported compute infrastructures. Based on the type of compute infrastructure for the compute infrastructure, the custom controller for the GSI 38 object semantically understands the compute infrastructure APIs and configuration data needed to orchestrate infrastructure resources to enable communication between the infrastructure and an network controller 24 network stack provided by SDN architecture system 200 that implements the GSI 38 object using network resources. Gateway service instance users will not need to understand the specifics of the orchestration of the different infrastructures and can use the same workflows across infrastructures, considerably simplifying configuration tasks.

A compute infrastructure may include its own instance of network controller 24 to configure virtual router data planes for virtual networks to connect workloads launched into the compute infrastructure. A management instance of SDN architecture system 200 operates to connect such a VPC to external networks, such as other VPCs and on-premises data centers.

SDN architecture system 200, configuring virtual router data planes for virtual networks to connect workloads, may support a rich set of routing protocols, including Multi-Protocol Border Gateway Protocol with Multiprotocol Label Switching (MP-BGP/MPLS), Ethernet Virtual Private Networking (EVPN)/VXLAN, and native Internet Protocol (IP) forwarding. This set of protocols is also supported by most compute infrastructures. In some cases, however, a compute infrastructure has specific requirements that are not met by SDN architecture system 200. In such cases, the GSI includes one or more CNRs 25, which understands a broader range of control and data-plane protocols than the rest of SDN architecture system 200 (i.e., network controller 24 configuring virtual routers 21 rather than a cRPD-based control plane). A CNR 25, as part of a GSI 38 object, is a gateway between network controller 24 virtual networks and the compute infrastructure and effectively operates as a network language translator between the two. Put another way, CNR 25 understands the network controller 24 networking language and the transit gateway protocols; CNR 25 therefore operates as a between the overlay networks (network controller 24 virtual networks) and the underlay network (VPC subnet(s)).

In this way, workloads (e.g., Pods and services) connected via virtual network configured in virtual routers managed by SDN architecture system 200 can communicate with workloads launched directly into the same VPC. The lifecycle management of a CNR 25 is fully integrated into the abstraction of a GSI 38 and managed by configuration nodes 30. As such, required configuration data for the CNR 25 is automatically generated by configuration nodes 30 based on the compute infrastructure being connected and also continuously reconciled to react to changes in the compute infrastructure or in SDN architecture system 200.

Figure 2:
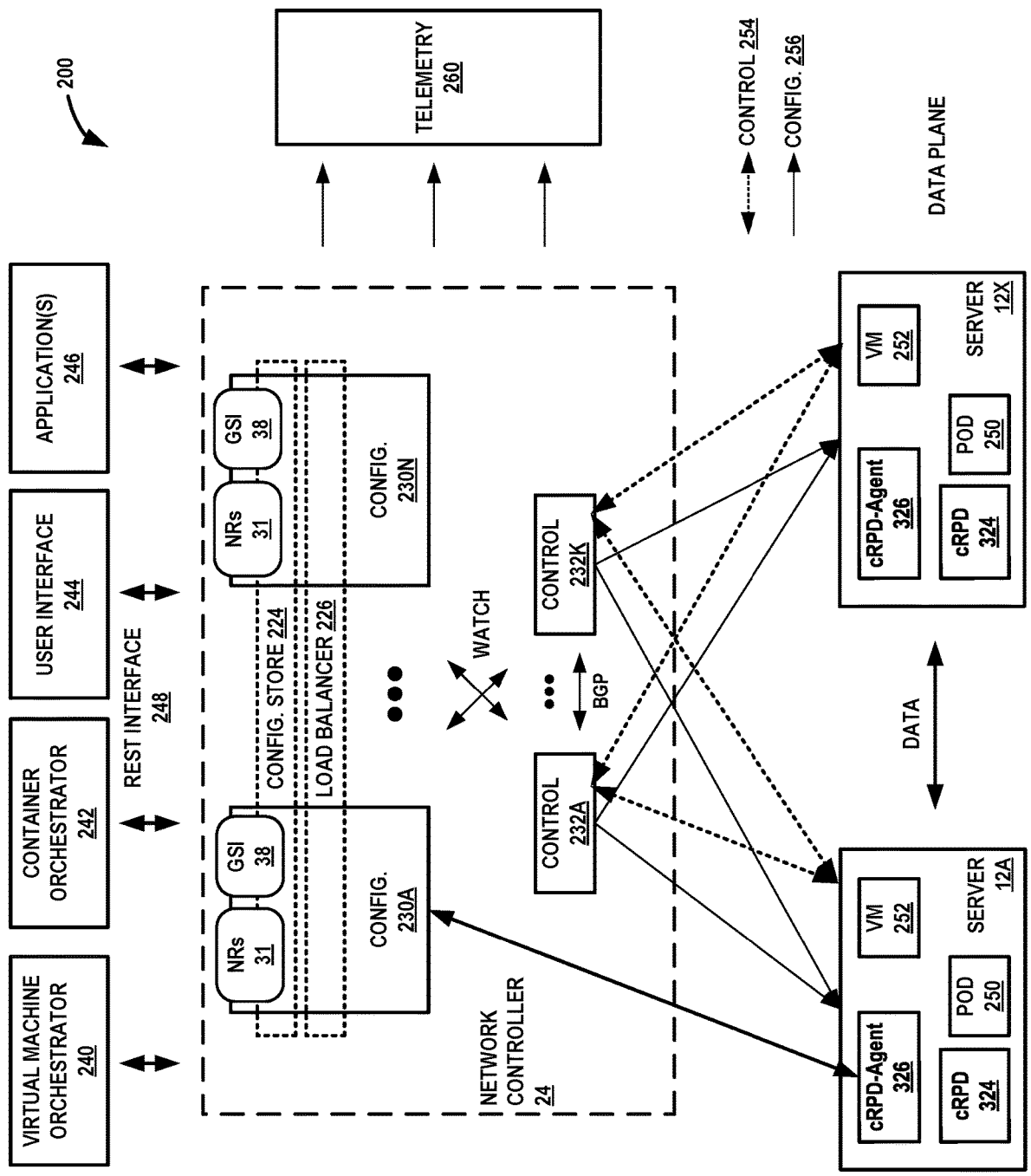
FIG. 2 is a block diagram illustrating an example of a cloud-native SDN architecture for cloud native networking with network resource custom resources, in accordance with techniques of this disclosure.

FIG. 2 is a block diagram illustrating an example of a cloud-native SDN architecture for cloud native networking with network resource custom resources, in accordance with techniques of this disclosure. SDN architecture system 200 is illustrated in a manner that abstracts underlying connectivity among the various components. In this example, network controller 24 of SDN architecture system 200 includes configuration nodes 230A-230N ("configuration nodes" or "config nodes" and collectively, "configuration nodes 230") and control nodes 232A-232K (collectively, "control nodes 232"). Configuration nodes 230 and control nodes 232 may represent examples implementations of configuration nodes 30 and control nodes 32 of FIG. 1, respectively. Configuration nodes 230 and control nodes 232, although illustrated as separate from servers 12, may be executed as one or more workloads on one or more of servers 12 and/or other servers.

Configuration nodes 230 may offer northbound, REpresentation State Transfer (REST) interfaces to support intent-driven configuration of SDN architecture 200. Example platforms and applications that may be used to push intents to configuration nodes 230 include virtual machine orchestrator 240 (e.g., Openstack), container orchestrator 242 (e.g., Kubernetes), user interface 242, or other one or more application(s) 246. In some examples, SDN architecture 200 has Kubernetes as its base platform.

SDN architecture 200 is divided into a configuration plane, control plane, and data plane, along with an optional telemetry (or analytics) plane. The configuration plane is implemented with horizontally scalable configuration nodes 230, the control plane is implemented with horizontally scalable control nodes 232, and the data plane is implemented with compute nodes.

At a high level, configuration nodes 230 uses configuration store 224 to manage the state of configuration resources of SDN architecture system 200. In general, a configuration resource (or more simply "resource") is a named object schema that includes data and/or methods that describe the custom resource, and an application programming interface (API) is defined for creating and manipulating the data through an API server. A kind is the name of an object schema. Configuration resources may include Kubernetes native resources, such as Pod, Ingress, Configmap, Service, Role, Namespace, Node, Networkpolicy, or LoadBalancer. In accordance with techniques of this disclosure, configuration resources also include custom resources, including Network Resources 31, which are used to extend the Kubernetes platform by defining an application program interface (API) that may not be available in a default installation of the Kubernetes platform. The custom resources include Network Resources 31, a collection of resources for configuring cRPDs 324 in servers 12. In the example of SDN architecture 200, custom resources generally may describe physical infrastructure, virtual infrastructure, configurations, and/or other resources of SDN architecture 200. As part of the configuration and operation SDN architecture 200, various custom resources may be instantiated. Instantiated resources (whether native or custom) may be referred to as objects or as instances of the resource, which are persistent entities in SDN architecture 200 that represent an intent (desired state) and the status (actual state) of the SDN architecture 200. Configuration nodes 230 provide an aggregated API for performing operations on (i.e., creating, reading, updating, and deleting) configuration resources of SDN architecture 200 in configuration store 224. Load balancer 226 represents one or more load balancer objects that load balance configuration requests among configuration nodes 230. Configuration store 224 may represent one or more etcd databases. Configuration nodes 230 may be implemented using Nginx.

SDN architecture 200 may provide networking for both Openstack and Kubernetes. Openstack uses a plugin architecture to support networking. With virtual machine orchestrator 240 that is Openstack, the Openstack networking plugin driver converts Openstack configuration objects to SDN architecture 200 configuration objects (resources). Compute nodes run Openstack nova to bring up virtual machines.

With container orchestrator 242 that is Kubernetes, SDN architecture 200 functions as a Kubernetes CNI. As noted above, Kubernetes native resources (pod, services, ingress, external load balancer, etc.) may be supported, and SDN architecture 200 may support custom resources for Kubernetes for advanced networking and security for SDN architecture 200.

Configuration nodes 230 offer REST watch to control nodes 232 to watch for configuration resource changes, which control nodes 232 effect within the compute infrastructure. Control nodes 232 receive configuration resource data from configuration nodes 230, by watching resources, and build a full configuration graph. A given one of control nodes 232 consumes configuration resource data relevant for the control nodes and for some custom resources, may distribute required configurations to the compute nodes (servers 12) via control interfaces 254 to the control plane aspect of virtual router 21 (i.e., the virtual router agent—not shown in FIG. 1). Any of compute nodes 232 may receive only a partial graph, as is required for processing. Control interfaces 254 may be XMPP. The number of configuration nodes 230 and control nodes 232 that are deployed may be a function of the number of clusters supported. To support high availability, the configuration plane may include 2N+1 configuration nodes 230 and 2N control nodes 232.

Control nodes 232 distributes routes among the compute nodes. Control node 232 uses internal Border Gateway Protocol (iBGP) to exchange routes among control nodes 232, and control nodes 232 may peer with any external BGP supported gateways or other routers. Control nodes 232 may use a route reflector.

Pods 250 and virtual machines 252 are examples of workloads that may be deployed to the compute nodes by virtual machine orchestrator 240 or container orchestrator 242 and interconnected by SDN architecture 200 using one or more virtual networks. cRPDs 324 may also be deployed using Pods, e.g., by container orchestrator 242.

Configuration nodes 230 provide, via an interface, cRPD-agents 326 with abstract Network Resource configurations for Network Resources 31. cRPD-agent 326 is software executing on the servers 12 to interface with control nodes 232 to receive abstract Network Resource configurations. Instances of a driver (not shown in FIG. 2) executing on servers 12 translate abstract Network Resource configurations to configuration data that conforms to the data model for cRPDs 324 and push the configuration data to the cRPDs 324.

Network controller 24 implements gateway service instance (GSI) 38, configurable using an intent-based model via interfaces of configuration nodes 230. GSI 38 may be another type of Network Resource 31 managed by configuration nodes 230.

Figure 3:
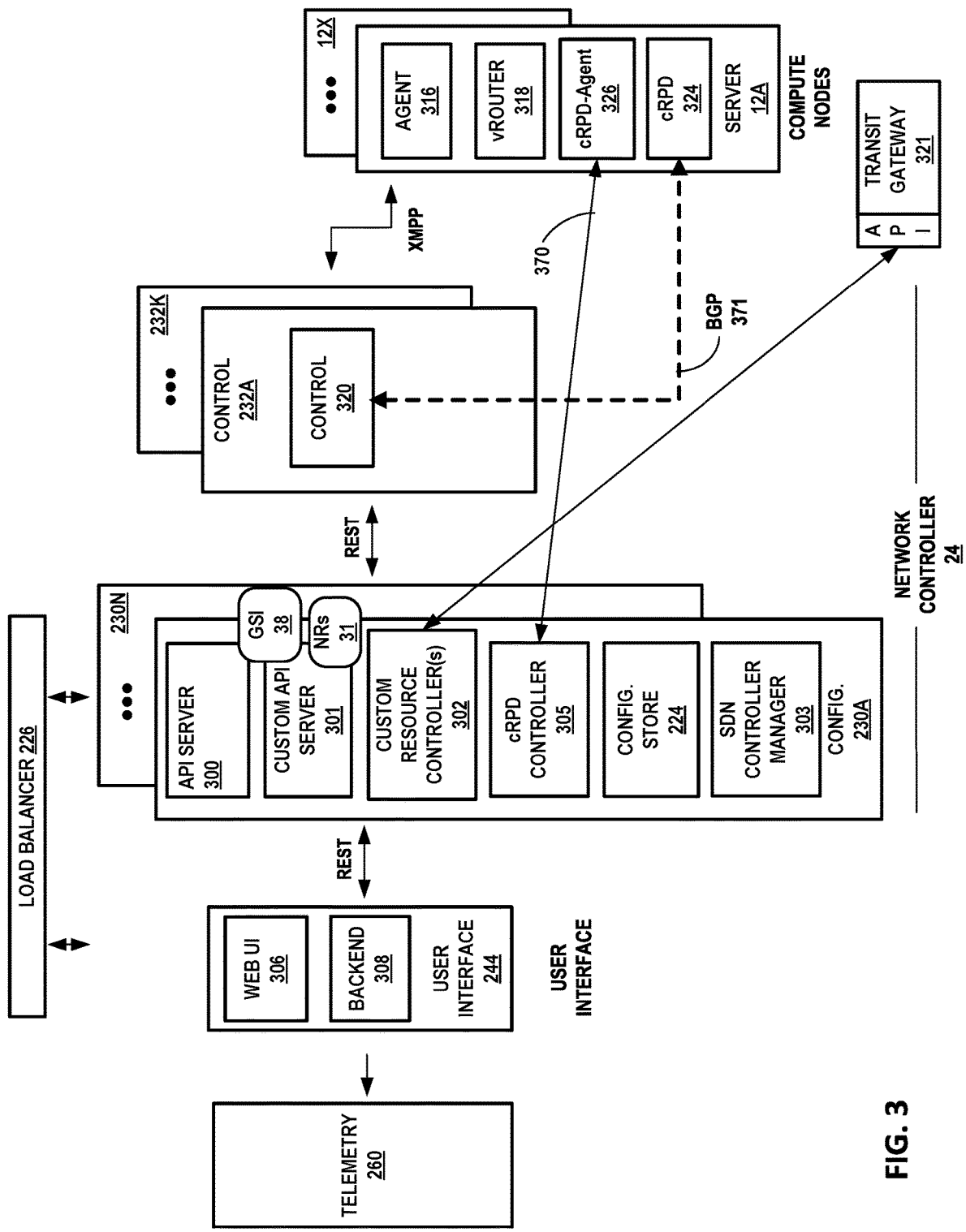
FIG. 3 is a block diagram illustrating another view of components of SDN architecture and in further detail, in accordance with techniques of this disclosure.

FIG. 3 is a block diagram illustrating another view of components of SDN architecture 200 and in further detail, in accordance with techniques of this disclosure. Configuration nodes 230, control nodes, 232, and user interface 244 are illustrated with their respective component microservices for implementing network controller 24 and SDN architecture 200 as a cloud-native SDN architecture. Each of the component microservices may be deployed to compute nodes.

FIG. 3 illustrates a single cluster divided into network controller 24, user interface 244, compute (servers 12), and telemetry 260 features. Configuration nodes 230 and control nodes 232 together form network controller 24.

Configuration nodes 230 may include component microservices API server 300 (or "Kubernetes API server 300"-corresponding controller 406 not shown in FIG. 3), custom API server 301, custom resource controller 302, and SDN controller manager 303 (sometimes termed "kube-manager" or "SDN kube-manager" where the orchestration platform for network controller 24 is Kubernetes). Contrail-kube-manager is an example of SDN controller manager 303. Configuration nodes 230 extend the API server 300 interface with a custom API server 301 to form an aggregation layer to support a data model for SDN architecture 200. SDN architecture 200 configuration intents may be custom resources, as described above.

Control nodes 232 may include component microservice control 320. Control 320 performs configuration distribution and route learning and distribution, as described above with respect to FIG. 2.

Compute nodes are represented by servers 12. Each compute node includes a virtual router agent 316 and virtual router forwarding component (vRouter) 318. Either or both of virtual router agent 316 and vRouter 318 may be component microservices. In general, virtual router agent 316 performs control related functions. Virtual router agent 316 receives configuration data from control nodes 232 and converts the configuration data to forwarding information for vRouter 318. Virtual router agent 316 may also performs firewall rule processing, set up flows for vRouter 318, and interface with orchestration plugins (CNI for Kubernetes and Nova plugin for Openstack). Virtual router agent 316 generates routes as workloads (Pods or VMs) are brought up on the compute node, and virtual router 316 exchanges such routes with control nodes 232 for distribution to other compute nodes (control nodes 232 distribute the routes among control nodes 232 using BGP). Virtual router agent 316 also withdraws routes as workloads are terminated. vRouter 318 may support one or more forwarding modes, such as kernel mode, DPDK, SmartNIC offload, and so forth. In some examples of container architectures or virtual machine workloads, compute nodes may be either Kubernetes worker/minion nodes or Openstack nova-compute nodes, depending on the particular orchestrator in use.

One or more optional telemetry node(s) 260 provide metrics, alarms, logging, and flow analysis. SDN architecture 200 telemetry leverages cloud native monitoring services, such as Prometheus, Elastic, Fluentd, Kinaba stack (EFK) and Influx TSDB. The SDN architecture component microservices of configuration nodes 230, control nodes 232, compute nodes, user interface 244, and analytics nodes (not shown) may produce telemetry data. This telemetry data may be consumed by services of telemetry node(s) 260. Telemetry node(s) 260 may expose REST endpoints for users and may support insights and event correlation.

Optional user interface 244 includes web user interface (UI) 306 and UI backend 308 services. In general, user interface 244 provides configuration, monitoring, visualization, security, and troubleshooting for the SDN architecture components.

Each of telemetry 260, user interface 244, configuration nodes 230, control nodes 232, and servers 12/compute nodes may be considered SDN architecture 200 nodes, in that each of these nodes is an entity to implement functionality of the configuration, control, or data planes, or of the UI and telemetry nodes. Node scale is configured during "bring up," and SDN architecture 200 supports automatic scaling of SDN architecture 200 nodes using orchestration system operators, such as Kubernetes operators.

Each of servers 12 may includes an instance of cRPD 324 and cRPD-agent 326. cRPD controller 305 is a type of custom resource controller for the Network Resources 31 to reconcile the intent to the cRPD 324 configuration state. Network Resources 31 are custom resources, e.g., Kubernetes custom API resources, and may correspond in some cases to configuration objects of the cRPD 324 configuration data model. Network Resources 31 may include, e.g., BGPRouter, GlobalSystemConfig, GlobalVrouterConfig, InstanceIP, RouteTarget, RoutingInstance, Subnet, VirtualMachineInterface, VirtualMachine, VirtualNetworkRouter, VirtualNetwork, VirtualRouter, and Pool. BGPRouter is a custom resource for defining and configuring a cRPD to operate as a BGP router. GlobalSystemConfig is a custom resource for configuring the cRPD system parameters. GlobalVrouterConfig is a custom resource for configuring virtual routers 318 in the cluster. InstanceIP is a custom resource for configuring IP addresses for virtual execution elements, such as containers/Pods or VMs. RouteTarget is a custom resource for configuring route targets for routing instances. RoutingInstance is a custom resource for configuring routing instances to, e.g., implement VRFs. Subnet is a custom resource for defining a network subnet. VirtualMachineInterface is a custom resource for configuring a virtual network interface between a virtual execution element and vRouter 318, e.g., any of VNIs 26. VirtualMachine is a custom resource for configuring virtual execution elements, such as containers/Pods or VMs. VirtualNetworkRouter is a custom resource for configuring virtual network routers. VirtualNetwork is a custom resource for configuring virtual networks. VirtualRouter is a custom resource for configuring vRouter 318 with, e.g., flow tables, firewall policies, or forwarding information that define the packet processing and forwarding operations of vRouter 318. Pool is a custom resource for managing a software licensing pool in the cluster.

The following Kubernetes specification data for a particular compute node "worker-0" shows that a cRPD is configured using a BGPRouter custom resource. Conceptually, worker-0 and more specifically the cRPD thereon operates a BGP Router:

```
apiVersion: core.x.net/v1
kind: BGPRouter
[ . . . ]
name: worker-0
[ . . . ]
spec:
  bgpRouterParameters:
    address: 10.0.2.3
    addressFamilies:
      family:
      - inet-vpn
        [ . . . ]
    authData: { }
    autonomousSystem: 64512
    identifier: 10.0.2.3
    port: 179
  bgpRouterReferences:
  [ . . . ]
    kind: BGPRouter
    name: worker-1
    namespace: crpd
  [ . . ]
```

The bgpRouterParameters are BGP/peer-group properties, and the bgpRouterReferences specifies a BGPRouter neighbor worker-1. cRPD controller 305 reconciles the state of the BGPRouter objects of Network Resources 31, and pushes abstract BGPRouter configuration data to cRPD-Agent 326, which translates the abstract BGPRouter configuration data to objects conforming to a data model for cRPD 324. The following configuration data has been translated in this way from the above specification for worker-0 BGPRouter and conforms to a configuration data model for Junos by JUNIPER NETWORKS, INC.:

```
advertise-from-main-vpn-tables;
vpn-apply-export;
group CNI {
    type internal;
    local-address 10.0.2.3;
    family inet-vpn {
        unicast;
    }
    family inet6-vpn {
        unicast;
    }
    family evpn {
        signaling;
    }
    export pol-set-udp-encaps;
    local-as 64512;
    neighbor 10.0.2.2;
    neighbor 10.0.2.4; #### worker-1 IP address
}
multihop {
    ttl 255;
}
```

As seen above from the Network Resource (BGPRouter) specification and the configuration data for an example cRPD 324, cRPD-Agent 326 effectively translates the abstract Network Resource data to usable configuration data for cRPD 324. cRPD-Agent 326 may push the above configuration data to cRPD 324 via an interface, which can also be read from cRPD 324 via a CLI.

The following command line commands direct kubectl to pull specification data used for configuring routing instances in cRPDs 324 in order to implement a virtual network "default-podnetwork":

```
crpd@controller-0: ~$ kubectl get routinginstances
    default-podnetwork -n SDN-controller-kubemanager-
    cluster3-local-contrail -o yaml
.: { }
status:
    defaultRouteTargetReference:
[ . . . ]
    target-64512-8000003
    kind: RouteTarget
    name: target-64512-8000003
[ . . . ]
crpd@controller-0: ~$ kubectl get routetargets.x.net tar-
    get-64512-8000003
NAME STATE AGE
target-64512-8000003 Success 32h
crpd@controller-0: ~$ kubectl get virtualnetworks -n
    SDN-controller-kubemanager-cluster3-local-contrail
    default-podnetwork -o yaml
[ . . . ]
    v4SubnetReference:
[ . . . ]
    default-podnetwork-pod-v4-subnet crpd@controller-0:
        ~$ kubectl get Subnet -A
```

NAMESPACE NAME CIDR USAGE STATE AGE
SDN-controller-kubemanager-cluster3-local-contrail
default-podnetwork-pod-v4-subnet 10.236.64.0/18 0.05%
Success 32h
   etc. . . .

Whereas in a centralized model for a SDN/network controller, the network controller programs a virtual router with the appropriate VRF forwarding tables to implementing a routing instance, network controller 24 instead exposes Network Resources 31 for configuring cRPD 324 for decentralized route sharing among cRPDs 324 via routing protocols (e.g., BGP). RouteTarget and Subnet are examples of Network Resources 31 and may be used to configure a routing instance on cRPD 324.

As in the previous example, cRPD controller 305 reconciles the states of the objects the Subnet and RouteTarget of Network Resources 31 and pushes abstract Network Resource configuration data to cRPD-Agent 326, which translates the abstract Network Resource configuration data to objects conforming to a data model for cRPD 324. The following configuration data for routing-instances on a cRPD 324 has been translated in this way from the above specification for worker-0 and conforms to a configuration data model for Junos by JUNIPER NETWORKS, INC.:

```
default-podnetwork {
    instance-type vrf;
    [ . . . . ]
        static {
            route 10.236.65.0/32 {
                qualified-next-hop 10.236.65.0 {
                    interface vethd01d464e;
                }
            }
            route 10.236.65.1/32 {
                qualified-next-hop 10.236.65.1 {
                    interface veth29a00659;
                }
            }
        }
    }
    interface vethd01d464e;
    interface veth29a00659;
    vrf-target target:64512:8000003;
    vrf-table-label;
}
``` cRPD 324 has been configured by configuration nodes 230 via cRPD-agent 326 to implement default-podnetwork using a VRF instance that has been configured with a number of static routes for its two veth interfaces and the route target value as specified in the YAML defining corresponding Network Resources 31.

Custom API server is extended to support Network Resources 31, and a custom resource controller, cRPD controller 305, works to reconcile the state of cRPD 324 to Network Resources 31 configuration objects. More specifically, cRPD controller 305 interfaces via interface 370 to send abstract Network Resource 31 configurations to cRPD-Agent 326, which translates the abstract Network Resource 31 configurations to configuration data that conforms to a data model for cRPD 324 and pushes the configuration data to cRPD 324 to configure the CNR control plane. Interface 370 may be an RPC interface, such as a gRPC interface.

Unlike vRouter 318, which is controlled by one of control nodes 232, cRPD 324 can be independent of the centralized aspects of the SDN architecture in which control nodes 232 manage routing information and push routes to servers for underlay and overlay routing within the cluster. Instead, decentralized cRPDs 324 on multiple servers 12 operate much as control planes for physical routers: once configured by cRPD controller 305 with intents expressed using Network Resources 31, the cRPDs 324 execute routing protocols to advertise reachability to one another, set up virtual private networks, and program corresponding vRouters 318 to forward traffic among servers 12 and even outside the cluster to effectuate the user intents for networking. The user can therefore leverage a configuration framework for an orchestration platform to configure cRPDs 324 that implements a control plane for a containerized network router in a cloud-native SDN architecture, at least in some cases without needing to individually configure each of cRPDs 324 and or even have a working knowledge of the cRPD configuration data model.

In general, use of cRPDs 324 in this context of SDN architecture 400 fits with a distributed routing plane approach. Each compute node (i.e., servers 12) runs an instance of CRPD 324, while a centralized route reflector (not shown) relays routing protocol messages among nodes. Intelligence is distributed among the various compute nodes/cRPD instances. Configuration data for the various nodes can be redundant (synchronized), mutatis mutandis, and the route reflector can be simple.

Figure 4A:
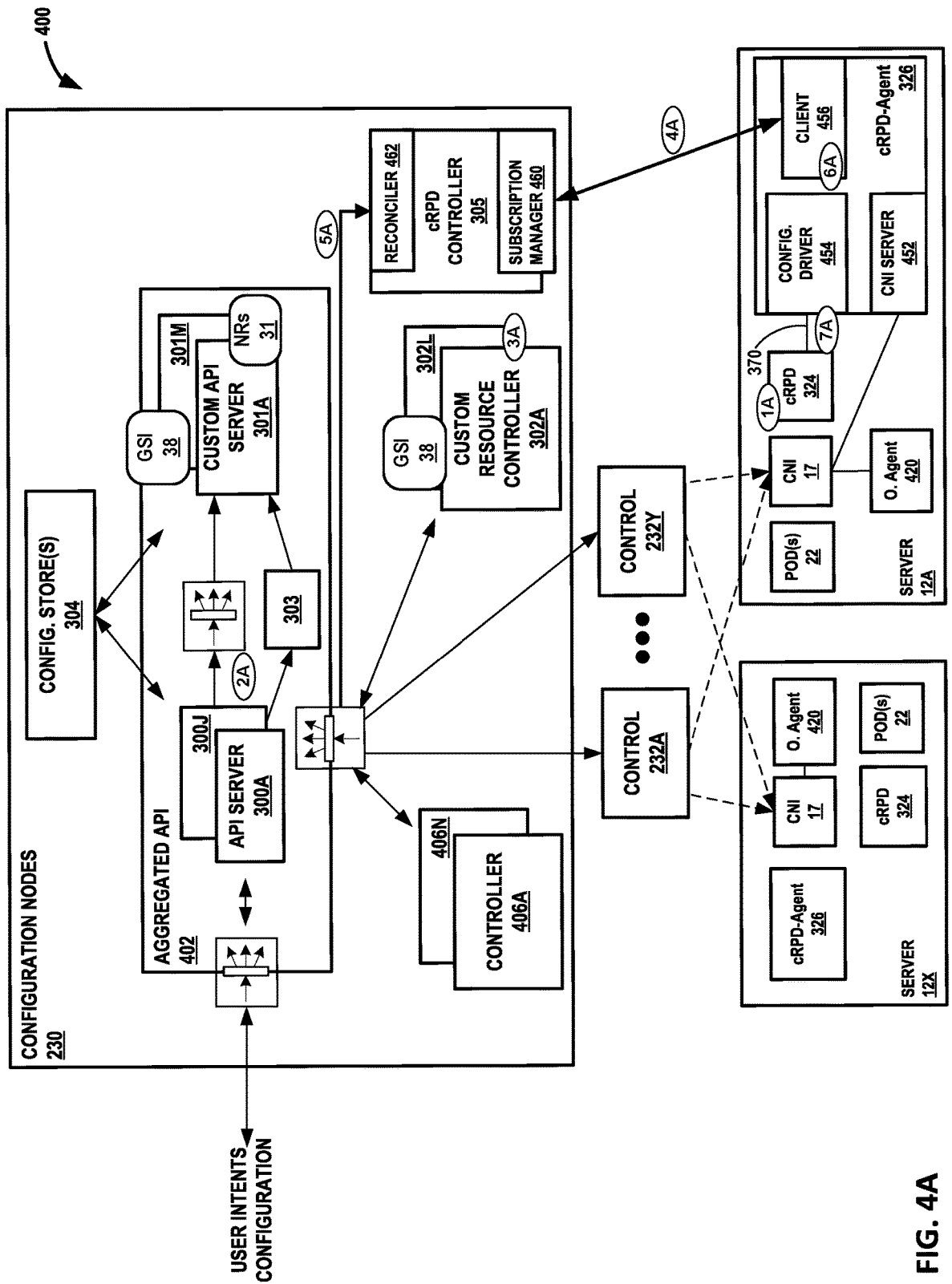
FIGS. 4A-4B are block diagrams illustrating example components of an SDN architecture, in accordance with techniques of this disclosure.
Figure 4B:
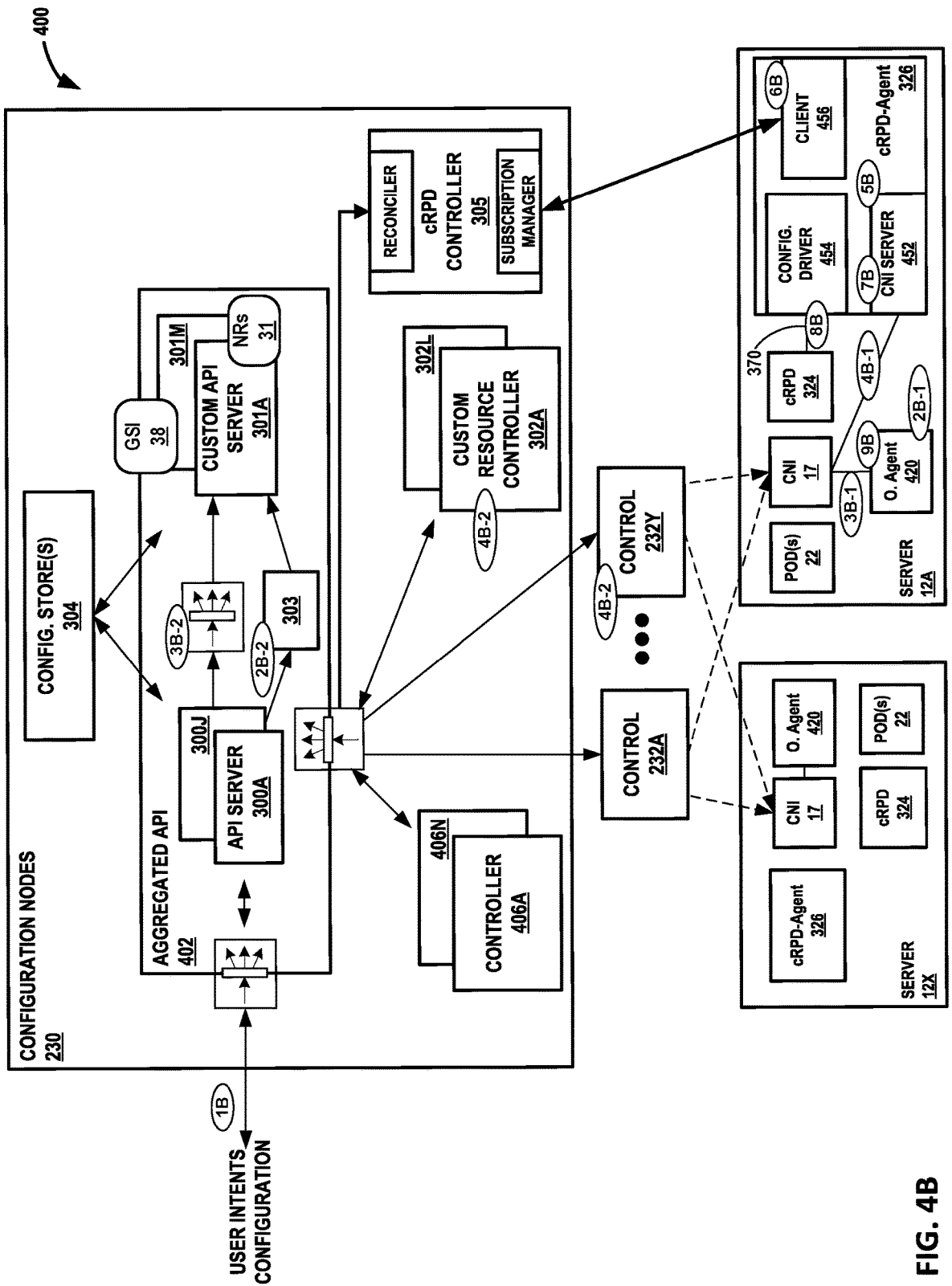

FIGS. 4A-4B are block diagrams illustrating example components of an SDN architecture, in accordance with techniques of this disclosure. In this example, SDN architecture 400 extends and uses Kubernetes API server for network resource configuration objects that realize user intents for the network configuration. Such configuration objects, in Kubernetes terminology, are referred to as custom resources and when persisted in SDN architecture are referred to simply as objects. Network resource configuration objects are mainly user intents (e.g., Virtual Networks, BGPaaS, Network Policy, Service Chaining, etc.).

SDN architecture 400 configuration nodes 230 may uses Kubernetes API server for configuration objects.

Kubernetes provides two ways to add custom resources to a cluster:

Custom Resource Definitions (CRDs) are simple and can be created without any programming.

API Aggregation requires programming but allows more control over API behaviors, such as how data is stored and conversion between API versions.

Aggregated APIs are subordinate API servers that sit behind the primary API server, which acts as a proxy. This arrangement is called API Aggregation (AA). To users, it simply appears that the Kubernetes API is extended. CRDs allow users to create new types of resources without adding another API server. Regardless of how they are installed, the new resources are referred to as Custom Resources (CR) to distinguish them from native Kubernetes resources (e.g., Pods). CRDs were used in the initial Config prototypes. The architecture may use the API Server Builder Alpha library to implement an aggregated API. API Server Builder is a collection of libraries and tools to build native Kubernetes aggregation extensions.

Usually, each resource in the Kubernetes API requires code that handles REST requests and manages persistent storage of objects. The main Kubernetes API server 300 (implemented with API server microservices 300A-300J) handles native resources and can also generically handle custom resources through CRDs. Aggregated API 402 represents an aggregation layer that extends the Kubernetes API server 300 to allow for specialized implementations for custom resources by writing and deploying custom API server 301 (using custom API server microservices 301A-

301M). The main API server 300 delegates requests for the custom resources to custom API server 301, thereby making such resources available to all of its clients.

In this way, API server 300 (e.g., kube-apiserver) receives the Kubernetes configuration objects, native objects (pods, services) and custom resources defined in accordance with techniques of this disclosure. Custom resources for SDN architecture 400 may include network resource configuration objects that are instances of the custom resources and, when an intended state of the configuration object in SDN architecture 400 is realized, implement an intended network configuration of SDN architecture 400. Custom resources may correspond to configuration schemas traditionally defined for network configuration but that, according to techniques of this disclosure, are extended to be manipulable through aggregated API 402. Such custom resources may be alternately termed and referred to herein as "custom resources for SDN architecture configuration." Each of the custom resources for SDN architecture configuration may correspond to a type of configuration object conventionally exposed by an SDN controller, but in accordance with techniques described herein, the configuration objects are exposed using custom resources and consolidated along with Kubernetes native/built-in resources. These network resource configuration objects may include virtual network (VirtualNetwork), bgp-as-a-service (BGPaaS), subnet (Subnet), virtual router (VirtualRouter), service instance, project, physical interface, logical interface, node, network ipam, floating ip (IPinstance), alarm, alias ip, access control list, firewall policy, firewall rule, network policy, route target (RouteTarget), routing instance (RoutingInstance), etc. Consequently, SDN architecture system 400 supports a unified intent model, exposed by aggregated API 402, that is realized by controllers 406A-406N (e.g., Kubernetes controllers) and by custom resource controllers 302 (shown in FIGS. 4A-4B as component microservices 302A-302L), including cRPD controller 305, that works to reconcile the actual state of the compute infrastructure including network elements with the intended state.

Network controller 24 implements gateway service instance (GSI) 38, configurable using an intent-based model via interfaces of configuration nodes 230. GSI 38 may be another type of Network Resource 31 managed by configuration nodes 230. Custom API server 301 is extended to support GSI 38, and one or more custom resource controller(s) 302 and cRPD controller 305 work to reconcile the state of network resources (e.g., Transit Gateway 321, a CNR including a cRPD 324 instance) with corresponding GSI 38 configuration objects. More specifically, cRPD controller 305 interfaces interface 370 to send abstract GSI 38 configurations to cRPD-Agent 326, which translates the abstract GSI 38 configurations to configuration data that conforms to a data model for cRPD 324 and pushes the configuration data to cRPD 324 to configure the CNR. Interface 370 may be an RPC interface, such as a gRPC interface. A custom resource controller 302 with a transit gateway reconciler 1382 works to reconcile the intended state of Transit Gateway 321 with a transit gateway object of GSI 38, the intended state specified by a manifest in some instances. Also, one or more custom resource controller(s) 302 interface to compute infrastructure APIs to send abstract GSI 38 configurations to configure compute infrastructure resources to facilitate connectivity.

API server 300 aggregation layer sends API custom resources to their corresponding, registered custom API server 301. There may be multiple custom API servers/custom resource controllers to support different kinds of custom resources. Custom API server 301 handles custom resources for SDN architecture configuration, including Network Resources 31, and writes to configuration store(s) 304, which may be etcd. Custom API server 301 may expose an SDN controller identifier allocation service that may be required by custom resource controller 302.

Figure 8:
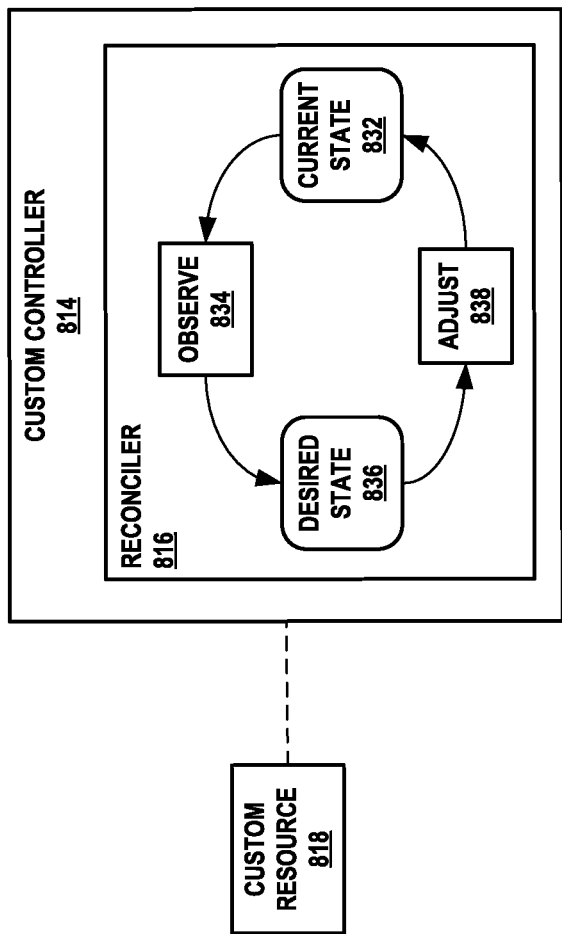
FIG. 8 is a block diagram illustrating an example of a custom controller for custom resource(s) for SDN architecture configuration, according to techniques of this disclosure.

Custom resource controller(s) 302 and cRPD controller 305 start to apply business logic to reach the user's intention provided with user intents configuration. The business logic is implemented as a reconciliation loop. FIG. 8 is a block diagram illustrating an example of a custom controller for custom resource(s) for SDN architecture configuration, according to techniques of this disclosure. Customer controller 814 may represent an example instance of custom resource controller 302. In the example illustrated in FIG. 8, custom controller 814 can be associated with custom resource 818. Custom resource 818 can be any custom resource for SDN architecture configuration. Custom controller 814 can include reconciler 816 that includes logic to execute a reconciliation loop in which custom controller 814 observes 834 (e.g., monitors) a current state 832 of custom resource 818. In response to determining that a desired state 836 does not match a current state 832, reconciler 816 can perform actions to adjust 838 the state of the custom resource such that the current state 832 matches the desired state 836. A request may be received by API server 300 and relayed to custom API server 301 to change the current state 832 of custom resource 818 to desired state 836.

In the case that API request is a create request for a custom resource, reconciler 816 can act on the create event for the instance data for the custom resource. Reconciler 816 may create instance data for custom resources that the requested custom resource depends on. As an example, an edge node custom resource may depend on a virtual network custom resource, a virtual network interface custom resource, and an IP address custom resource. In this example, when reconciler 816 receives a create event on an edge node custom resource, reconciler 816 can also create the custom resources that the edge node custom resource depends upon, e.g., a virtual network custom resource, a virtual network interface custom resource, and an IP address custom resource.

By default, custom resource controllers 302 are running an active-passive mode and consistency is achieved using master election. When a controller pod starts it tries to create a ConfigMap resource in Kubernetes using a specified key. If creation succeeds, that pod becomes master and starts processing reconciliation requests; otherwise it blocks trying to create ConfigMap in an endless loop.

Figure 9:
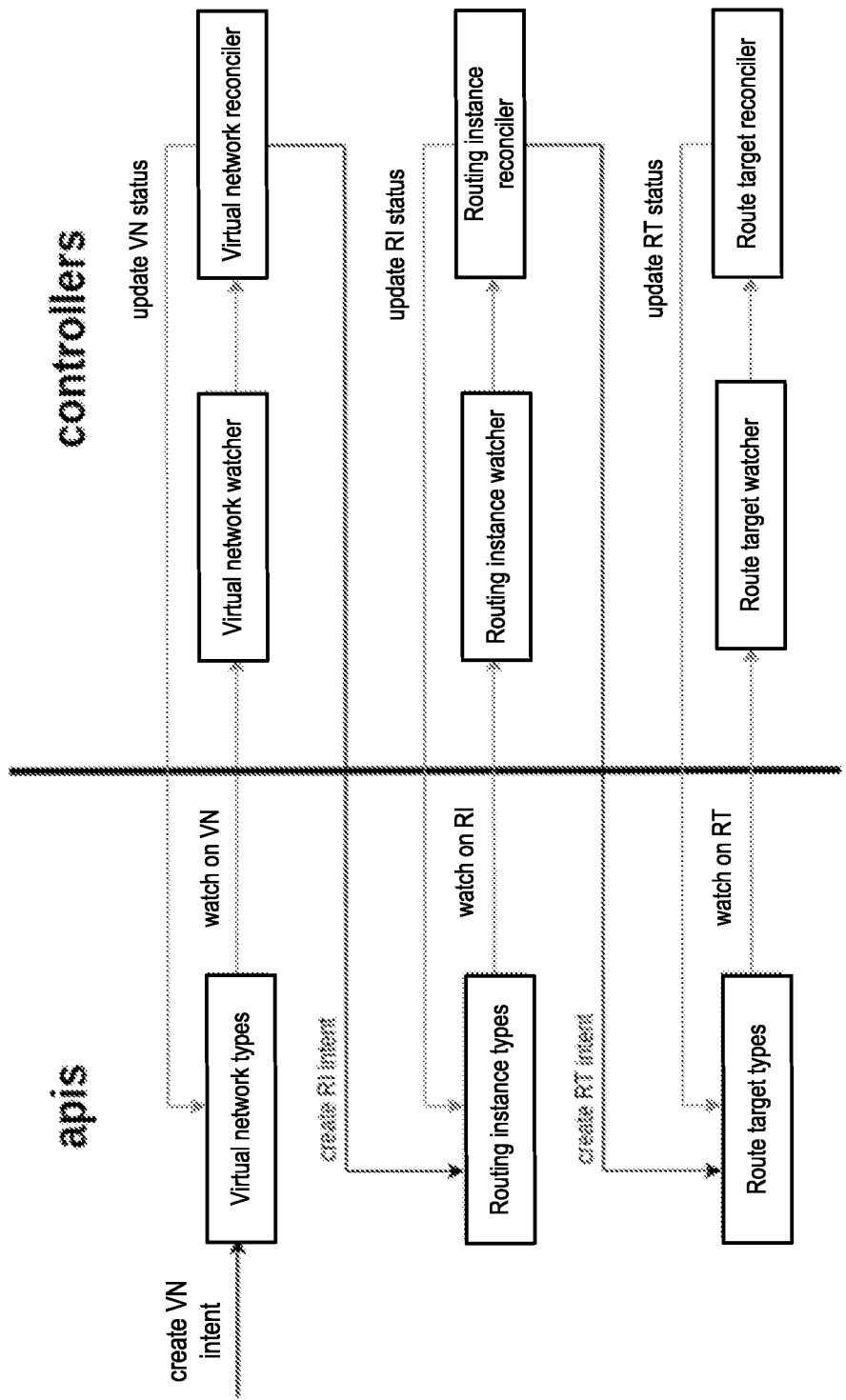
FIG. 9 is a block diagram illustrating an example flow of creation, watch, and reconciliation among custom resource types that have dependencies on different custom resource types.

Any of custom resource controllers 302 may track the status of custom resources it creates. For example, a Virtual Network (VN) creates a Routing Instance (RI) which creates a Route Target (RT). If the creation of a route target fails, the routing instance status is degraded, and because of this the virtual network status is also degraded. Custom resource controller 300 may therefore output a custom message indicating the status(es) of these custom resources, for troubleshooting. An example flow of creation, watch, and reconciliation among custom resource types that have dependencies on different custom resource types is illustrated in FIG. 9.

cRPD controller 305 is a custom resource controller, similar to custom resource controllers 302, that reconciles intended state for Network Resources 31 or GSIs 38 to actual state of cRPDs 324. Reconciler 462 watches for changes on Network Resources 31 or GSIs 38 exposed by one or more of custom API servers 301, and applies logic developed to reconcile the state of cRPDs 324 to Network Resources 31 or GSIs 38.

The configuration plane as implemented by configuration nodes 230 has high availability. Configuration nodes 230 may be based on Kubernetes, including the kube-apiserver service (e.g., API server 300) and the storage backend etcd (e.g., configuration store(s) 304). Effectively, aggregated API 402 implemented by configuration nodes 230 operates as the front end for the control plane implemented by control nodes 232. The main implementation of API server 300 is kube-apiserver, which is designed to scale horizontally by deploying more instances. As shown, several instances of API server 300 can be run to load balance API requests and processing, Configuration store(s) 304 may be implemented as etcd. Etcd is a consistent and highly available key value store used as the Kubernetes backing store for cluster data.

In the example of FIGS. 4A-4B, servers 12 of SDN architecture 400 each include an orchestration agent 420 and a containerized (or "cloud-native") routing protocol daemon 324. These components of SDN architecture 400 are described in further detail below.

SDN controller manager 303 may operate as an interface between Kubernetes core resources (Service, Namespace, Pod, Network Policy, Network Attachment Definition) and the extended SDN architecture resources (VirtualNetwork, RoutingInstance, etc.). SDN controller manager 303 watches the Kubernetes API for changes on both Kubernetes core and the custom resources for SDN architecture configuration and, as a result, can perform CRUD operations on the relevant resources. Some Kubernetes core resources and some extended SDN architecture resources may apply to cRPDs. Network Resources 31 are primarily extended SDN architecture resources as well as custom resources for cRPD.

In some examples, SDN controller manager 303 is a collection of one or more Kubernetes custom controllers. In some examples, in single or multi-cluster deployments, SDN controller manager 303 may run on the Kubernetes cluster(s) it manages SDN controller manager 303 listens to the following Kubernetes objects for Create, Delete, and Update events:
Pod
Service
NodePort
Ingress
Endpoint
Namespace
Deployment
Network Policy When these events are generated, SDN controller manager 303 creates appropriate SDN architecture objects, which are in turn defined as custom resources for SDN architecture configuration. In response to detecting an event on an instance of a custom resource, whether instantiated by SDN controller manager 303 and/or through custom API server 301, control node 232 obtains configuration data for the instance for the custom resource and configures a corresponding instance of a configuration object in SDN architecture 400.

For example, SDN controller manager 303 watches for the Pod creation event and, in response, may create the following SDN architecture objects: VirtualMachine (a workload/pod), VirtualMachineInterface (a virtual network interface), and an InstanceIP (IP address). Control nodes 232 may then instantiate the SDN architecture objects, in this case, in a selected compute node.

As an example, based on a watch, control node 232A may detect an event on an instance of first custom resource exposed by customer API server 301A, where the first custom resource is for configuring some aspect of SDN architecture system 400 and corresponds to a type of configuration object of SDN architecture system 400. For instance, the type of configuration object may be a firewall rule corresponding to the first custom resource. In response to the event, control node 232A may obtain configuration data for the firewall rule instance (e.g., the firewall rule specification) and provision the firewall rule in a virtual router for server 12A. Configuration nodes 230 and control nodes 232 may perform similar operations for other custom resources with corresponding types of configuration objects for the SDN architecture, such as GSIs 38 (or resources therein), virtual network (VirtualNetwork), bgp-as-a-service (BGPaaS), subnet (Subnet), virtual router (VirtualRouter), service instance, project, physical interface, logical interface, node, network ipam, floating ip (IPinstance), alarm, alias ip, access control list, firewall policy, firewall rule, network policy, route target (RouteTarget), routing instance (RoutingInstance), etc.

SDN architecture 400 also manages instances of cRPD 324 operating in a decentralized fashion to disseminate routing information via routing protocols. The configuration objects are therefore extended to include objects in a legacy data model for the cRPDs 324, and these configuration objects are exposed and manipulated via custom API servers 301. The custom controller, cRPD controller 305, reconciles the intended states of Network Resources 31 or GSIs 38 to actual state of cRPDs 324. Example processes for using Network Resources 31 or GSIs 38 to configure cRPDs 324 using the various components of FIGS. 4A-4B are now described.

Control nodes 320 communicate via MP-BGP 371 with cRPDs 324 of CNRs to exchange routing information to facilitate connectivity among compute infrastructure workloads and workloads connected via virtual networks configured in virtual routers managed by network controller 24. Such virtual networks are also referred to as "SDN controller virtual networks" in this disclosure.

FIG. 4A includes steps for Startup/BGPRouter watch. In FIG. 4A, an init container (not shown) for the Pod that includes cRPD 324 sends BGPRouter and VirtualRouter resource creation requests to API servers 300 (1A), which relays (2A) these to custom API servers 301 that expose these as BGPRouter and VirtualRouter as Network Resources 31 and stores the created resources to configuration store(s) 304. Init container are specialized containers that run before app containers in a Pod and can contain utilities or setup scripts that are not included in an application.

Custom resource controllers 302 for SDN architecture 400 may reconcile aspects of BGPRouter and VirtualRouter resources to the virtual router (not shown) for server 12A (3A).

cRPD-Agent 326 starts (in some cases as a container included in a Pod with cRPD 324), and subscription client 456 sends, to subscription manager 460, a subscription request for the BGPRouter resource and for all defined BGPRouter references (that is, neighbors of the CNR of server 12A) (4A). Reconciler 462 watches for any changes to BGPRouter and referenced BGPRouter resources on the aggregated API 402 (5A). Subscription client 456 sends the abstract BGPRouter and referenced BGPRouter configuration data to configuration driver 454 for cRPD 324 (6A). Configuration driver 454 transforms the BGPRouter configuration into configuration data that conforms to an interface and data model (e.g., XML) for cRPD 324 and sends the transformed configuration data to cRPD 324 via interface 370 (7A). Interface 370 may be an RPC interface, such as a gRPC interface.

FIG. 4B includes steps for deploying a new Pod. A similar process may be used for other container deployment schemes or for VMs. This Pod will be for an application workload rather than for the cRPD. In FIG. 4B, API servers 300 receive a Pod creation request (1B). API servers 300 deploy the requested Pod by sending Pod creation instructions to the orchestration agent 420 on the server 12A (in this example) that is to host the Pod (2B-1). As this is being done, SDN controller manager 303 watches (having previously placed a watch on Pod creation) the Pod creation and generates and sends creation request for custom resources for SDN architecture configuration to custom API servers 300 (2B-2). These may include VirtualMachine, VirtualMachineInterface, and InstanceIP for the Pod, which can be used to attach an addressable virtual network interface for the Pod into the virtual router data plane. API servers 300 may forward the Pod creation request to custom API servers 301, which validate and persist in configuration stores 304 (3B-2).

Orchestration agent 420 executes CNI 17 with the Add command and sends the Pod name, namespace, and a name for the virtual network interface (3B-1). These identifiers will have been received by orchestration agent 420 from API servers 300. Custom resource controllers 302 using control node 232Y reconcile the newly created custom resources for SDN architecture configuration (VirtualMachine, VirtualMachineInterface, and InstanceIP) on server 12A (4B-2).

CNI 17 sends a request for IP address information to CNI server 452 of cRPD-agent 326 (4B-1). CNI server 452 forwards the request to subscription client 456 (5B), which pulls the relevant resources for SDN architecture configuration (e.g., VirtualMachineInterface, VirtualNetwork, Subnet, RoutingInstance, and InstanceIP) and subscribes to changes on VirtualMachineInterface and VirtualNetworkResources to cRPD controller 305 (6B). CNI server 452 sends IP address information to CNI 17 (in response to the request at 4B-1), and CNI 17 creates the virtual network interface for the Pod and IP address(es); CNI server 452 also invokes configuration driver 454 to generate configuration data for these various custom resources that conforms to the configuration data model for cRPD 324 (7B). Configuration driver 454 sends the translated configuration data to cRPD 324 to configure cRPD 324 (8B). CNI 17 signals orchestration agent 420 that network setup is successful (9B).

The techniques for leveraging a configuration framework for an orchestration platform to configure software that implements a control plane for a containerized network router in a cloud-native SDN architecture, described herein, may provide additional features. These may include separation of duties—VRFs managed using VirtualNetworks custom resources and Interfaces managed indirectly by Pods (and not VRFs defined in Pod annotations). The techniques may facilitate auto-assignment of software resources such as IPs, RTs, VNIs (though these can alternatively be statically defined). The techniques may facilitate Kubernetes native abstraction for where Kubernetes is the orchestration platform, with kubectl used to create BGP and VRF configuration in the cRPD. The techniques may facilitate fully intent-driven configuration by reconciling actual state to intended state—changes to BGPRouter or VirtualNetwork custom resources for SDN architecture configuration are automatically applied—for examples, changes to a configuration of a BGPRouter causes all cRPD/BGP routers having this neighbor to have their configurations automatically adjusted. Techniques may facilitate stateless configuration on the cRPDs (no diff, config on cRPD always replaced with full intended state), with some relevant state being subscriber mapping. Core primitives for SDN architecture configuration previously used for configuring virtual routers are relevant for cRPD (router control plane) configuration as well.

In some examples, the techniques may further include a license controller for dynamically updating licenses of cRPDs; a forwarding mode switch between different data plane encapsulation types: e.g., MPLS, MPLSoUDP, EVPN/VxLAN; control nodes 232 can be used as route reflectors by/for cRPDs; a hybrid mode in which a primary Pod interface is served by control nodes 232 while a secondary Pod interface is served by cRPD; cRPD as an in-cluster SDN gateway for control nodes 232; BGP-as-a-Service (BGPaaS) for cRPDs; or alternative, hybrid control nodes 232 and cRPDs architectures.

Figure 5:
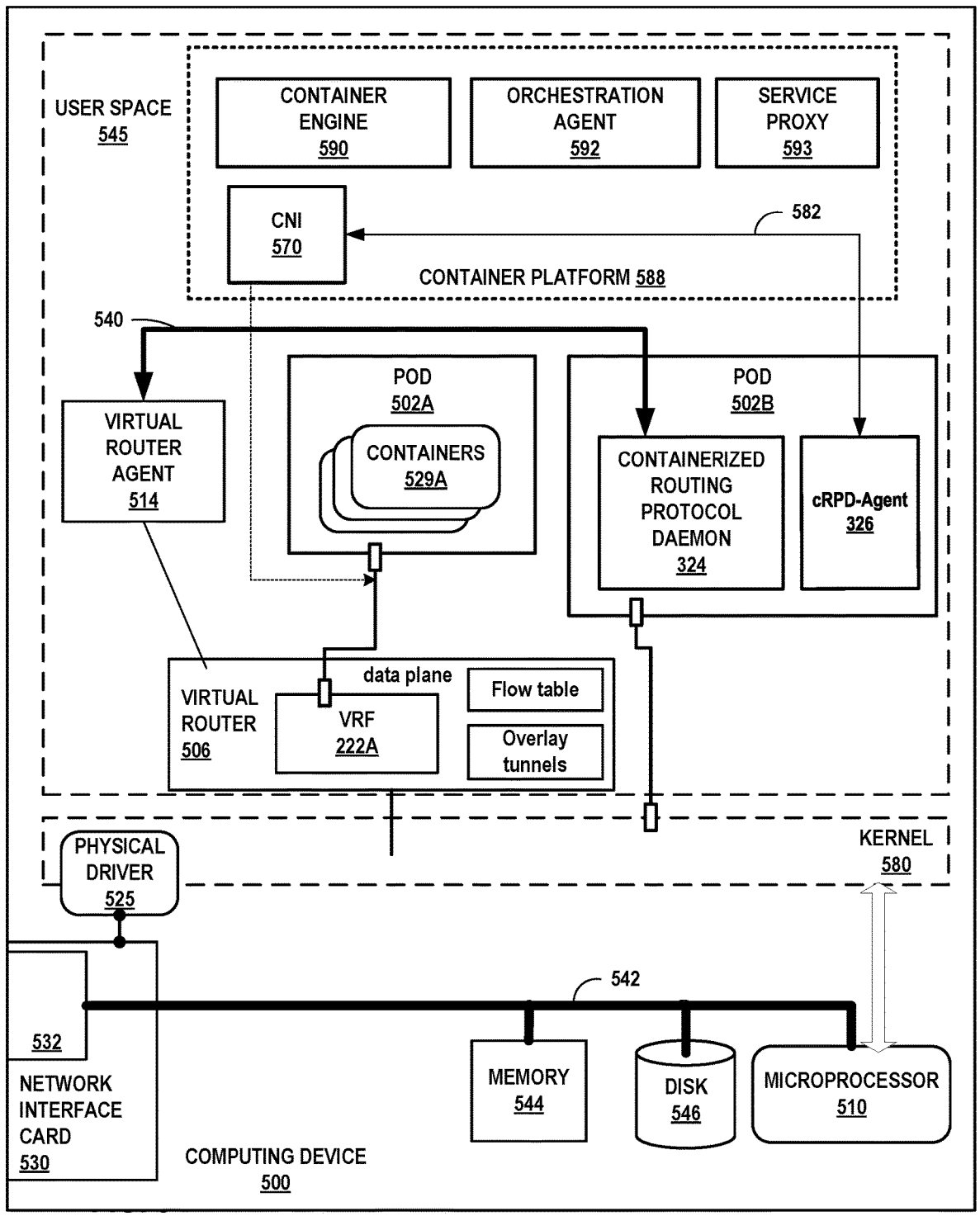
FIG. 5 is a block diagram of an example computing device, according to techniques described in this disclosure.

FIG. 5 is a block diagram of an example computing device, according to techniques described in this disclosure. Computing device 500 of FIG. 2 may represent a real or virtual server and may represent an example instance of any of servers 12 and may be referred to as a compute node, master/minion node, or host. Computing device 500 includes in this example, a bus 542 coupling hardware components of a computing device 500 hardware environment. Bus 542 couples network interface card (NIC) 530, storage disk 546, and one or more microprocessors 210 (hereinafter, "microprocessor 510"). NIC 530 may be SR-IOV-capable. A front-side bus may in some cases couple microprocessor 510 and memory device 524. In some examples, bus 542 may couple memory device 524, microprocessor 510, and NIC 530. Bus 542 may represent a Peripheral Component Interface (PCI) express (PCIe) bus. In some examples, a direct memory access (DMA) controller may control DMA transfers among components coupled to bus 542. In some examples, components coupled to bus 542 control DMA transfers among components coupled to bus 542.

Microprocessor 510 includes processing circuitry for executing instructions. Microprocessor 510 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 546 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 510.

Main memory 524 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 524 provides a physical address space composed of addressable memory locations.

Network interface card (NIC) 530 includes one or more interfaces 532 configured to exchange packets using links of an underlying physical network. Interfaces 532 may include a port interface card having one or more network ports. NIC 530 may also include an on-card memory to, e.g., store packet data. Direct memory access transfers between the NIC 530 and other devices coupled to bus 542 may read/write from/to the NIC memory.

Memory 524, NIC 530, storage disk 546, and microprocessor 510 may provide an operating environment for a software stack that includes an operating system kernel 580 executing in kernel space. Kernel 580 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by the hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 580 provides an execution environment for one or more processes in user space 545.

Kernel 580 includes a physical driver 525 to use the network interface card 530. Network interface card 530 may also implement SR-IOV to enable sharing the physical network function (I/O) among one or more virtual execution elements, such as containers 529A or one or more virtual machines (not shown in FIG. 5). Shared virtual devices such as virtual functions may provide dedicated resources such that each of the virtual execution elements may access dedicated resources of NIC 530, which therefore appears to each of the virtual execution elements as a dedicated NIC. Virtual functions may represent lightweight PCIe functions that share physical resources with a physical function used by physical driver 525 and with other virtual functions. For an SR-IOV-capable NIC 530, NIC 530 may have thousands of available virtual functions according to the SR-IOV standard, but for I/O-intensive applications the number of configured virtual functions is typically much smaller.

Computing device 500 may be coupled to a physical network switch fabric that includes an overlay network that extends switch fabric from physical switches to software or "virtual" routers of physical servers coupled to the switch fabric, including virtual router 506. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 500 of FIG. 5, virtual router 506 executes within user space as a DPDK-based virtual router, but virtual router 506 may execute within a hypervisor, a host operating system, a host application, or a virtual machine in various implementations.

Virtual router 506 may replace and subsume the virtual routing/bridging functionality of the Linux bridge/OVS module that is commonly used for Kubernetes deployments of pods 502. Virtual router 506 may perform bridging (e.g., E-VPN) and routing (e.g., L3VPN, IP-VPNs) for virtual networks. Virtual router 506 may perform networking services such as applying security policies, NAT, multicast, mirroring, and load balancing.

Virtual router 506 (the "data" or "forwarding" plane of the virtual router) can be executing as a kernel module or as a user space DPDK process (virtual router 506 is shown here in user space 545). Virtual router agent 514 (the "control" plane of the virtual router) may also be executing in user space. In the example computing device 500, virtual router 506 executes within user space as a DPDK-based virtual router, but virtual router 506 may execute within a hypervisor, a host operating system, a host application, or a virtual machine in various implementations. Virtual router agent 514 has a connection to network controller 24 using a channel, which is used to download configurations and forwarding information. Virtual router agent 514 programs this forwarding state to the virtual router data (or "forwarding") plane represented by virtual router 506. Virtual router 506 and virtual router agent 514 may be processes. Virtual router 506 and virtual router agent 514 may be containerized/cloud-native.

Virtual router 506 may replace and subsume the virtual routing/bridging functionality of the Linux bridge/OVS module that is commonly used for Kubernetes deployments of pods 502. Virtual router 506 may perform bridging (e.g., E-VPN) and routing (e.g., L3VPN, IP-VPNs) for virtual networks. Virtual router 506 may perform networking services such as applying security policies, NAT, multicast, mirroring, and load balancing.

Virtual router 506 may be multi-threaded and execute on one or more processor cores. Virtual router 506 may include multiple queues. Virtual router 506 may implement a packet processing pipeline. The pipeline can be stitched by the virtual router agent 514 from the simplest to the most complicated manner depending on the operations to be applied to a packet. Virtual router 506 may maintain multiple instances of forwarding bases. Virtual router 506 may access and update tables using RCU (Read Copy Update) locks.

To send packets to other compute nodes or switches, virtual router 506 uses one or more physical interfaces 532. In general, virtual router 506 exchanges overlay packets with workloads, such as VMs or pods 502. Virtual router 506 has multiple virtual network interfaces (e.g., vifs). These interfaces may include the kernel interface, vhost0, for exchanging packets with the host operating system; an interface with virtual router agent 514, pkt0, to obtain forwarding state from the network controller and to send up exception packets. There may be one or more virtual network interfaces corresponding to the one or more physical network interfaces 532. Other virtual network interfaces of virtual router 506 are for exchanging packets with the workloads.

In a kernel-based deployment of virtual router 506 (not shown), virtual router 506 is installed as a kernel module inside the operating system. Virtual router 506 registers itself with the TCP/IP stack to receive packets from any of the desired operating system interfaces that it wants to. The interfaces can be bond, physical, tap (for VMs), veth (for containers) etc. Virtual router 506 in this mode relies on the operating system to send and receive packets from different interfaces. For example, the operating system may expose a tap interface backed by a vhost-net driver to communicate with VMs. Once virtual router 506 registers for packets from this tap interface, the TCP/IP stack sends all the packets to it. Virtual router 506 sends packets via an operating system interface. In addition, NIC queues (physical or virtual) are handled by the operating system. Packet processing may operate in interrupt mode, which generates interrupts and may lead to frequent context switching. When there is a high packet rate, the overhead attendant with frequent interrupts and context switching may overwhelm the operating system and lead to poor performance.

In a DPDK-based deployment of virtual router 506 (shown in FIG. 5), virtual router 506 is installed as a user space 545 application that is linked to the DPDK library. This may lead to faster performance than a kernel-based deployment, particularly in the presence of high packet rates. The physical interfaces 532 are used by the poll mode drivers (PMDs) of DPDK rather the kernel's interrupt-based drivers. The registers of physical interfaces 532 may be exposed into user space 545 in order to be accessible to the PMDs; a physical interface 532 bound in this way is no longer managed by or visible to the host operating system, and the DPDK-based virtual router 506 manages the physical interface 532. This includes packet polling, packet processing, and packet forwarding. In other words, user packet processing steps are performed by the virtual router 506 DPDK data plane. The nature of this "polling mode" makes the virtual router 506 DPDK data plane packet processing/forwarding much more efficient as compared to the interrupt mode when the packet rate is high. There are comparatively few interrupts and context switching during packet I/O, compared to kernel-mode virtual router 506, and interrupt and context switching during packet I/O may in some cases be avoided altogether.

In general, each of pods 502A-502B may be assigned one or more virtual network addresses for use within respective virtual networks, where each of the virtual networks may be associated with a different virtual subnet provided by virtual router 506. Pod 502B may be assigned its own virtual layer three (L3) IP address, for example, for sending and receiving communications but may be unaware of an IP address of the computing device 500 on which the pod 502B executes. The virtual network address may thus differ from the logical address for the underlying, physical computer system, e.g., computing device 500.

Computing device 500 includes a virtual router agent 514 that controls the overlay of virtual networks for computing device 500 and that coordinates the routing of data packets within computing device 500. In general, virtual router agent 514 communicates with network controller 24 for the virtualization infrastructure, which generates commands to create virtual networks and configure network virtualization endpoints, such as computing device 500 and, more specifically, virtual router 506, as a well as virtual network interface 212. By configuring virtual router 506 based on information received from network controller 24, virtual router agent 514 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 529A-529B within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 506. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 506 performs tunnel encapsulation/decapsulation for packets sourced by/destined to any containers of pods 502, and virtual router 506 exchanges packets with pods 502 via bus 542 and/or a bridge of NIC 530.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 506 implements one or more virtual routing and forwarding instances (VRFs), such as VRF 222A, for respective virtual networks for which virtual router 506 operates as respective tunnel endpoints. In general, each of the VRFs stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of the VRFs may include a network forwarding table storing routing and forwarding information for the virtual network.

NIC 530 may receive tunnel packets. Virtual router 506 processes the tunnel packet to determine, from the tunnel encapsulation header, the virtual network of the source and destination endpoints for the inner packet. Virtual router 506 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 222A. VRF 222A may include forwarding information for the inner packet. For instance, VRF 222A may map a destination layer 3 address for the inner packet to virtual network interface 212. VRF 222A forwards the inner packet via virtual network interface 212 to pod 502A in response.

Containers 529A may also source inner packets as source virtual network endpoints. Container 529A, for instance, may generate a layer 3 inner packet destined for a destination virtual network endpoint that is executed by another computing device (i.e., not computing device 500) or for another one of containers. Container 529A may sends the layer 3 inner packet to virtual router 506 via the virtual network interface attached to VRF 222A.

Virtual router 506 receives the inner packet and layer 2 header and determines a virtual network for the inner packet. Virtual router 506 may determine the virtual network using any of the above-described virtual network interface implementation techniques (e.g., macvlan, veth, etc.). Virtual router 506 uses the VRF 222A corresponding to the virtual network for the inner packet to generate an outer header for the inner packet, the outer header including an outer IP header for the overlay tunnel and a tunnel encapsulation header identifying the virtual network. Virtual router 506 encapsulates the inner packet with the outer header. Virtual router 506 may encapsulate the tunnel packet with a new layer 2 header having a destination layer 2 address associated with a device external to the computing device 500, e.g., a TOR switch 16 or one of servers 12. If external to computing device 500, virtual router 506 outputs the tunnel packet with the new layer 2 header to NIC 530 using physical function 221. NIC 530 outputs the packet on an outbound interface. If the destination is another virtual network endpoint executing on computing device 500, virtual router 506 routes the packet to the appropriate one of virtual network interfaces 212, 213.

In some examples, a controller for computing device 500 (e.g., network controller 24 of FIG. 1) configures a default route in each of pods 502 to cause the virtual machines 224 to use virtual router 506 as an initial next hop for outbound packets. In some examples, NIC 530 is configured with one or more forwarding rules to cause all packets received from virtual machines 224 to be switched to virtual router 506.

Pod 502A includes one or more application containers 529A. Pod 502B includes an instance of containerized routing protocol daemon (cRPD) 324 and cRPD-agent 326. cRPD-agent 326 and CNI 570 communicate in this example over gRPC interface 582, although other interface types may be used, e.g., REST. Container platform 588 includes container runtime 590, orchestration agent 592, service proxy 593, and CNI 570.

Container engine 590 includes code executable by microprocessor 510. Container runtime 590 may be one or more computer processes. Container engine 590 runs containerized applications in the form of containers 529A-529B. Container engine 590 may represent a Dockert, rkt, or other container engine for managing containers. In general, container engine 590 receives requests and manages objects such as images, containers, networks, and volumes. An image is a template with instructions for creating a container. A container is an executable instance of an image. Based on directives from controller agent 592, container engine 590 may obtain images and instantiate them as executable containers in pods 502A-502B.

Service proxy 593 includes code executable by microprocessor 510. Service proxy 593 may be one or more computer processes. Service proxy 593 monitors for the addition and removal of service and endpoints objects, and it maintains the network configuration of the computing device 500 to ensure communication among pods and containers, e.g., using services. Service proxy 593 may also manage iptables to capture traffic to a service's virtual IP address and port and redirect the traffic to the proxy port that proxies a backed pod. Service proxy 593 may represent a kube-proxy for a minion node of a Kubernetes cluster. In some examples, container platform 588 does not include a service proxy 593 or the service proxy 593 is disabled in favor of configuration of virtual router 506 and pods 502 by CNI 570.

Orchestration agent 592 includes code executable by microprocessor 510. Orchestration agent 592 may be one or more computer processes. Orchestration agent 592 may represent any of orchestration agents 420 of servers 12 or other orchestration agent in this disclosure. Orchestration agent 592 may represent a kubelet for a minion node of a Kubernetes cluster. Orchestration agent 592 is an agent of an orchestrator, e.g., orchestrator 23 of FIG. 1, that receives container specification data for containers and ensures the containers execute by computing device 500. Container specification data may be in the form of a manifest file sent to orchestration agent 592 from orchestrator 23 or indirectly received via a command line interface, HTTP endpoint, or HTTP server. Container specification data may be a pod specification (e.g., a PodSpec—a YAML (Yet Another Markup Language) or JSON object that describes a pod) for one of pods 502 of containers. Based on the container specification data, orchestration agent 592 directs container engine 590 to obtain and instantiate the container images for containers 529, for execution of containers 529 by computing device 500.

Orchestration agent 592 instantiates or otherwise invokes CNI 570 to configure one or more virtual network interfaces for each of pods 502. For example, orchestration agent 592 receives a container specification data for pod 502A and directs container engine 590 to create the pod 502A with containers 529A based on the container specification data for pod 502A. Orchestration agent 592 also invokes the CNI 570 to configure, for pod 502A, virtual network interface for a virtual network corresponding to VRFs 222A. In this example, pod 502A is a virtual network endpoint for a virtual network corresponding to VRF 222A.

CNI 570 may obtain interface configuration data for configuring virtual network interfaces for pods 502. Virtual router agent 514 operates as a virtual network control plane module for enabling network controller 24 to configure virtual router 506. Unlike the orchestration control plane (including the container platforms 588 for minion nodes and the master node(s), e.g., orchestrator 23), which manages the provisioning, scheduling, and managing virtual execution elements, a virtual network control plane (including network controller 24 and virtual router agent 514 for minion nodes) manages the configuration of virtual networks implemented in the data plane in part by virtual routers 506 of the minion nodes. Virtual router agent 514 communicates, to CNI 570, interface configuration data for virtual network interfaces to enable an orchestration control plane element (i.e., CNI 570) to configure the virtual network interfaces according to the configuration state determined by the network controller 24, thus bridging the gap between the orchestration control plane and virtual network control plane. In addition, this may enable a CNI 570 to obtain interface configuration data for multiple virtual network interfaces for a pod and configure the multiple virtual network interfaces, which may reduce communication and resource overhead inherent with invoking a separate CNI 570 for configuring each virtual network interface.

Containerized routing protocol daemons are described in U.S. application Ser. No. 17/649,632, filed Feb. 1, 2022, which is incorporated by reference herein in its entirety.

Figure 6:
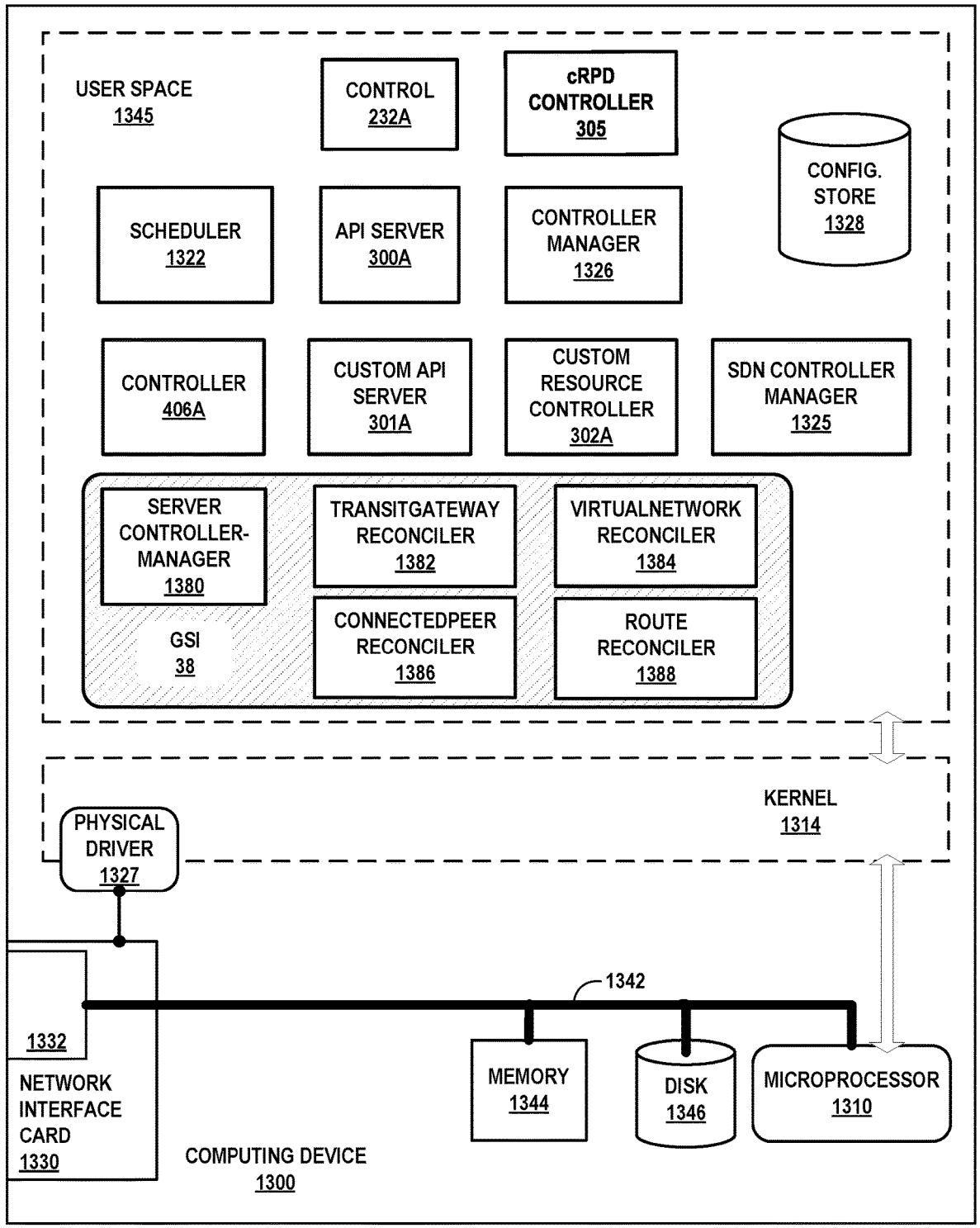
FIG. 6 is a block diagram of an example computing device operating as a compute node for one or more clusters for an SDN architecture system, in accordance with techniques of this disclosure.

FIG. 6 is a block diagram of an example computing device operating as a compute node for one or more clusters for an SDN architecture system, in accordance with techniques of this disclosure. Computing device 1300 may represent one or more real or virtual servers. Computing device 1300 may in some instances implement one or more master nodes for respective clusters, or for multiple clusters.

Scheduler 1322, API server 300A, controller 406A, custom API server 301A, custom resource controller 302A, cRPD controller 305, controller manager 1326, SDN controller manager 1325, control node 232A, configuration store 1328, and the example custom resource controller components for GSI 38: server controller-manager 1380, transitgateway reconciler 1382, virtualnetwork reconciler 1384, connectedpeer reconciler 1386, and route reconciler 1388, although illustrated and described as being executed by a single computing device 1300, may be distributed among multiple computing devices that make up a computing system or hardware/server cluster. Each of the multiple computing devices, in other words, may provide a hardware operating environment for one or more instances of any one or more of scheduler 1322, API server 300A, controller 406A, custom API server 301A, custom resource controller 302A, network controller manager 1326, network controller 1324, SDN controller manager 1325, control node 232A, or configuration store 1328.

Computing device 1300 includes in this example, a bus 1342 coupling hardware components of a computing device 1300 hardware environment. Bus 1342 couples network interface card (NIC) 1330, storage disk 1346, and one or more microprocessors 1310 (hereinafter, "microprocessor 1310"). A front-side bus may in some cases couple microprocessor 1310 and memory device 1344. In some examples, bus 1342 may couple memory device 1344, microprocessor 1310, and NIC 1330. Bus 1342 may represent a Peripheral Component Interface (PCI) express (PCIe) bus. In some examples, a direct memory access (DMA) controller may control DMA transfers among components coupled to bus 242. In some examples, components coupled to bus 1342 control DMA transfers among components coupled to bus 1342.

Microprocessor 1310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 1346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 1310.

Main memory 1344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 1344 provides a physical address space composed of addressable memory locations.

Network interface card (NIC) 1330 includes one or more interfaces 3132 configured to exchange packets using links of an underlying physical network. Interfaces 3132 may include a port interface card having one or more network ports. NIC 1330 may also include an on-card memory to, e.g., store packet data. Direct memory access transfers between the NIC 1330 and other devices coupled to bus 1342 may read/write from/to the NIC memory.

Memory 1344, NIC 1330, storage disk 1346, and microprocessor 1310 may provide an operating environment for a software stack that includes an operating system kernel 1314 executing in kernel space. Kernel 1314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 1314 provides an execution environment for one or more processes in user space 1345. Kernel 1314 includes a physical driver 1327 to use the network interface card 230.

Computing device 1300 may be coupled to a physical network switch fabric that includes an overlay network that extends switch fabric from physical switches to software or virtual routers of physical servers coupled to the switch fabric, such virtual routers 21. Computing device 1300 may use one or more dedicated virtual networks to configure minion nodes of a cluster.

API server 300A, scheduler 1322, controller 406A, custom API server 301A, custom resource controller 302A, controller manager 1326, configuration store 1328, and the example custom resource controller components for GSI 38 may implement a master node for a cluster and be alternatively referred to as "master components." The cluster may be a Kubernetes cluster and the master node a Kubernetes master node, in which case the master components are Kubernetes master components.

Each of API server 300A, controller 406A, custom API server 301A, cRPD controller 305, custom resource controller 302A, and the example custom resource controller components for GSI 38 includes code executable by microprocessor 1310. Custom API server 301A validates and configures data for custom resources for SDN architecture configuration. A service may be an abstraction that defines a logical set of pods and the policy used to access the pods. The set of pods implementing a service are selected based on the service definition. A service may be implemented in part as, or otherwise include, a load balancer. API server 300A and custom API server 301A may implement a Representational State Transfer (REST) interface to process REST operations and provide the frontend, as part of the configuration plane for an SDN architecture, to a corresponding cluster's shared state stored to configuration store 1328. API server 300A may represent a Kubernetes API server.

Configuration store 1328 is a backing store for all cluster data. Cluster data may include cluster state and configuration data. Configuration data may also provide a backend for service discovery and/or provide a locking service. Configuration store 1328 may be implemented as a key value store. Configuration store 1328 may be a central database or distributed database. Configuration store 1328 may represent an etcd store. Configuration store 1328 may represent a Kubernetes configuration store.

Scheduler 1322 includes code executable by microprocessor 1310. Scheduler 1322 may be one or more computer processes. Scheduler 1322 monitors for newly created or requested virtual execution elements (e.g., pods of containers) and selects a minion node on which the virtual execution elements are to run. Scheduler 1322 may select a minion node based on resource requirements, hardware constraints, software constraints, policy constraints, locality, etc. Scheduler 1322 may represent a Kubernetes scheduler.

In general, API server 1320 may invoke the scheduler 1322 to schedule a pod. Scheduler 1322 may select a minion node and returns an identifier for the selected minion node to API server 1320, which may write the identifier to the configuration store 1328 in association with the pod. API server 1320 may invoke the orchestration agent 310 for the selected minion node, which may cause the container engine 208 for the selected minion node to obtain the pod from a storage server and create the virtual execution element on the minion node. The orchestration agent 310 for the selected minion node may update the status for the pod to the API server 1320, which persists this new state to the configuration store 1328. In this way, computing device 1300 instantiates new pods in the compute infrastructure 8.

Controller manager 1326 includes code executable by microprocessor 1310.

Controller manager 1326 may be one or more computer processes. Controller manager 1326 may embed the core control loops, monitoring a shared state of a cluster by obtaining notifications from API Server 1320. Controller manager 1326 may attempt to move the state of the cluster toward the desired state. Example controller 406A, custom resource controller 302A, and cRPD controller 305 may be managed by the controller manager 1326. Other controllers may include a replication controller, endpoints controller, namespace controller, and service accounts controller. Controller manager 1326 may perform lifecycle functions such as namespace creation and lifecycle, event garbage collection, terminated pod garbage collection, cascading-deletion garbage collection, node garbage collection, etc. Controller manager 1326 may represent a Kubernetes Controller Manager for a Kubernetes cluster.

A network controller for an SDN architecture described herein may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

The network controller (or "SDN controller") may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines, containers, or other virtual execution elements instead of on physical hardware appliances.

SDN controller manager 1325 includes code executable by microprocessor 1310. SDN controller manager 1325 may be one or more computer processes. SDN controller manager 1325 operates as an interface between the orchestration-oriented elements (e.g., scheduler 1322, API server 300A and custom API server 301A, controller manager 1326, and configuration store 1328). In general, SDN controller manager 1325 monitors the cluster for new Kubernetes native objects (e.g., pods and services). SDN controller manager 1325 may isolate pods in virtual networks and connect pods with services.

SDN controller manager 1325 may be executed as a container of the master node for a cluster. In some cases, using SDN controller manager 1325 enables disabling the service proxies of minion nodes (e.g., the Kubernetes kube-proxy) such that all pod connectivity is implemented using virtual routers, as described herein.

Components of the network controller 24 may operate as a CNI for Kubernetes and may support multiple deployment modes. CNI 17, CNI 750 are the compute node interfaces for this overall CNI framework for managing networking for Kubernetes. The deployment modes can be divided into two categories: (1) an SDN architecture cluster as a CNI integrated into a workload Kubernetes cluster, and (2) an SDN architecture cluster as a CNI that is separate from the workload Kubernetes clusters.

Integrated with Workload Kubernetes Cluster

In this example, components of the network controller 24 (e.g., custom API server 301, custom resource controller 302, cRPD controller 305, SDN controller manager 1325, and control nodes 232) are running in the managed Kubernetes cluster on master nodes, close to the Kubernetes controller components. In this mode, components of network controller 24 are effectively part of the same Kubernetes cluster as the workloads.

Separate from Workload Kubernetes Clusters

Components of the network controller 24 will be executed by a separate Kubernetes cluster from the workload Kubernetes clusters.

SDN controller manager 1325 may use a controller framework for the orchestration platform to listen for (or otherwise monitor for) changes in objects that are defined in the Kubernetes native API and to add annotations to some of these objects. The annotations may be labels or other identifiers specifying properties of the objects (e.g., "Virtual Network Green"). SDN controller manager 1325 is a component of the SDN architecture that listens to Kubernetes core resources (such as Pod, NetworkPolicy, Service, etc.) events and converts those to custom resources for SDN architecture configuration as needed. The CNI plugin (e.g., CNIs 17, 570) is an SDN architecture component supporting the Kubernetes networking plugin standard: container network interface.

SDN controller manager 1325 may create a network solution for the application using the REST interface exposed by aggregated API 402 to define network objects such as virtual networks, virtual network interfaces, and access control policies. Network controller 24 components may implement the network solution in the compute infrastructure by, e.g., configuring the one or more virtual network and virtual network interfaces in the virtual routers. (This is merely one example of an SDN configuration.)

The following example deployment configuration for this application consists of a pod and the virtual network information for the pod:

```
apiVersion: v1
kind: Pod
metadata:
    name: multi-net-pod
    annotations:
        networks: '[
            { "name": "red-network" },
            { "name": "blue-network" },
            { "name": "default/extns-network" }
        ]'
spec:
    containers:
    - image: busybox
      command:
        - sleep
        - "3600"
      imagePullPolicy: IfNotPresent
      name: busybox
      stdin: true
      tty: true
restartPolicy: Always
```

This metadata information may be copied to each pod replica created by the controller manager 1326. When the SDN controller manager 1325 is notified of these pods, SDN controller manager 1325 may create virtual networks as listed in the annotations ("red-network", "blue-network", and "default/extns-network" in the above example) and create, for each of the virtual networks, a virtual network interface per-pod replica (e.g., pod 202A) with a unique private virtual network address from a cluster-wide address block (e.g. 10.0/16) for the virtual network.

Server controller-manager 1380 includes code executable by microprocessor 1310. Server controller-manager 1380 may be one or more computer processes. Server controller-manager 1380 may embed the core control loops, monitoring a shared state of a cluster by obtaining notifications from API Server 1320 or custom API server 301A. Server controller-manager 1380 may attempt to move the state of the cluster, and in particular, the state(s) of network constructs included in GSI 38, toward the desired state. Example transitgateway reconciler 1382, virtualnetwork reconciler 1384, connectedpeer reconciler 1386, and route reconciler 1388 may be managed by server controller-manager 1380. Each of the reconciler 1382, virtualnetwork reconciler 1384, connectedpeer reconciler 1386, and route reconciler 1388 may have a corresponding controller (not shown) or be run by a common custom controller for the GSI 38 objects. Each of reconcilers, custom controllers, and controllers may be Kubernetes-based.

Server controller-manager 1380 may perform lifecycle functions such as namespace creation and lifecycle, event garbage collection, terminated pod garbage collection, cascading-deletion garbage collection, node garbage collection, etc. Server controller-manager 1380 may represent a Controller Manager for a Kubernetes cluster. Operations of the GSI 38 custom resource controller components are described below with respect to FIG. 14.

Additional techniques in accordance with this disclosure are described below. Contrail is an example network controller architecture. A cloud-native Contrail controller may be an example of a network controller described in this disclosure, such as network controller 24.

Figures 7A, 7B:
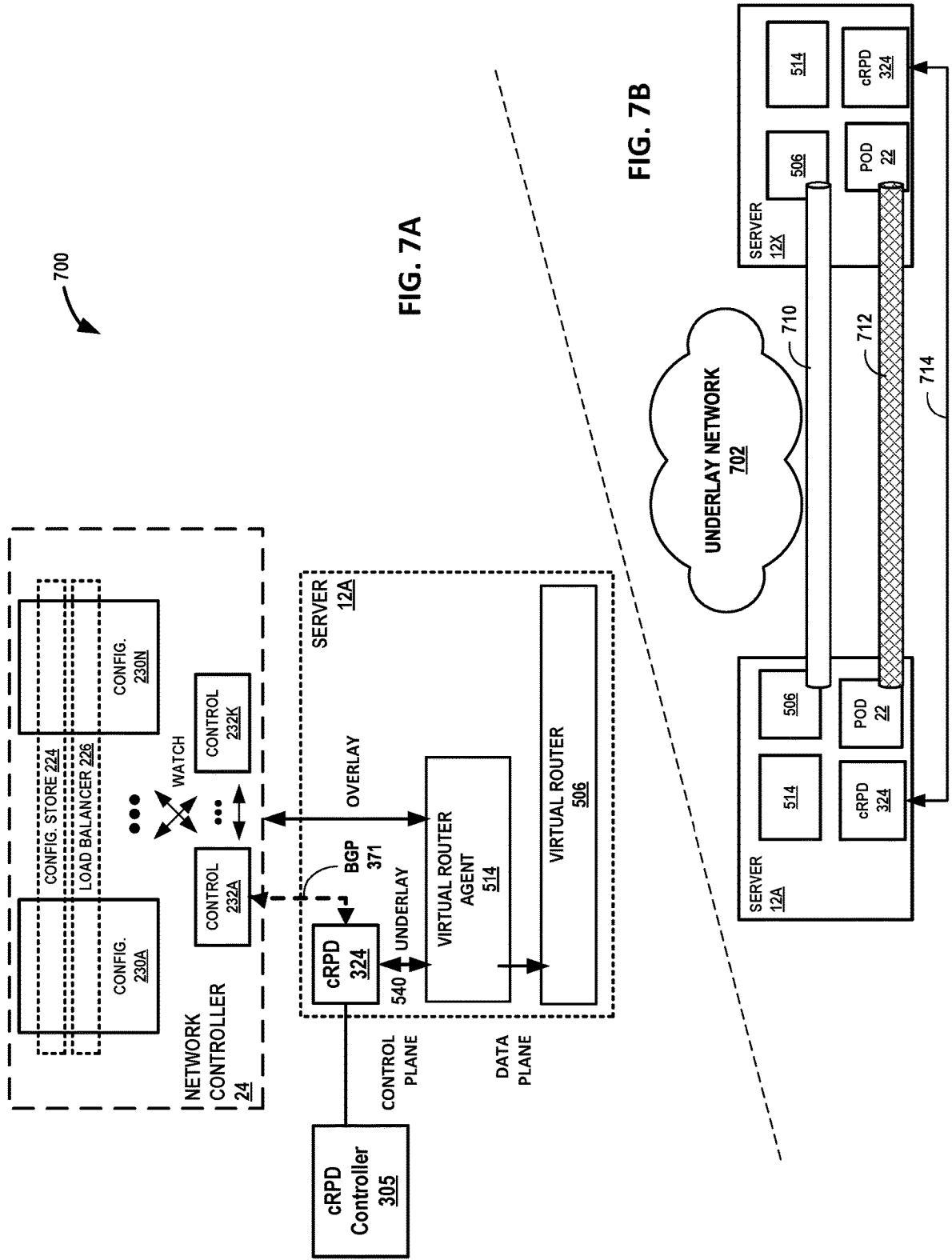
FIG. 7A is a block diagram illustrating control/routing planes for underlay network and overlay network configuration using an SDN architecture, according to techniques of this disclosure.
FIG. 7B is a block diagram illustrating a configured virtual network to connect pods using a tunnel configured in the underlay network, according to techniques of this disclosure.

FIG. 7A is a block diagram illustrating control/routing planes for underlay network and overlay network configuration using an SDN architecture, according to techniques of this disclosure. FIG. 7B is a block diagram illustrating a configured virtual network to connect pods using a tunnel configured in the underlay network, according to techniques of this disclosure.

Network controller 24 for the SDN architecture may use distributed or centralized routing plane architectures. The SDN architecture may use a containerized routing protocol daemon (process).

From the perspective of network signaling, the routing plane can work according to a distributed model, where a cRPD runs on every compute node in the cluster. This essentially means that the intelligence is built into the compute nodes and involves complex configurations at each node. The route reflector (RR) in this model may not make intelligent routing decisions but is used as a relay to reflect routes between the nodes. A distributed container routing protocol daemon (cRPD) is a routing protocol process that may be used wherein each compute node runs its own instance of the routing daemon. At the same time, a centralized cRPD master instance may act as an RR to relay routing information between the compute nodes. The routing and configuration intelligence is distributed across the nodes with an RR at the central location.

The routing plane can alternatively work according to a more centralized model, in which components of network controller runs centrally and absorbs the intelligence needed to process configuration information, construct the network topology, and program the forwarding plane into the virtual routers. The virtual router agent is a local agent to process information being programmed by the network controller. This design leads to facilitates more limited intelligence required at the compute nodes and tends to lead to simpler configuration states.

The centralized control plane provides for the following:
  Allows for the agent routing framework to be simpler and lighter. The complexity and limitations of BGP are hidden from the agent. There is no need for the agent to understand concepts like route-distinguishers, route-targets, etc. The agents just exchange prefixes and build its forwarding information accordingly
  Control nodes can do more than routing. They build on the virtual network concept and can generate new routes using route replication and re-origination (for instance to support features like service chaining and inter-VN routing, among other use cases).
  Building the BUM tree for optimal broadcast and multicast forwarding.
  Note that the control plane has a distributed nature for certain aspects. As a control plane supporting distributed functionality, it allows each local virtual router agent to publish its local routes and subscribe for configuration on a need-to-know basis.

It makes sense then to think of the control plane design from a tooling POV and use tools at hand appropriately where they fit best. Consider the set of pros and cons of contrail-bgp and cRPD.

The following functionalities may be provided by cRPDs or control nodes of network controller 24.
Routing Daemon/Process
  Both control nodes and cRPDs can act as routing daemons implementing different protocols and having the capability to program routing information in the data plane.
  cRPD implements routing protocols with a rich routing stack that includes interior gateway protocols (IGPs) (e.g., intermediate system to intermediate system (IS-IS)), BGP-LU, BGP-CT, SR-MPLS/SRv6, bidirectional forwarding detection (BFD), path computation element protocol (PCEP), etc. It can also be deployed to provide control plane only services such as a route-reflector and is popular in internet routing use-cases due to these capabilities.

Control nodes 232 also implement routing protocols but are predominantly BGP-based. Control nodes 232 understands overlay networking. Control nodes 232 provide a rich feature set in overlay virtualization and cater to SDN use cases. Overlay features such as virtualization (using the abstraction of a virtual network) and service chaining are very popular among telco and cloud providers. cRPD may not in some cases include support for such overlay functionality. However, the rich feature set of CRPD provides strong support for the underlay network.

Network Orchestration/Automation

Routing functionality is just one part of the control nodes 232. An integral part of overlay networking is orchestration. Apart from providing overlay routing, control nodes 232 help in modeling the orchestration functionality and provide network automation. Central to orchestration capabilities of control nodes 232 is an ability to use the virtual network (and related objects)-based abstraction to model network virtualization. Control nodes 232 interface with the configuration nodes 230 to relay configuration information to both the control plane and the data plane. Control nodes 232 also assist in building overlay trees for multicast layer 2 and layer 3. For example, a control node may build a virtual topology of the cluster it serves to achieve this. cRPD does not typically include such orchestration capabilities.

High Availability and Horizontal Scalability

Control node design is more centralized while cRPD is more distributed. There is a CRPD worker node running on each compute node. Control nodes 232 on the other hand do not run on the compute and can even run on a remote cluster (i.e., separate and in some cases geographically remote from the workload cluster). Control nodes 232 also provide horizontal scalability for HA and run in active-active mode. The compute load is shared among the control nodes 232. cRPD on the other hand does not typically provide horizontal scalability. Both control nodes 232 and cRPD may provide HA with graceful restart and may allow for data plane operation in headless mode—wherein the virtual router can run even if the control plane restarts.

The control plane should be more than just a routing daemon. It should support overlay routing and network orchestration/automation, while cRPD does well as a routing protocol in managing underlay routing, cRPD, however, typically lacks network orchestration capabilities and does not provide strong support for overlay routing.

Accordingly, in some examples, the SDN architecture may have cRPD on the compute nodes as shown in FIGS. 7A-7B. FIG. 7A illustrates SDN architecture 700, which may represent an example implementation SDN architecture 200 or 400. In SDN architecture 700, cRPD 324 runs on the compute nodes and provide underlay routing to the data plane while running a centralized (and horizontally scalable) set of control nodes 232 providing orchestration and overlay services. In some examples, instead of running cRPD 324 on the compute nodes, a default gateway may be used.

cRPD 324 on the compute nodes provides rich underlay routing to the data plane by interacting with virtual router agent 514 using interface 540, which may be a gRPC interface. The virtual router agent interface may permit programming routes, configuring virtual network interfaces for the overlay, and otherwise configuring virtual router 506. This is described in further detail in U.S. application Ser. No. 17/649,632. At the same time, one or more control nodes 232 run as separate pods providing overlay services. SDN architecture 700 may thus obtain both a rich overlay and orchestration provided by control nodes 232 and modern underlay routing by cRPD 324 on the compute nodes to complement control nodes 232. A separate cRPD controller 720 may be used to configure the cRPDs 324. cRPD controller 720 may be a device/element management system, network management system, orchestrator, a user interface/CLI, or other controller. cRPDs 324 run routing protocols and exchange routing protocol messages with routers, including other cRPDs 324. Each of CRPDs 324 may be a containerized routing protocol process and effectively operates as a software-only version of a router control plane.

The enhanced underlay routing provided by cRPD 324 may replace the default gateway at the data plane and provide a rich routing stack for use cases that can be supported. In some examples that do not use cRPD 324, virtual router 506 will rely on the default gateway for underlay routing. In some examples, cRPD 324 as the underlay routing process will be restricted to program only the default inet(6).0 fabric with control plane routing information. In such examples, non-default overlay VRFs may be programmed by control nodes 232.

FIGS. 7A-7B illustrate the dual routing/control plane solution described above. In FIG. 7A, CRPD 324 provides underlay routing/forwarding information to virtual router agent 514, similar in some respect to how a router control plane programs a router forwarding/data plane.

As shown in FIG. 7B, cRPDs 324 exchange routing information, in routing protocol sessions 714, usable to create tunnels through the underlay network 702 for VRFs. Tunnel 710 is an example and connects virtual routers 506 of server 12A and server 12X. Tunnel 710 may represent an segment routing (SR) or SRv6 tunnel, a Generic Route Encapsulation (GRE) tunnel, and IP-in-IP tunnel, an LSP, or other tunnel. Control nodes 232 leverages tunnel 710 to create virtual network 712 connecting pods 22 of server 12A and server 12X that are attached to the VRF for the virtual network. Configuration of cRPDs 324 with VRFs to effectuate virtual network creation may be accomplished using techniques described in this disclosure for leveraging a configuration framework for an orchestration platform to configure software that implements a control plane for a containerized network router in a cloud-native SDN architecture.

As noted above, cRPD 324 and virtual router agent 514 may exchange routing information using a gRPC interface, and virtual router agent 5145 may program virtual router 506 with configuration using the gRPC interface. As also noted, control nodes 232 may be used for overlay and orchestration while cRPD 324 may be used for managing the underlay routing protocols. Virtual router agent 514 may use gRPC interface with cRPD 324 while using XMPP to communicate with the control node and a domain name service (DNS).

The gRPC model works well for cRPD 324 since there may be a worker running on every compute node, and the virtual router agent 314 acts as the gRPC server exposing services for the client (cRPD 324) to use to program routing and configuration information (for underlay). gRPC is thus an attractive as a solution when compared to XMPP. In particular, it transports data as a binary stream and there is no added overhead in encoding/decoding data to be sent over it.

In some examples, control nodes 232 may interface with virtual router agents 514 using XMPP. With virtual router agent 514 acting as the gRPC server, cRPD 324 acts as the gRPC client. This would mean that the client (cRPD) needs to initiate the connection towards the server (vRouter Agent). SDN architecture 700, virtual router agent 514 chooses the set of control nodes 232 it will subscribe to (since there are multiple control nodes). In that aspect, the control node 232 acts as the server and the virtual router agent 514 connects as the client and subscribes for updates.

With gRPC, the control node 232 would need to pick the virtual router agents 514 it needs to connect to and then subscribe as a client. Since the control node 232 does not run on every compute node, this would require implementing an algorithm to choose the virtual router agents 514 it can subscribe to. Further, the control nodes 232 need to synchronize this information amongst each other. This also complicates the case when restarts happen and there is a need for synchronization between the control nodes 232 to pick the agents they serve. Features such as Graceful Restart (GR) and Fast Convergence have already been implemented on top of XMPP. XMPP is already lightweight and effective. Therefore, XMPP may be advantageous over gRPC for control node 232 to virtual router agent 514 communications.

Additional enhancements to control nodes 232 and the use thereof are as follows. HA and horizontal scalability with three control-nodes. Like any routing platform, it should be sufficient to have just two control nodes 232 to satisfy the HA requirements. In many cases, this is advantageous. (However, one or more control nodes 232 may be used.) For example, it provides more deterministic infrastructure and in-line with standard routing best-practices. Each virtual router agent 514 is attached to a unique pair of control nodes 232 to avoid randomness. With two control nodes 232, debugging may be simpler. In addition, edge replication for constructing multicast/broadcast trees may be simplified with only two control notes 232. Currently, since vRouter agents 314 only connect to two of the three control nodes, all the control nodes may not have the complete picture of the tree for some time and rely on BGP to sync states between them. This is exacerbated with three control nodes 232 since virtual router agents 314 may choose two at random. If there were only two control nodes 232, every virtual router agent 314 would connect to the same control nodes. This, in turn, would mean that control nodes 232 need not rely on BGP to sync states and will have the same picture of the multicast tree.

SDN architecture 200 may provide for ingress replication as an alternative to edge-replication and provide users the option. Ingress replication can be viewed as a special degenerate case of general overlay multicast trees. In practice, however, the signaling of ingress replication trees is much simpler than the signaling of general overlay multicast trees. With ingress replication, every virtual router 21 ends up with a tree with itself as the root and every other vrouter as the leaf. A virtual router 21 going down should theoretically not result in rebuilding the tree. Note that the performance of ingress replication deteriorates with larger clusters. However, it works well for smaller clusters. Furthermore, multicast is not a popular and prevalent requirement for many customers. It is mostly limited to transport broadcast BUM traffic, which only happens initially.

Configuration Handling Module Enhancements

In convention SDN architectures, the network controller handles the orchestration for all use cases. The configuration nodes translate intents into configuration objects based on the data model and write them into a database (e.g., Cassandra). In some cases, at the same time, a notification is sent to all clients awaiting the configuration, e.g., via RabbitMQ.

Control nodes not only acts as BGP speakers but also have a configuration handling module that reads configuration objects from the database in the following ways. First, when a control node comes up (or restarts), it connects to and reads all configuration directly from the database. Second, a control node may be also a messaging client. When there are updates to configuration objects, control nodes receive a messaging notification that lists the objects that have been updated. This again causes the configuration handling module to read objects from the database.

The configuration handling module reads configuration objects for both the control plane (BGP related configuration) and the vRouter data plane. The configuration may be stored as a graph with objects as nodes and relationships as links. This graph can then be downloaded to the clients (BGP/cRPD and/or vRouter agent).

In accordance with techniques of this disclosure, the conventional configuration API server and messaging service are in some examples replaced by Kube api-server (API server 300 and custom API server 301) and the previous Cassandra database by etcd in Kubernetes, With this change, clients interested in configuration objects can directly do a watch on the etcd database to get updates rather than rely on RabbitMQ notifications.

Controller Orchestration for CRPD

BGP configuration can be provided to cRPDs 324. In some examples, cRPD controller 720 may be a Kubernetes controller catered to the to develop its own controller catered to the Kubernetes space and implements CRDs required for orchestration and provisioning cRPDs 324.

Distributed Configuration Handling

As mentioned earlier in this section, the configuration handling module may be part of control nodes 232. It reads configuration directly from a database, converts the data into JSON format and stores it in its local IFMAP database as a graph with objects as nodes and the relationship between them as links. This graph then gets downloaded to interested virtual router agents 514 on the compute nodes via XMPP. Virtual router agent 514 constructs the IFMAP based dependency graph locally as well to store these objects.

IFMAP as an intermediate module and the need for storing a dependency graph can be avoided by having the virtual router agents 514 directly do a watch on the etcd server in API server 300. The same model can be used by cRPD 324 running on the compute nodes. This will avoid the need for the IFMAP-XMPP config channel. A Kubernetes configuration client (for control node 232) can be used as part of this config. This client can also be used by the virtual router agents.

This can, however, increase the number of clients reading configuration from the etcd server, especially in clusters with hundreds of compute nodes. Adding more watchers eventually causes the write rate to drop and the event rate to fall short of the ideal, etcd's gRPC proxy rebroadcasts from one server watcher to many client watchers. The gRPC proxy coalesces multiple client watchers (c-watchers) on the same key or range into a single watcher (s-watcher) connected to an etcd server. The proxy broadcasts all events from the s-watcher to its c-watchers. Assuming N clients watch the same key, one gRPC proxy can reduce the watch load on the etcd server from N to 1. Users can deploy multiple gRPC proxies to further distribute server load. These clients share one server watcher; the proxy effectively offloads resource pressure from the core cluster. By adding proxies, etcd can serve one million events per second.

DNS/Named in the SDN Architecture

In previous architectures, DNS services are provided by contrail-dns and contrail-named processes working in conjunction to provide DNS services to VMs in the network. Named acts as the DNS server that provides an implementation of the BIND protocol. contrail-dns receives updates from the vrouter-agent and pushes these records to named.

Four DNS modes are supported in the system, IPAM configuration can select the DNS mode required.
1. None—No DNS support for the VMs.
2. Default DNS server—DNS resolution for the VMs is done based on the name server configuration in the server infrastructure. When a VM gets a DHCP response, the subnet default gateway is configured as the DNS server for the VM. DNS requests that the VM sends to this default gateway are resolved via the (fabric) name servers configured on the respective compute nodes and the responses are sent back to the VM.
3. Tenant DNS server—Tenants can use their own DNS servers using this mode. A list of servers can be configured in the IPAM, which are then sent in the DHCP response to the VM as DNS server(s). DNS requests that the VM sends are routed as any other data packet based on the available routing information.
4. Virtual DNS server—In this mode, the system supports virtual DNS servers, providing DNS servers that resolve the DNS requests from the VMs. We can define multiple virtual domain name servers under each domain in the system. Each virtual domain name server is an authoritative server for the DNS domain configured.

The SDN architecture described herein is efficient in the DNS services it provides. Customers in the cloud native world to be benefited by the varied DNS services. However, with the move to next generation Kubernetes-based architecture, the SDN architecture may instead use coreDNS for any DNS services.

Data Plane

The Data plane consists of two components; virtual router agent 514 (aka Agent) and virtual router data plane 506 (also referred to as DPDK vRouter/Kernel vRouter) Agent 514 in the SDN architecture solution is responsible to manage the data plane component. Agent 514 establishes XMPP neighborships with two control nodes 232, then exchanges the routing information with them. The vRouter agent 514 also dynamically generates flow entries and injects them into the virtual router 506. This gives instructions to virtual router 506 about how to forward packets.

Responsibilities of Agent 514 may include: Interface with control node 232 to obtain the configuration. Translate received configuration into a form that datapath can understand (e.g., translate the data model from IFMap to the data model used by datapath). Interface with control node 232 to manage routes. And collect and export statistics from datapath to a monitoring solution.

Virtual router 506 implements the data-plane functionality that may allow a virtual network interface to be associated with a VRF. Each VRF has its own forwarding and flow tables, while the MPLS and VXLAN tables are global within virtual router 506. The forwarding tables may contain routes for both the IP and MAC addresses of destinations and the IP-to-MAC association is used to provide proxy ARP capability. The values of labels in the MPLS table are selected by virtual router 506 when VM/Container interfaces come up and are only locally significant to that vRouter. The VXLAN Network Identifiers are global across all the VRFs of the same virtual network in different virtual router 506 within a domain.

In some examples, each virtual network has a default gateway address allocated to it, and each VM or container interface receives that address in the DHCP response received when initializing. When a workload sends a packet to an address outside its subnet, it will ARP for the MAC corresponding to the IP address of the gateway, and virtual router 506 responds with its own MAC address. Thus, virtual router 506 may support a fully distributed default gateway function for all the virtual networks.

The following are examples of packet flow forwarding as implemented by virtual routers 506.

Packet Flows Between VMs/Container Interface in the Same Subnet.

The worker node could be VM or Container Interface. In some examples, the packet processing proceeds as follows:
VM1/Container Interface needs to send a packet to VM2, so virtual router 506 first looks up its own DNS cache for the IP address, but since this is the first packet, there is no entry.
VM1 sends a DNS request to the DNS server address that was supplied in the DHCP response when its interface came up.
The virtual router 506 traps the DNS request and forwards it to the DNS server running in the SDN architecture controller.
The DNS server in the controller responds with the IP address of VM2
The virtual router 506 sends the DNS response to VM1
VM1 needs to form an Ethernet frame, so needs the MAC address for VM2. It checks its own ARP cache, but there is no entry, since this is the first packet.
VM1 sends out an ARP request.
The virtual router 506 traps the ARP request and looks up the MAC address for IP-VM2 in its own forwarding tables and finds the association in the L2/L3 routes that the controller sent it for VM2.
The virtual router 506 sends an ARP reply to VMl with the MAC address of VM2
A TCP timeout occurs in the network stack of VM1
The network stack of VM1 retries sending the packet, and this time finds the MAC address of VM2 in the ARP cache and can form an Ethernet frame and send it out.
The virtual router 506 looks up the MAC address for VM2 and finds an encapsulation route. The virtual router 506 builds the outer header and sends the resulting packet to server S2.
The virtual router 506 on server S2 decapsulates the packet and looks up the MPLS label to identify the virtual network interface to send the original Ethernet frame into. The Ethernet frame is sent into the interface and received by VM2.

Packet Flow Between VMs in Different Subnets

In some examples, the sequence when sending packets to destinations in a different subnet is similar except that the virtual router 506 responds as the default gateway. VMl will send the packet in an Ethernet frame with the MAC address of the default gateway whose IP address was supplied in the DHCP response that the virtual router 506 supplied when VM1 booted. When VM1 does an ARP request for the gateway IP address, the virtual router 506 responds with its own MAC address. When VM1 sends an Ethernet frame using that gateway MAC address, the virtual router 506 uses the destination IP address of the packet inside the frame to look up the forwarding table in the VRF to find a route, which will be via an encapsulation tunnel to the host that the destination is running on.

Figure 10:
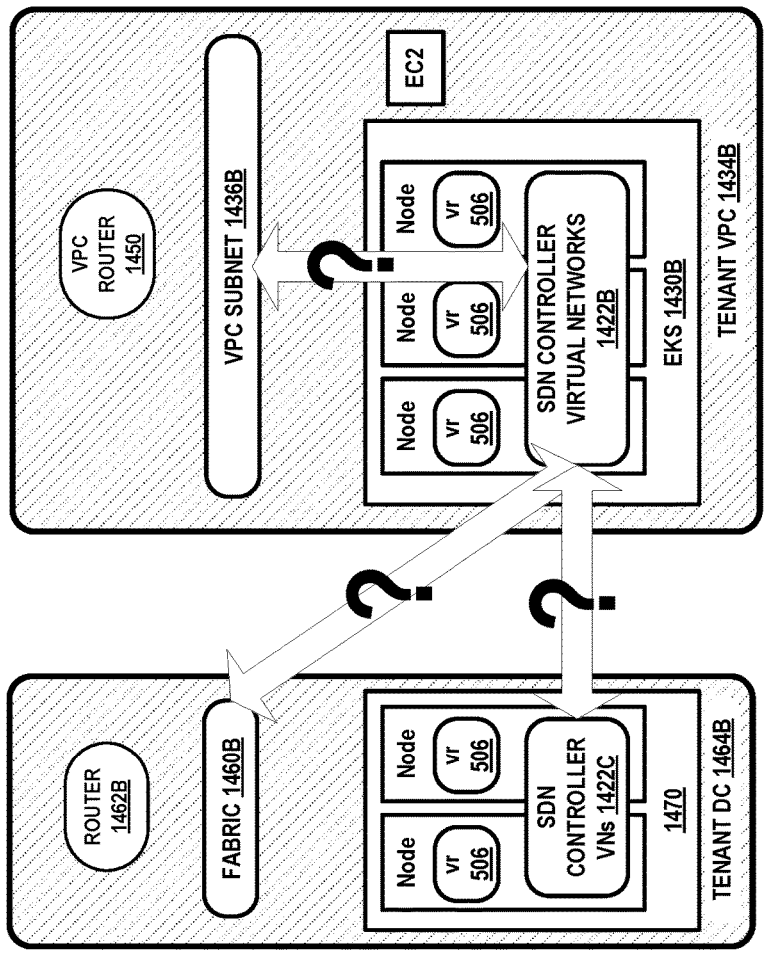
FIG. 10 depicts a use case for two compute infrastructures requiring network connectivity for respective container orchestration platform clusters.

FIG. 10 depicts a use case for two compute infrastructures requiring network connectivity for respective container orchestration platform clusters. Kubernetes clusters—as examples of container orchestration platform clusters and which may be managed or bring your own Kubernetes services—running in a Public Cloud Virtual Private Cloud (VPC) typically connect to a VPC network, an on premises (OnPrem) data center (DC) network (shown connecting to Fabric), and (optionally) an OnPrem Kubernetes Network (shown connecting to Kubernetes Network of the OnPrem DC). Interconnecting these networks can be challenging as there is very little common ground, for while Public Cloud providers provide connectivity services, these services do not address all specific needs. Customers/tenants of public clouds typically rely on a collection of third-party tools glued together by scripts and templates to bridge the gap, and this may make each environment unique and may require an experienced team to manage it.

System 1200 shows a VPC 1343B and data center 1364B for a tenant. Data center 1364B includes a Kubernetes network having 2 nodes, each executing an instance of virtual router 506 managed by an instance of network controller 24. The network controller configures the virtual routers 506 with SDN controller virtual networks 1422C ("virtual networks 1422C") to connect workloads running on the 2 nodes. The 2 nodes may be nodes of a Kubernetes network created by the data center owner/tenant. Data center 1364B includes a switch fabric 1460B and physical router 1462B, which may operate as a gateway router for switch fabric 1460B.

VPC 1434B includes a managed Kubernetes service 1430B ("EKS 1430B") with 3 nodes each configured with an instance of virtual router 506 managed by an instance of network controller 24. The network controller configures the virtual routers 506 with SDN controller virtual networks 1422B ("virtual networks 1422B") to connect workloads running on the 3 nodes of EKS 1430B. VPC subnet 1436B is the subnet for the 3 nodes. VPC router 1450 is a component of the networking infrastructure of VPC 1434B. VPC router 1450 may be a software-defined router that manages traffic between different VPC subnets within VPC 1434B, as well as between VPC 1434B and external networks. VPC router 1450 routes traffic within and external to VPC 1434B, ensuring that packets are forwarded to the appropriate destination based on their IP addresses and the routing configuration defined within VPC 1434B. VPC 1434B also includes a VPC workload ("EC2") launched into VPC 1434, optionally on VPC subnet 1436 (there may be more than one VPC subnet for VPC 1434B). EC2 is an AMAZON ELASTIC COMPUTE CLOUD instance, but other types of VPC nodes are in view for connectivity using techniques of this disclosure.

Figure 11:
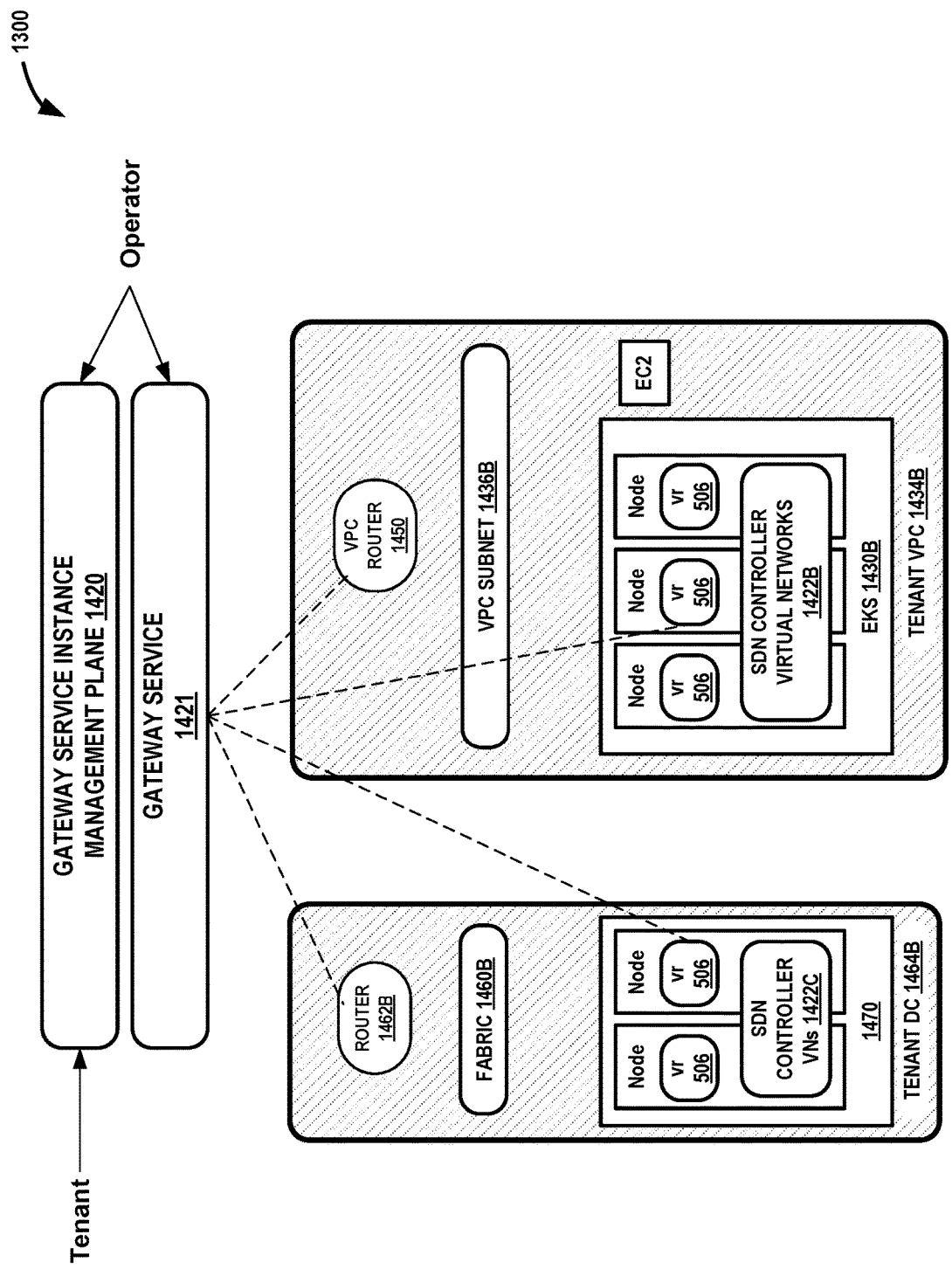
FIG. 11 depicts an integrated gateway service to facilitate network connectivity for respective container orchestration platform clusters in different compute infrastructures, in accordance with an aspect of this disclosure.

FIG. 11 depicts an integrated gateway service to facilitate network connectivity for respective container orchestration platform clusters in different compute infrastructures, in accordance with an aspect of this disclosure. Gateway service 1421 is a service offering by which a gateway service instance (GSI) can facilitate such network connectivity by normalizing the particularities of the different networks for different compute infrastructures. This is done by using state-of-the-art networking technology that integrates seamlessly with Public Cloud and OnPrem networks. Gateway service 1421 talks the required network dialects (e.g., protocols) specific to any of the networks for different compute infrastructures, Combined with an SDN architecture system described herein, such as Cloud-Native Contrail Networking (CN2) for Kubernetes, a seamless end-to-end network between VPC (represented by EKS 1430B), Kubernetes (represented by Kubernetes network 1470 of data center 1464B) and OnPrem (represented by data center 1464A-shown in FIG. 12). Gateway service 1421 is managed via APIs or a UI of gateway service instance management plane 1420, which can be or communicate with a Kubernetes customer API server for instance. Other management planes may be used to configure a GSI. SDN controller virtual networks 1422B, 1422C are virtual networks established using an instance of an SDN architecture system for the cluster(s) (here, a BMS cluster OnPrem for data center 1464B) and a cluster of Nodes for a managed Kubernetes service 1430B in VPC 1434B (e.g., a VPC provided by AMAZON WEB SERVICES cloud from AMAZON, INC., but other types of VPCs may be used such as Azure Virtual Network from MICROSOFT, INC. or VPCs in GOOGLE CLOUD PLATFORM).

Figure 12:
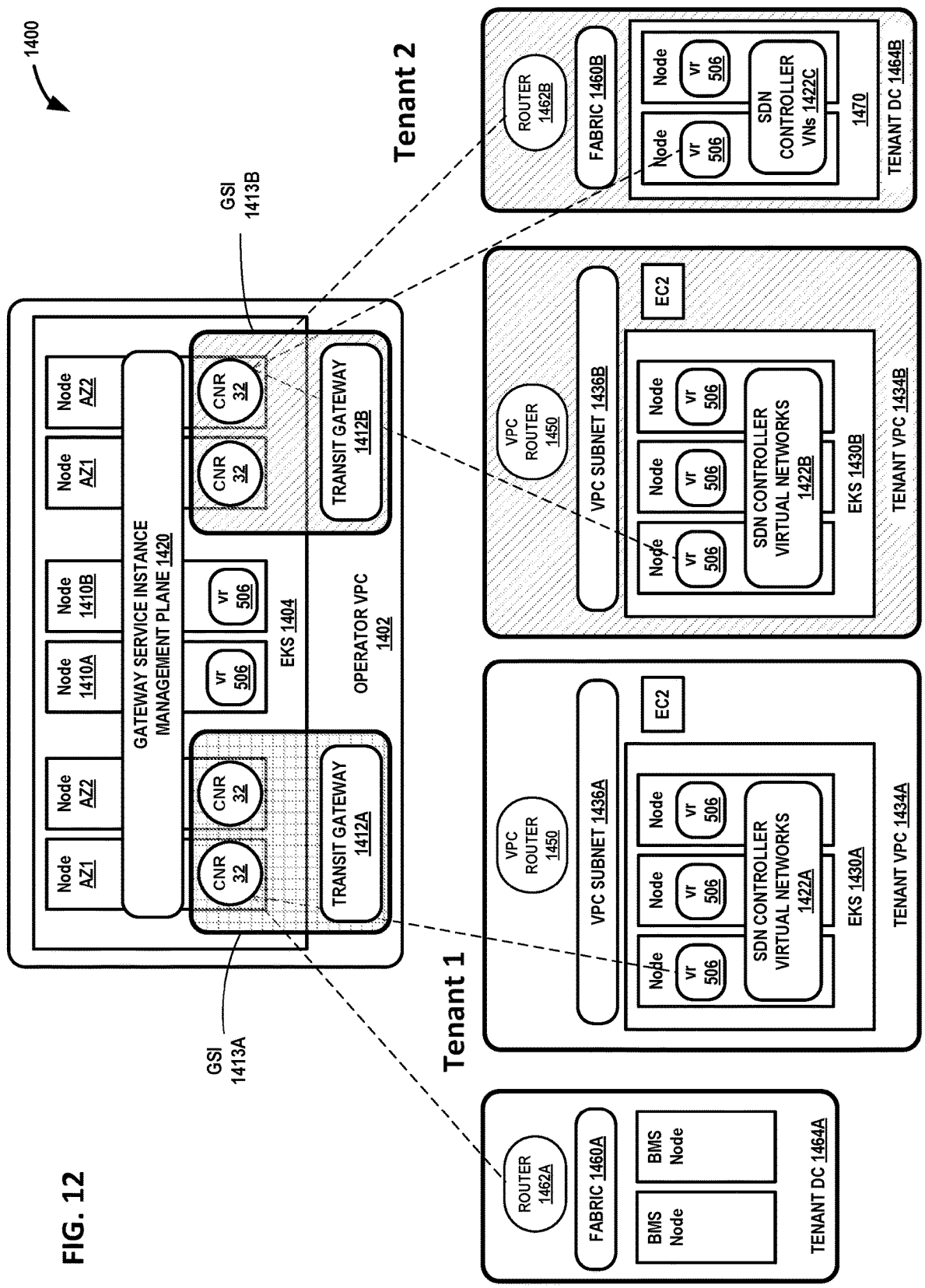
FIG. 12 depicts an example of an integrated gateway service in further detail, along with an example deployment, according to an aspect of this disclosure.

FIG. 12 depicts an example of an integrated gateway service in further detail, along with an example deployment using a gateway service instance, according to an aspect of this disclosure. Gateway service instance management plane 1420 may be implemented using a network controller 24 described above.

The infrastructure is leveraged across customers. CNRs and Transit Gateways are dedicated to the customers/tenants. Operator VPC EKS nodes can run multiple CNRs. CNRs for different customers can run on the same EKS nodes.

Kubernetes itself does not provide networking for Pods and Services. Networking is provided by Container Networking Interface (CNI) plugins. Each Pod and Service is provided with its own IPv4 (and optionally IPv6) address. The number of Pods on a host can, depending on the available CPU and memory resources of that host, be up to 200-250. This increases the number of IP addresses by a factor of 200-500 per node.

To manage that scale most CNIs provide overlay based or encapsulated networking using a control plane which is separate from a control plane and networking used by the hosts and the underlying infrastructure. This introduces the challenge of enabling communication between the infrastructure network and the Kubernetes CNI provided network.

Kubernetes can run on many different compute infrastructures, such as:
  Physical environments—network is provided by switch fabrics
  Virtual Infrastructure Managers (OpenStack, VMWare)—network is provided by the VIMs (Neutron, Virtual Distributed Switch, NSX-T/V)
  Public Clouds—network is provided by the Virtual Private Clouds (AWS, Azure, GCP etc)
Configuration
  In all cases the integration of the Kubernetes networking stack with the infrastructure networking stack follows a similar pattern, e.g., routing tables, gateways, and ports must be configured. However, each infrastructure provides its own constructs abstracting these configuration elements and different API to interact with them.
Networking "Dialects"
  What makes it even harder is that the infrastructure and the Kubernetes networking stack might not even talk the same networking language. Different routing protocols, limitations in terms of L3 and L2 capabilities, and support for different encapsulation protocols can make the networks incompatible.

According to one or more aspects of this disclosure, the SDN-based CNI of SDN architecture system 200, an in particular network controller 24, provides networking to Pods and Services in a Kubernetes Cluster. SDN architecture system 200 provides flexibility to programmatically interact with APIs of external systems. SDN architecture system 200 provides an event-based system, integrated into the Kubernetes control plane which allows to define custom resources and custom controllers to react on events of the custom resources.

An Integrated Gateway Service models the networking constructs of the various underlying infrastructures into custom resources integrated in a GSI. These custom resources are the same across all infrastructures. However, each of a plurality of custom controllers for the custom resources implements infrastructure-specific business logic to interact with a specific kind of infrastructure. The appropriate custom controller for a given infrastructure can be selected to reconcile the state of the infrastructure to an instance of the custom resource. For example, a different custom controller implementation may be used for each of transitgateway reconciler 1382, virtualnetwork reconciler 1384, connectedpeer reconciler 1386, and route reconciler 1388 for each different compute infrastructure configured by network controller 24 using a GSI custom resource. For example, transit gateway reconciler 1382 works to reconcile the intended state of the transit gateway being used to implement a gateway service instance with a transit gateway object of the GSI custom resource/object. Similarly for virtualnetwork reconciler 1384, connectedpeer reconciler 1386, and route reconciler 1388 for one or more virtual networks, one or more connected peers, and one or more routes, respectively. These objects are referred to herein also as transitgateway, virtualnetwork, or connectedpeer.

GSI is a custom resource which is an abstraction of the underlying infrastructure. Creating a GSI to implement the integrate gateway service is the same workflow on any of the supported infrastructures. Based on the specific infrastructure, the custom controller for the GSI semantically understands what infrastructure APIs to orchestrate to enable communication between the SDN architecture system 200-provided Kubernetes network stack and the infrastructure. Users of a GSI will not need to understand the specifics of the orchestration of the different infrastructures and can use the same workflows everywhere.

Operator VPC 1402 is used to provide gateway service instances to tenants. Operator VPC 1402 implements a network controller 24 (shown in abstract form as gateway service instance management plane 1420) to create and configure GSIs 1413A-1413B (collectively, "GSIs 1413"). Operator VPC 1402 may in some cases be running outside of a VPC on a compute cluster, such as a Kubernetes cluster. Operator VPC 1402 may be part of the same public cloud as one or more of tenant VPCs 1434A-1434B (collectively, "tenant VPCs 1434") or a different public cloud as any of tenant VPCs 1434.

Tenant data center 1464A includes 2 bare metal server nodes to which workloads may be deployed, and this represents another form of compute infrastructure that may be configured using the GSI abstraction. Tenant VPC 1434A is similar to tenant VPC 1434B but for a different tenant, and tenant VPC 1434A may be located on a different public cloud than tenant VPC 1434B.

Virtual routers 506 running on nodes for compute infrastructure clusters in FIG. 12 are virtual routers that may communicate in the data plane with other routers (other virtual routers 506 and routers 1462) via CNRs of the Operator VPC 1402 via TransitGateways 1412A-1412B (collectively, "transit gateways 1412") ("TransitGateway" is a resource name, and "transit gateway" is a descriptive name. These terms are used interchangeably herein for the configurable software device that operates as a transit gateway.) Likewise, routers 1462A-1462B may communicate via CNRs 32 with virtual routers 506 and with each other to forward traffic to virtual network endpoint/workload destinations running on nodes in the various compute infrastructure clusters of data centers 1464 and tenant VPCs 1434 1434.

Figure 13:
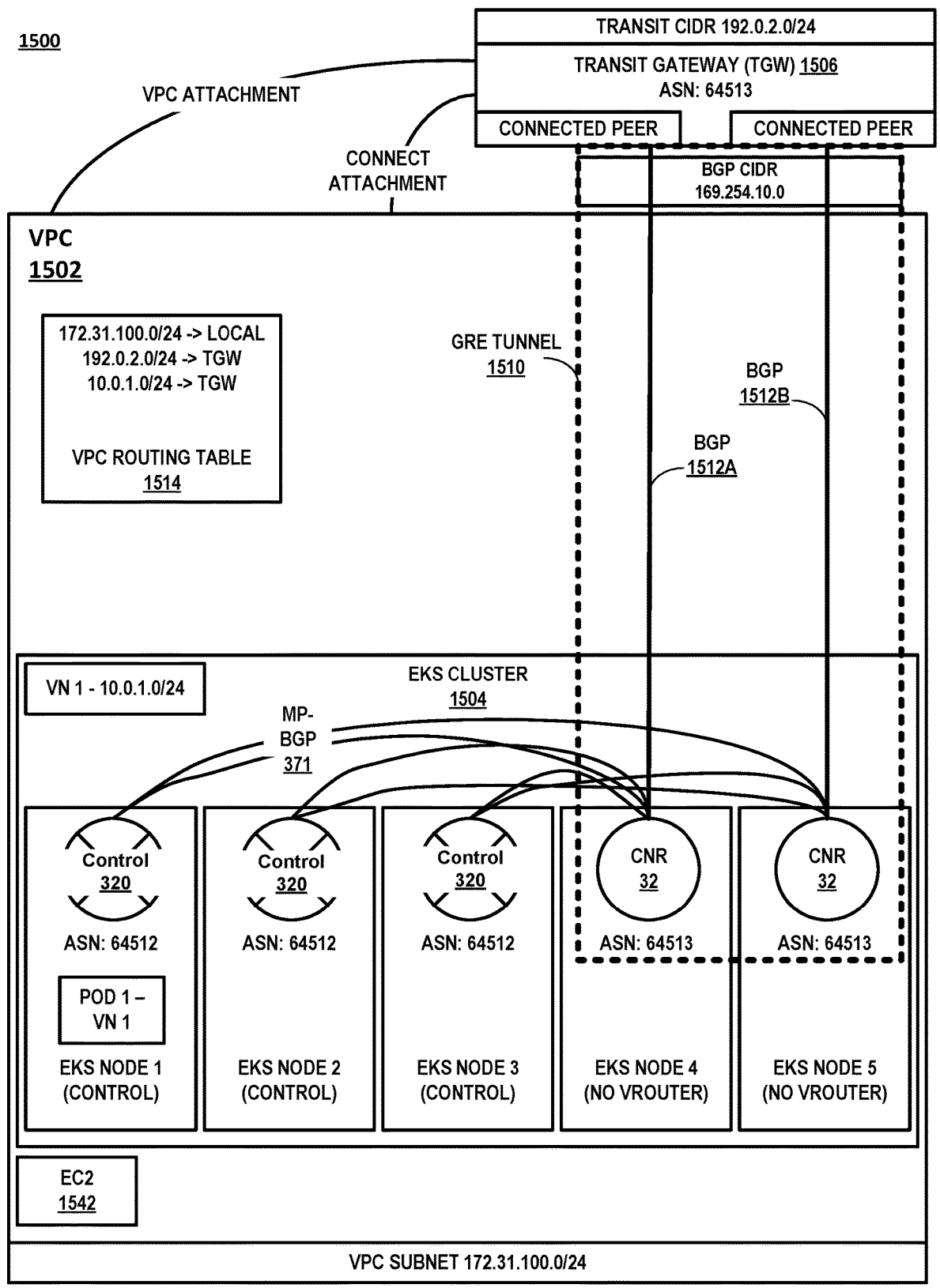
FIG. 13 is a block diagram illustrating an example system, according to one or more aspects of this disclosure.

Transit gateway 1412A of GSI 1413A is a network transit hub that can interconnect VPCs and on-premises networks. A transit gateway can have Attachments, which are one or more VPCs, a SD-WAN/third-party network appliance, a gateway, a peering connection with another transit gateway, or a VPN connection to a transit gateway. A VPC, VPN connection, or Direct Connect gateway can dynamically propagate routes to a transit gateway route table. A VPC must have configured therein static routes to send traffic to the transit gateway. For a VPN connection, routes are propagated from the transit gateway to the on-premises router (e.g., routers 1462) using Border Gateway Protocol (BGP). For a Direct Connect gateway, allowed prefixes are originated to the on-premises router (e.g., routers 1462) using BGP. For a peering attachment, a static route is created in the transit gateway route table to point to the peering attachment. Transit gateway 1412B of GSI 1413B is similar, but for a different tenant. FIG. 13 shows an example configuration for a GSI, though for connecting workloads in a Kubernetes cluster of a VPC to VPC workloads in the same VPC.

FIG. 13 is a block diagram illustrating an example system, according to one or more aspects of this disclosure. System 1500 is configured in part using GSI 38 of network controller 24 for an SDN architecture system. GSI 38, in this case including transit gateway 1506 and CNRs 32, represents a custom resource.

Connect Attachment

Transit gateway 1506 connect attachment establishes a connection between transit gateway 1506 and third-party virtual appliances running in VPC 1502, in this case CNRs 32. A Connect attachment supports a tunneling protocol, such as the Generic Routing Encapsulation (GRE) tunnel protocol for high performance, and also supports Border Gateway Protocol (BGP) for dynamic routing. After a Connect attachment is created, one or more tunnels (also referred to as Transit Gateway Connect peers) can be created on the Connect attachment to connect transit gateway 1506 and the third-party appliance. A Connect attachment is created on an existing VPC attachment (the transport attachment). A Connect peer is created on the Connect attachment to establish a connection to CNRs 32 in VPC 1502. The VPC route table for VPC 1502 has a route to cause VPC network infrastructure to forward traffic destined for the transit gateway CIDR block (192.0.2.0/24) to transit gateway 1506.

Two BGP sessions 1512A-1512B may be established over tunnel 1510 to exchange routing information. An example GRE tunnel 1510 is shown between CNRs 32 of Nodes 4 and 5 and transit gateway 1506. CNRs 32 may be configured using techniques described elsewhere in this document with respect to CNRs of a GSI.

Overlay networks in VPC clusters and Kubernetes in general are not directly accessible from the VPC network of an operator. Public cloud Kubernetes distributions sometimes have their own ways of exposing Kubernetes workloads to external networks, but these were tailored for traditional workloads (e.g., Virtual Machines) and not for Kubernetes workloads. These alternatives sometimes force customers to support:

Configuring pod IPs as secondary IP addresses on node interfaces
This limits a number of pods that can be started on a node.
Services exposed via public Load Balancers
But Load Balancer instantiation is slow and charged per instance irrespective of actual traffic flow.

In some examples, Pods/services in an EKS/Bring Your Own (BYO) Kubernetes cluster will be made accessible by workloads in the same VPC. In some examples, Pods/services in an EKS/BYO Kubernetes cluster may also be made accessible by workloads in a different VPC. In some examples, the gateway service instance may be managed by an operator of an Operator VPC and should be invisible to the customer/tenant.

In the example of FIG. 13,
Applying the gateway service instance manifest to GSI 38 creates a custom controller in network controller 24 that creates and manages:
Transit Gateway 1506 (a Kubernetes and Public cloud platform resource)
A VPC Attachment (a Public cloud platform resource)
A Connect Attachment (a Public cloud platform resource)
Connected Peers (a Kubernetes resource)
CNRs 32 (a Kubernetes resource)
CNRs 32 connect via BGP to the connected peers and use plain IP in the data plane.
CNRs 32 connect via at control plane level with MP-BGP sessions 371 to control nodes 320 to facilitate connectivity with network controller 24 networks, and CNRs 32 may use MPLSoUDP, MPLSoGRE or similar protocols in the data plane. Although FIG. 13 shows workload Pod 1 co-located with control node 320 on EKS Node 1, workload Pods can be running on other Kubernetes network nodes that do not also run a control node 320.
CNRs 32 and connected peers can be scaled out.
Transit gateway 1506 provides active/active L3/L4 load balancing across CNRs 32.
CNRs 32 may provide active/active L3/4 load balancing across the SDN architecture system/network controller 24 nodes (EKS Nodes 1-3 in FIG. 13).
Adding a label on the virtual network that needs to be exposed will:
Advertise the virtual network's subnet to the transit gateway via CNRs 32
Add a route to the VPC routing table 1514 with transit gateway 1412B as the next hop for the subnet.
The virtual network is now routed in the VPC network and is accessible to workloads in the VPC, such as EC2 1542 or other workloads not part of the Kubernetes cluster (here, EKS cluster 1504). This virtual network is shown as "VN 1" with Pod 1 in FIG. 13.

The above solution is similar to a traditional physical SDN gateway or data center gateway in physical network fabrics where the combination of Transit Gateway 1506 and CNRs 32 plays the role of that physical SDN gateway.

Traffic flow from EC2 instance 1542 to a custom pod network Pod 1 on VN 1 in the Kubernetes cluster:
1. User creates a custom pod network (VN1) and a Pod 1 that uses the network.
2. User adds a label that advertises the custom pod network to transit gateway 1506.
3. Traffic from EC2 instance 1542 towards the custom pod network pod is routed to transit gateway 1506.
4. Transit gateway 1506 load balances across the CNRs 32,
5. CNRs 32 will send traffic to the EKS node which hosts the pod (EKS Node 1).

Traffic flow from EC2 instance 1542 to a LoadBalancer service (not shown in FIG. 13) in the Kubernetes cluster:
1. User creates a LoadBalancer service with an annotation that contains the network to be used by the LoadBalancer.
2. User adds the label that advertises the LoadBalancer's network to transit gateway 1506.
3. Traffic from EC2 instance 1542 towards the network is routed to transit gateway 1506.
4. Transit gateway load balances across the CNRs 32.
5. CNRs 32 will again load balance across all the EKS nodes that host the pods backending the service.

Proper roles may be assigned so that the custom controllers can freely create the resources on the public cloud platform.

Resources

For these resources, a corresponding portion of a manifest may be generated to configure the resource as part of a GSI 38 object. Network controller 24 receives the manifest for an instance of the GSI object to create corresponding configuration objects for the collected custom resources, which are then reconciled to the state of the compute infrastructure.

In the context of Kubernetes and this disclosure, the terms "object" and "resource" are often used interchangeably, but formally a "resource" typically refers to an entity that represents a piece of computing infrastructure, such as a pod, a service, a replication controller, a deployment, a namespace, etc. Resources are the building blocks used when configuring and managing the Kubernetes cluster. Each resource has a unique identity and is managed by the Kubernetes API server or custom API server. "Object," by contrast, is an instance of a resource. When a pod, a service, or any other Kubernetes resource or custom resource is created, this creates an object of that resource type. Objects are instances of the resource types defined in the Kubernetes API or custom API server. Each object has a set of properties defined by its resource type, such as metadata, spec, and status. For example, a pod object represents a single instance of a pod resource.

TransitGateway

TransitGateway is a network controller 24 custom resource that represents the Public Cloud TransitGateway resource, and may be included in GSI 38.
type TransitGatewaySpec struct {
ConnectedPeerScale *int32//Controls the number of ConnectedPeer pods
TransitASN int64//ASN of Public cloud platform side of the BGP session for the transit gateway
PeerASN int64//ASN that will be set on the ConnectedPeer object TransitCIDR string//CIDR of the transit gateway
BGPCidr string//CIDR for the BGP session that will be established ControllerContainer *corev1.Container//Container that contains ConnectedPeerClientReconciler
CrpdContainer *corev1.Container//CNR container
InitContainer *corev1.Container//Init container that sets things up for CNR
SubnetIDs [ ] string//Subnet IDs of subnets in the VPC
ControlNodeASN int64//ASN of the CN2 control node bgp routers NodeSelector map[string]string//The node on which the CNRs will be spawned.

LicenseSecretName string//Secret that contains the CNR license
}
type TransitGatewayStatus struct {
ConnectedPeerReferences [ ]
corev1.LocalObjectReference
State string
TransportTransitGatewayAttachmentState string
ConnectTransitGatewayAttachmentState string
}
Route A network controller 24 custom resource that represents an entry in a VPC Routing Table, and may be included in GSI 38:
type RouteSpec struct {
DestinationCidrBlock string
RouteTableFilter map[string]string
TransitGatewayID string
{
type RouteStatus struct {
RouteTableId string
}
ConnectedPeer A network controller 24 custom resource that represents an appliance (CNR in this case) that has BGP sessions with the transit gateway, and may be included in GSI 38:
type ConnectedPeerSpec struct {
TransitGatewayGREAddress string//An IP Address allocated from the TransitGateway.Spec
TransitGateway1BGPAddresss string//IP Address from the/8 block of the TransitGateway.
TransitGateway2BGPAddresss string//Fallback IP Address from the/8 block of the TransitGateway.
PeerBGPAddress string//IP Address from the/8 block of the TransitGateway.
BGPBlock string//Equivalent to TransitGateway.Spec.BGPCidr
PeerASN int64//Equal to TransitGateway.Spec.PeerASN
TransitGateway1BGPStatus string
TransitGateway2BGPStatus string
ControlNodeASN int64//ASN of the CN2 control node bgp routers
ConnectedPeerState string
TransitGatewayId string
ConnectAttachmentId string
LicenseSecretName string//Secret that contains the CNR license
}
type ConnectedPeerStatus struct {
ConnectedPeerState string
PeerGREAddress string
BGP1State string
BGP2State string
ControlNodePeers map[string]string
}
Custom Controllers Two custom controllers may be added to support GSI. A controller that runs on the nodes with network controller 24 configuration and control nodes, and a client controller that runs alongside the CNR container. Operations of these custom controllers are described below with respect to FIG. 14, which is a conceptual diagram 1600 illustrating an example workflow for the components of custom controllers for an integrated gateway service, according to one or more aspects of this disclosure. A user creates an object using a TransitGateway (TGW) resource (an example manifest is below).
Server The server custom controller may be deployed manually and has the following reconcilers. These reconcilers may have different instances specific to respective compute infrastructures. Network controller 24, based on information provided by the user, determines the appropriate instance for each of the reconcilers.

Figure 14:
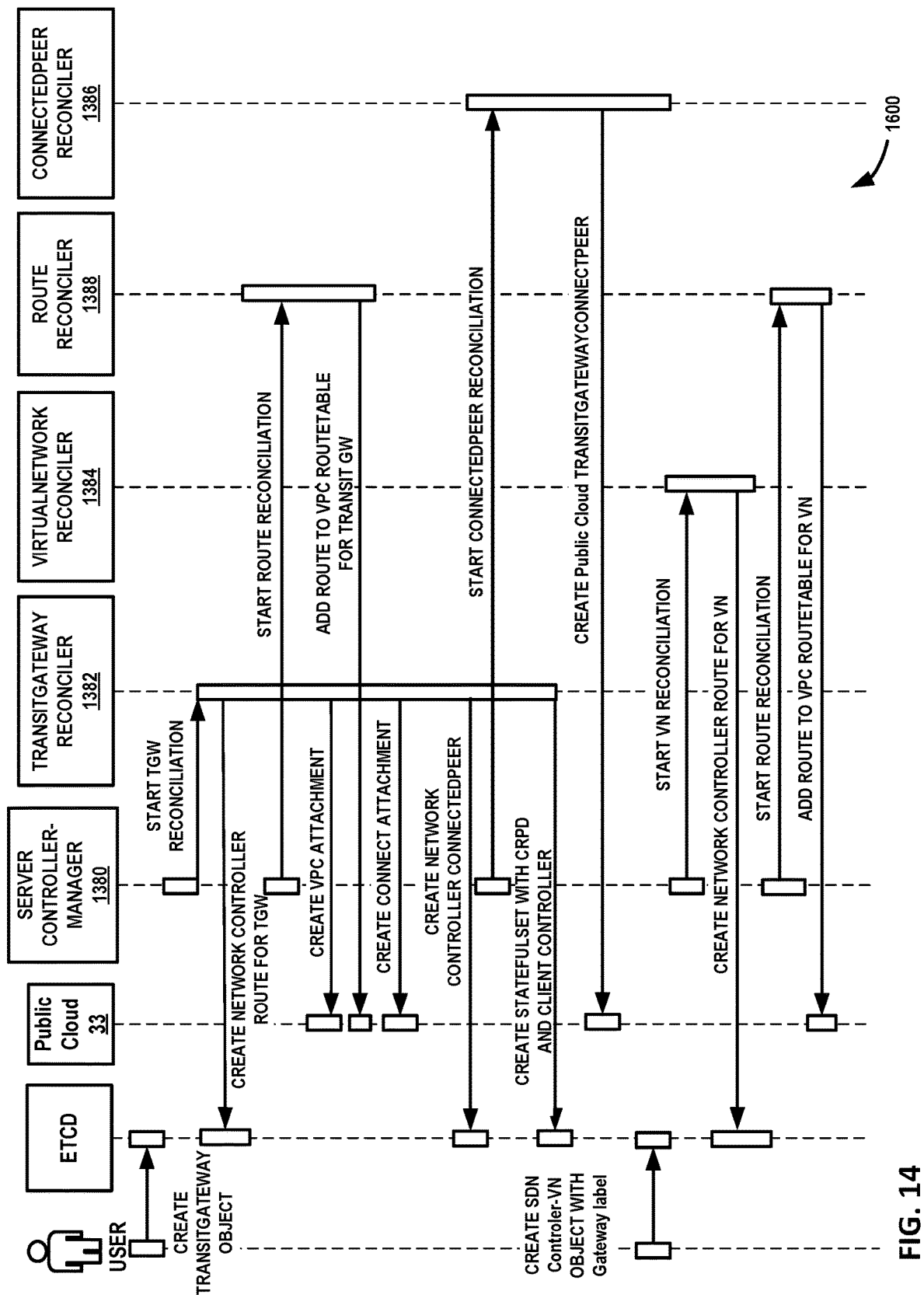
FIG. 14 is a conceptual diagram illustrating an example workflow for the components of custom controllers for an integrated gateway service, according to one or more aspects of this disclosure.

TransitGatewayReconciler 1382
  a. Creates the Public cloud platform TransitGateway resource
  b. Creates a network controller 24 route object for the TransitGateway CIDR
  c. Creates a VPC attachment to the TransitGateway, e.g., using VPC APIs.
  d. Creates a TransitGateway Connect attachment for the VPC attachment
  e. Creates network controller 24 ConnectedPeer objects
  f. Creates a stateful set that contains:
    1. CNR init container
    2. Client controller
    3. CRPD container VirtualNetworkReconciler 1384—Only reconciles virtual networks that in the manifest are labeled with a label indicating the virtual networks should be exposed to the VPC or other compute infrastructure underlay network. As one example, the label may be a "core.site.net/gateway" label, or "Gateway" label (as shown in FIG. 14). VirtualNetworkReconciler 1384 creates a network controller 24 route object with the Route's DestinationCidrBlock set to the virtual network's subnet, RouteReconciler 1388—Adds a route for transit gateway 1506 to the VPC RouteTable of the VPC.

ConnectedPeerReconciler 1386—Creates the Public cloud platform TransitGatewayConnectPeer resource based on the values set in the ConnectedPeer object,
Client The client custom controller is automatically created by the server controller for each ConnectedPeer and has the following reconcilers:
ConnectedPeerClientReconciler
  Sets up a notrack_table nftable and no_track rules
  Creates a GRE tunnel with the transit gateway
    Creates a new interface tgw1 with IP set to the BGP IP address
  Sets rp_filter to 2 for this interface
  Commits base config in cRPD
  Adds BGP routers to cRPD
  Creates a network controller 24 BGPRouter object for the ConnectedPeer and adds reference to this router in all network controller 24 control nodes 320 BGPRouters
  Lists all virtual networks that have the label indicating the virtual networks should be exposed and fetches their route targets (RTs) and commits config to cRPD for the CNR.

CrpdVirtualNetworkReconciler—Adds/Removes config to/from the cRPD based on relevant label changes to network controller 24 virtual networks.

BgpRouterReconciler—Adds/Removes BGP router configs to/from the cRPD based on updates to network controller 24 control nodes 320 BGP routers.

The following is an example manifest and parameters for a TransitGateway resource:

```
apiVersion: core.ec2.site.net/v1
kind: TransitGateway
metadata:
    name: tgw1
    namespace: contrail
spec:
subnetIDs:
    subnet-06954fbd44acde652
    subnet-06789d56b3248eb37
    subnet-094c50a1cff7c1e86
connectedPeerScale: 1
transitASN: 64513
peerASN: 64513
transitCIDR: 192.0.2.0/24
bgpCidr: 169.254.10.0
controlNodeASN: 64512
licenseSecretName: crpd-license
controllerContainer:
    name: controller
    command: ["/manager", "-mode=client"]
    image: hub. site.net/cn2/contrail-k8s-ec2:vpc-comm-test
crpdContainer:
    name: crpd
    image: hub.site.net/cnr/crpd:22.3R1.8
initContainer:
    name: init
    image: hub.site.net/cn2/busybox
```

The following is an example of a GSI manifest:

```
apiVersion: v1
kind: Namespace
metadata:
    name: contrail-gsi
---
apiVersion: v1
kind: ServiceAccount
metadata:
    name: contrail-gsi-serviceaccount
    namespace: contrail-gsi
---
apiVersion: rbac.authorization.k8s.io/v1
kind: ClusterRole
metadata:
    name: contrail-gsi-role
rules :
- apiGroups:
    - '*'
  resources:
    - '*'
  verbs:
    - '*'
---
apiVersion: rbac.authorization.k8s.io/v1
kind: ClusterRoleBinding
metadata:
    name: contrail-gsi-rolebinding
roleRef:
    apiGroup: rbac.authorization.k8s.io
    kind: ClusterRole
    name: contrail-gsi-role
subjects :
- kind: ServiceAccount
  name: contrail-gsi-serviceaccount
  namespace: contrail-gsi
---
apiVersion: plugins.juniper.net/v1
kind: GSIPlugin
metadata:
    name: contrail-gsi-plugin
    namespace: contrail-gsi
spec:
    awsRegion: "us-east-2"
    iamRoleARN: "arn:aws:iam::*******"
    vpcID: "vpc-**********"
    common:
        containers:
        - image: <repository>/contrail-gsi-plugin:<tag>
          imagePullPolicy: Always
          name: contrail-gsi-plugin
        initContainers:
        - command:
          - kubectl
          - apply
          - -k
          - /crd
          image: <repository>/contrail-gsi-plugin-crdloader:<tag>
          imagePullPolicy: Always
          name: contrail-gsi-plugin-crdloader
        serviceAccountName: contrail-gsi-serviceaccount
```

The awsRegion, iamRoleARN, and vpcID fields are user-defined. The iamRoleARN value is the Amazon Resource Name (ARN) of the IAM Role created as part of the prerequisites for the GSI.

Figure 15:
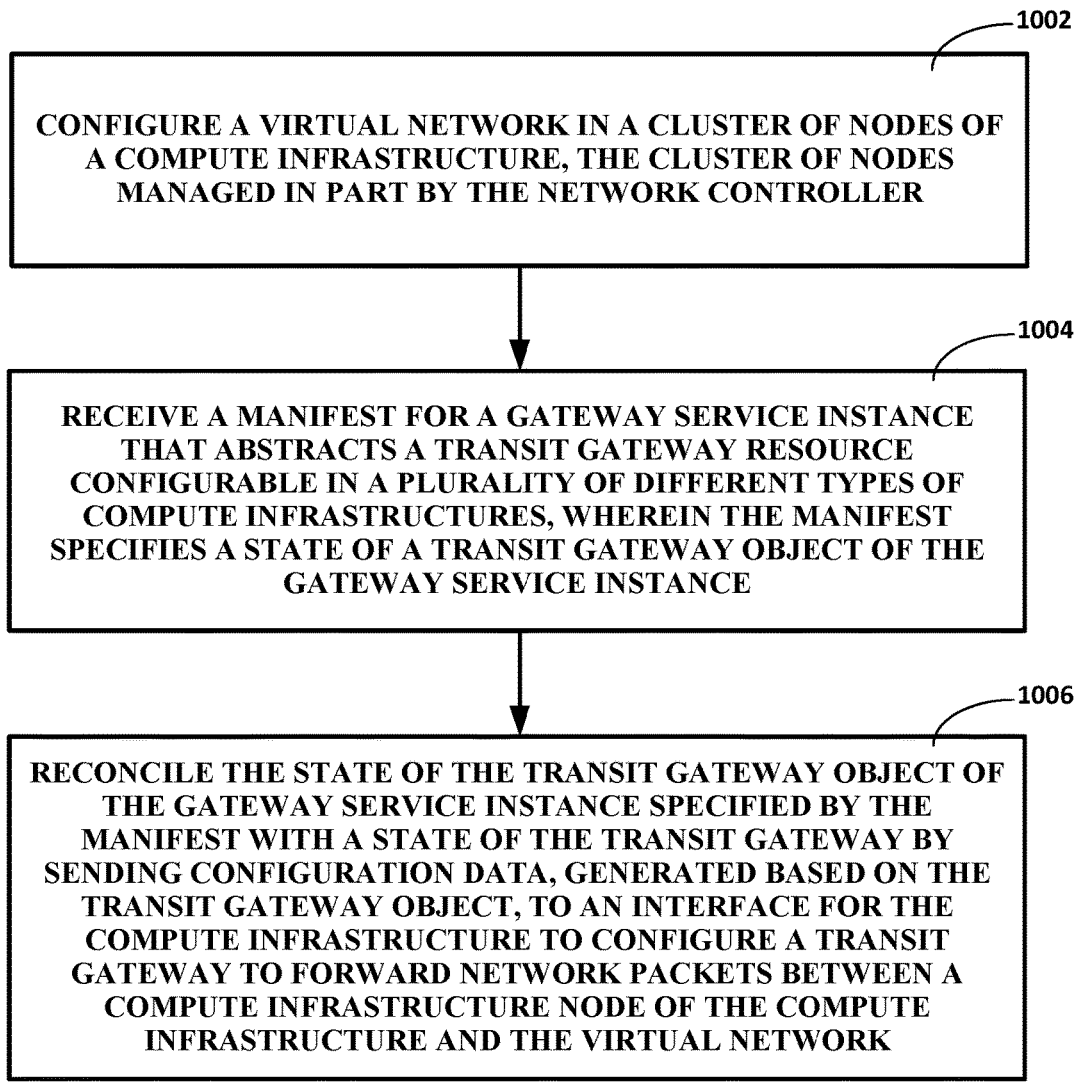
FIG. 15 is a flowchart illustrating an example mode of operation for a software-defined networking architecture system, according to techniques of this disclosure.

FIG. 15 is a flowchart illustrating an example mode of operation 1000 for a software-defined networking architecture system, according to techniques of this disclosure. Mode of operation 1000 is described with respect to network controller 24 of SDN architecture system 200 operating to configure VPC 1502 and transit gateway 1506 of FIG. 13, but mode of operation 1000 may be performed by other examples of network controllers and compute infrastructure, as described elsewhere in this disclosure.

Network controller 24 configures a virtual network (VN 1 in FIG. 13) in a cluster of nodes of a compute infrastructure, the cluster of nodes managed in part by the network controller (1002). The compute architecture may be VPC 1502 of FIG. 13, for instance, and the cluster of nodes a cluster of Kubernetes nodes. Network controller 24 receives a manifest for a gateway service instance 38 that abstracts a transit gateway resource configurable in a plurality of different types of compute infrastructures (1004). The manifest specifies an intended state of a transit gateway object of gateway service instance 38. Network controller 24 reconciles the intended state of the transit gateway object for the gateway service instance by sending configuration data, generated based on the transit gateway object, to an interface for the compute infrastructure to configure transit gateway 1506 to forward network packets between a compute infrastructure node (e.g., EC2 1542) of the compute infrastructure and the virtual network (represented in FIG. 13 as a single "Pod 1-VN 1").

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
a compute infrastructure including:
a compute infrastructure node;
a cluster of nodes managed in part by a network controller; and
a transit gateway,
wherein the network controller is configured to:
configure a virtual network in the cluster of nodes;
receive a manifest for a gateway service instance that abstracts a transit gateway resource configurable in a plurality of different types of compute infrastructures, wherein the manifest specifies a state of a transit gateway object of the gateway service instance; and
reconcile the state of the transit gateway object of the gateway service instance specified by the manifest with a state of the transit gateway by sending configuration data, generated based on the transit gateway object, to an interface for the compute infrastructure to configure the transit gateway to forward network packets between the compute infrastructure node and the virtual network.

2. The system of claim 1, wherein the compute infrastructure comprises a virtual private cloud (VPC).

3. The system of claim 2, wherein:
the compute infrastructure further includes a VPC routing table; and
the network controller is configured to reconcile the state of the transit gateway object of the gateway service instance specified by the manifest with the state of the transit gateway by sending configuration data, generated based on the transit gateway object, to an interface for the compute infrastructure to configure the VPC routing table to cause the VPC to forward network packets from the compute infrastructure node to the transit gateway.

4. The system of claim 2,
wherein the VPC comprises a VPC subnet having one or more nodes, the one or more nodes including the compute infrastructure node.

5. The system of claim 1, wherein:
the manifest specifies a state of a containerized network router object of the gateway service instance; and
the network controller is configured to reconcile the state of a containerized network router object specified by the manifest to a state of a containerized network router in the cluster of nodes by configuring the containerized network router to communicate with the transit gateway via a Border Gateway Protocol session.

6. The system of claim 5, wherein:
the containerized network router is configured to advertise, to the transit gateway via the Border Gateway Protocol session, a route for the virtual network; and
based on the route for the virtual network, the transit gateway forwards network packets from the compute infrastructure node to the virtual network.

7. The system of claim 6, wherein the network controller is configured to:
based on a determination the manifest for the gateway service instance includes a label for the virtual network that indicates the virtual network should be exposed to a compute infrastructure underlay network, configure the containerized network router with the route for the virtual network.

8. The system of claim 1,
wherein the virtual network comprises an overlay network, and
wherein the compute infrastructure node is a node of an underlay network of the compute infrastructure.

9. The system of claim 1,
wherein the virtual network includes a workload, and
wherein the network packets have a destination address that is a network address of the workload.

10. The system of claim 1, wherein the network controller is configured to:
determine a type of the compute infrastructure; and
generate the configuration data based on the transit gateway object and the type of the compute infrastructure.

11. A network controller comprising processing circuitry and memory, the network controller configured to:
configure a virtual network in a cluster of nodes of a compute infrastructure, the cluster of nodes managed in part by the network controller;
receive a manifest for a gateway service instance that abstracts a transit gateway resource configurable in a plurality of different types of compute infrastructures, wherein the manifest specifies a state of a transit gateway object of the gateway service instance; and
reconcile the state of the transit gateway object of the gateway service instance specified by the manifest with a state of the transit gateway by sending configuration data, generated based on the transit gateway object, to an interface for the compute infrastructure to configure a transit gateway to forward network packets between a compute infrastructure node of the compute infrastructure and the virtual network.

12. The network controller of claim 11, wherein the compute infrastructure comprises a virtual private cloud (VPC).

13. The network controller of claim 12, wherein:
the compute infrastructure further includes a VPC routing table; and reconcile the state of the transit gateway object of the gateway service instance specified by the manifest with the state of the transit gateway by sending configuration data, generated based on the transit gateway object, to an interface for the compute infrastructure to configure the VPC routing table to cause the VPC to forward network packets from the compute infrastructure node to the transit gateway.

14. The network controller of claim 12,
wherein the VPC comprises a VPC subnet having one or more nodes, the one or more nodes including the compute infrastructure node.

15. The network controller of claim 11, wherein:
the manifest specifies a state of a containerized network router object of the gateway service instance; and
the network controller is configured to reconcile the state of a containerized network router object specified by the manifest to a state of a containerized network router in the cluster of nodes by configuring the containerized network router to communicate with the transit gateway via a Border Gateway Protocol session.

16. The network controller of claim 15, wherein the network controller is configured to:
configure the transit gateway to, based on a route for the virtual network advertised by the containerized network router via the Border Gateway Protocol session, forward network packets from the compute infrastructure node to the virtual network.

17. The network controller of claim 16, wherein the network controller is configured to:
based on a determination the manifest for the gateway service instance includes a label for the virtual network that indicates the virtual network should be exposed to a compute infrastructure underlay network, configure the containerized network router with the route for the virtual network.

18. The network controller of claim 11,
wherein the virtual network comprises an overlay network, and
wherein the compute infrastructure node is a node of an underlay network of the compute infrastructure.

19. The network controller of claim 11, wherein the network controller is configured to:
determine a type of the compute infrastructure; and
generate the configuration data based on the transit gateway object and the type of the compute infrastructure.

20. Non-transitory computer-readable media comprising instructions that, when executed by one or more processors of a network controller, cause the one or more processors to:
configure a virtual network in a cluster of nodes of a compute infrastructure, the cluster of nodes managed in part by the network controller;
receive a manifest for a gateway service instance that abstracts a transit gateway resource configurable in a plurality of different types of compute infrastructures, wherein the manifest specifies a state of a transit gateway object of the gateway service instance; and
reconcile the state of the transit gateway object of the gateway service instance specified by the manifest with a state of the transit gateway by sending configuration data, generated based on the transit gateway object, to an interface for the compute infrastructure to configure a transit gateway to forward network packets between a compute infrastructure node of the compute infrastructure and the virtual network.

\* \* \* \* \*